(12) United States Patent
Stark et al.

(10) Patent No.: US 6,662,185 B1
(45) Date of Patent: Dec. 9, 2003

(54) METHODS AND SYSTEMS FOR PLANT PERFORMANCE ANALYSIS

(75) Inventors: Steven B. Stark, St. Charles, IL (US); Radha G. Mohanty, DeKalb, IL (US); Jay Michael Ver Hoef, Fairbanks, AK (US)

(73) Assignee: DeKalb Genetics Corporation, DeKalb, IL (US)

( * ) Notice: Subject to any disclaimer, the term of this patent is extended or adjusted under 35 U.S.C. 154(b) by 118 days.

(21) Appl. No.: 09/687,772

(22) Filed: Oct. 14, 2000

Related U.S. Application Data
(60) Provisional application No. 60/159,802, filed on Oct. 15, 1999.

(51) Int. Cl.⁷ .............................................. G06F 17/30
(52) U.S. Cl. .............................. 707/100; 707/2; 707/3; 707/6; 702/2; 702/3; 702/22; 702/30
(58) Field of Search ........................... 702/2, 3, 22, 30; 707/2, 3, 6, 100

(56) References Cited

PUBLICATIONS

Besag and Kempton, "Statistical analysis of field experiments using neighboring plots," *Biometrics*, 42, 231–251, 1986.

Bhatti et al., "Estimation of soil properties and wheat yields on complex eroded hills using geostatistics and thematic mapper images," *Remote Sens. Environ.*, 37:181–191, 1991.

Bhatti et al., "Identifying and removing spatial correlation from yield experiments," *Soil Sci. Soc. Am. J.*, 55:1523–1528, 1991.

Bradley et al., "Statistical methods in seed corn product selection," *J. Prod. Agric.*, 1:34–38, 1988.

Brownie et al., "Estimating spatial variation in analysis of data from yield trials: a comparison of methods," *Agron. J.*, 85:1244–1253, 1993.

Christensen et al., "Case–deletion diagnostics for mixed models," *Technometrics*, 34:38–45, 1992.

Cook, "Detection of influential observation in linear regression," *Technometrics*, 19:15–18, 1977.

Cressie and Lahiri, "Asymptotics for REML estimation of spatial covariance parameters," *Journal of Statistical Planning and Inference*, 50:327–341, 1996.

Cressie, "The origin of kriging," *Mathematical Geology*, 22:239–252, 1990.

Cressie, *Statistics for spatial data*, Revised Edition, John Wiley and Sons, New York, USA, 1993.

Cullis et al., "Spatial analysis of multi–environment early generation variety trials," *Biometrics*, 54:1–18, 1998.

(List continued on next page.)

*Primary Examiner*—Jean M. Corrielus
(74) *Attorney, Agent, or Firm*—Fulbright & Jaworski LLP

(57) ABSTRACT

Methods and systems for assessing wide-area performance of a crop variety using a linear mixed model that incorporates geostatistical components and includes parameters for fixed effects, random effects and covariances. A wide-area database is constructed that includes covariate data, spatial coordinates of testing locations of one or more crop varieties, geographic areas in which the testing locations reside, and performance trait values of one or more crop varieties. The parameters for the fixed effects, random effects and covariances are estimated by fitting the linear mixed model with data in the wide-area database. Long-term expected performance of the crop variety may be estimated using the parameter estimates. Average performance of the crop variety for a given time period may be predicted using the parameter estimates.

87 Claims, 36 Drawing Sheets

OTHER PUBLICATIONS

Godambe and Kale, "Estimating functions: an overview," *Estimating functions,* Godambe, editor, Clarendon Press, Oxford, 1991.

Gandin, "The problem of optimal interpolation," *Trudy GGO,* 99, 67–75, 1959 (In Russian).

Gandin, "The statistical structure of large scale meteorological fields," *Objective Analysis of Meteorological Fields,* Gidrometeorologicheskoe Izdatel'stvo (GIMIZ), Leningrad (translated by Israel Program for Scientific Translations, Jerusalem, 1965.

Goldberger, "Best linear unbiased prediction in the generalized linear regression model," *Journal of the American Statistical Association,* 57:369–375, 1962.

Goovaerts, *Geostatistics for Natural Resources Evaluation,* Oxford University Press, New York, 1997.

Gotway and Hartford, "Geostatistical methods for incorporating auxiliary information in the prediction of spatial variables," *Journal of Agricultural Biological and Environmental Statistics,* 1:17–39, 1996.

Gotway and Stroup, "A generalized linear model approach to spatial data analysis and prediction," *Journal of Agricultural Biological and Environmental Statistics,* 2:157–178, 1997.

Harville, "Maximum likelihood approaches to variance component estimation and to related problems," *Journal of the American Statistical Association,* 72:320–340, 1977.

Heyde, "A quasi–likelihood approach to the REML estimating equations," *Statistics and Probability Letters,* 21:381–384, 1994.

Hoaglin and Welsch, "The hat matrix in regression and ANOVA," *American Statistician,* 32:17–22, 1978.

Kolmogorov, "Interpolation and extrapolation of stationary random sequences," *Isvestiia Akademii Nauk SSSR, Seriia Matematicheskiia,* 5, 3–14. (Translation, 1962, Memo RM–3090–PR, Rand Corp., Santa Monica, CA), 1941.

Littell et al., *SAS System for Linear Models,* SAS Institute Inc., Cary, North Carolina, USA, 1996.

Mardia and Marshall, "Maximum likelihood estimation of models for residual covariance in spatial regression," *Biometrika,* 71:135–146, 1984.

Montgomery and Peck, *Introduction to Linear Regression Analysis, Second Edition,* Wiley, New York, 1992.

Ovalles and Collins, "Evaluation of soil variability in northwest Florida using geostatistics," *Soil Sci. Soc. Am. J.,* 52:1702–1708, 1988.

Patterson and Thompson, "Maximum likelihood estimation of components of variance," pp. 197–207, in *Proceedings of the 8th International Biometric Conference,* Biometric Society, Washington, DC, USA, 1974.

Patterson and Thompson, "Recovery of interblock information when block sizes are unequal," *Biometrika,* 58:545–554, 1971.

Searle et al., *Variance Components,* Wiley, New York, 1992.

Searle, *Linear Models,* Wiley, New York, 1971.

Sprague and Eberhart, "Corn breeding," *Corn and Corn Improvement,* J. A. Dudley and G. F. Sprague (eds), Iowa State Univ. Press, 1976.

Stroup et al., "Removing spatial variation from wheat yield trials: a comparison of methods," *Crop Science,* 86:62–66, 1994.

Ver Hoef and Barry, "Contructing and fitting models for cokriging and multivariable spatial prediction," *Journal of Statistical Planning and Inference,* 69:275–294, 1998.

Ver Hoef and Cressie, "Multivariable spatial prediction," *Mathematical Geology,* 25: 219–240, 1993.

Wiener, *Extrapolation, Interpolation, and Smoothing of Stationary Time Series,* MIT Press, Cambridge, MA, 1949.

Wold, *A Study in the Analysis of Stationary Time Series,* Almqvist and Wiksells, Uppsala, 1938.

Wolfinger et al., "Computing Gaussian likelihoods and their derivatives for general linear mixed models," *SIAM Journal of Scientific Computing,* 15:1294–1310, 1994.

Wu et al., "Application of geostatistical and neighbor analyses to data from plant breeding trials," *Crop Science,* 38:1545–1553, 1998.

Yost et al., "Geostatistical analysis of soil chemical properties of large land areas. I. Semi–variograms," *Soil Sci. Soc. Am. J.,* 46:1028–1032, 1982.

Yost et al., "Geostatistical analysis of soil chemical properties of large land areas. II. Kriging," *Soil Sci. Soc. Am. J.,* 46:1033–1037, 1982.

Zimmerman and Harville, "A random field approach to the analysis of field–plot experiments and other spatial experiments," *Biometrics,* 47:223–229, 1991.

Zimmerman, "Computationally efficient restricted maximum likelihood estimation of generalized covariance functions," *Mathematical Geology,* 21:655–672, 1989.

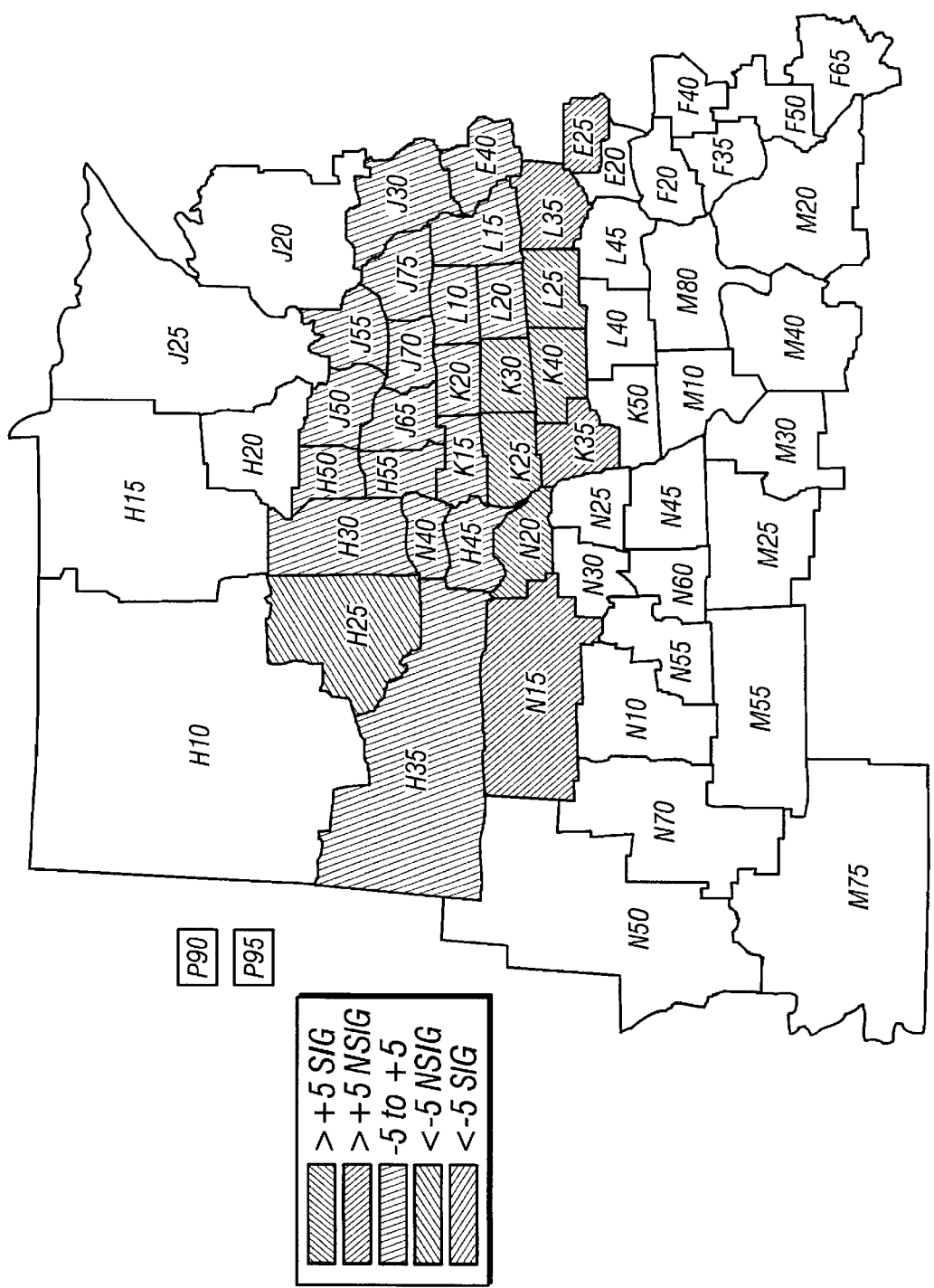
FIG. 2-A

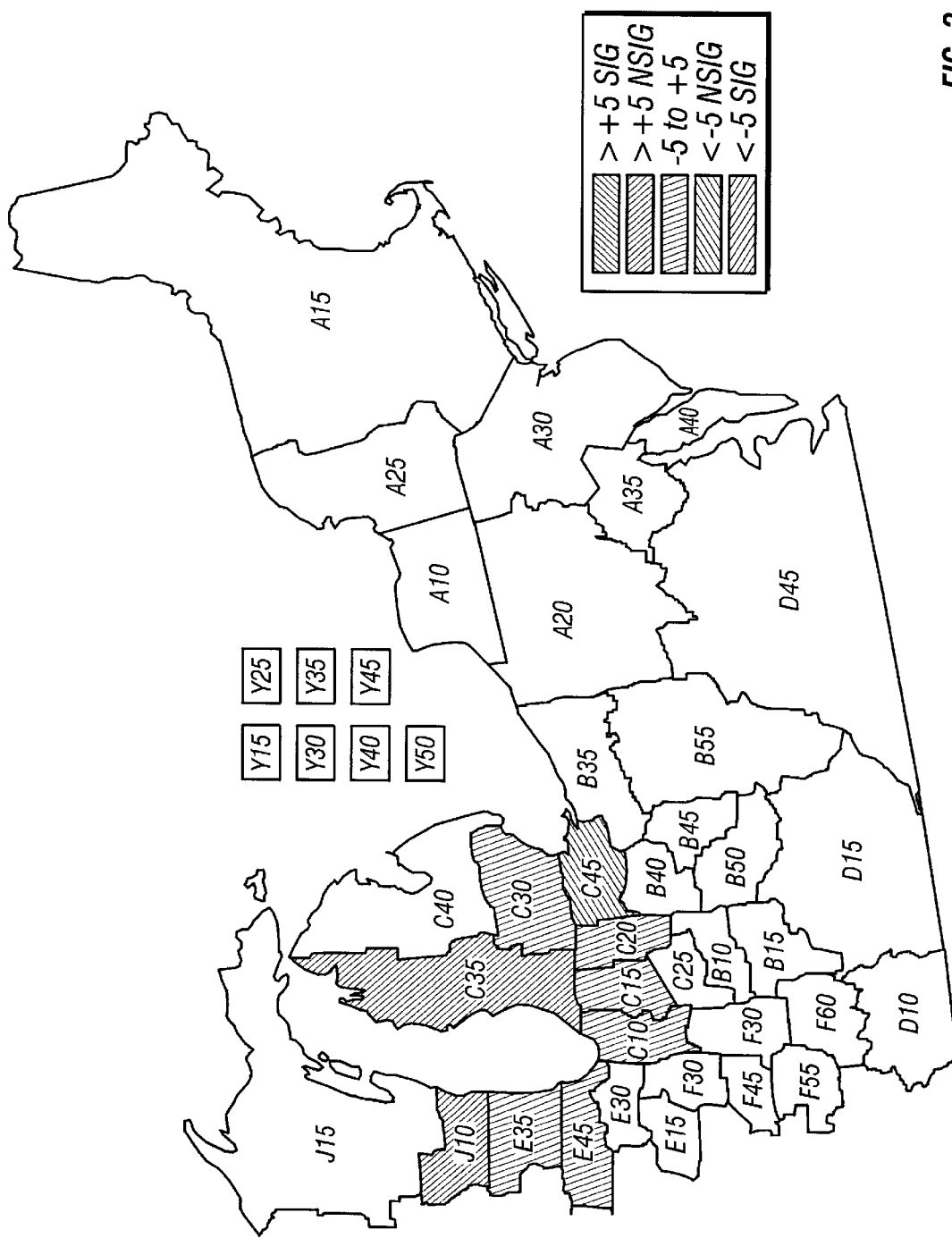
FIG. 2-B

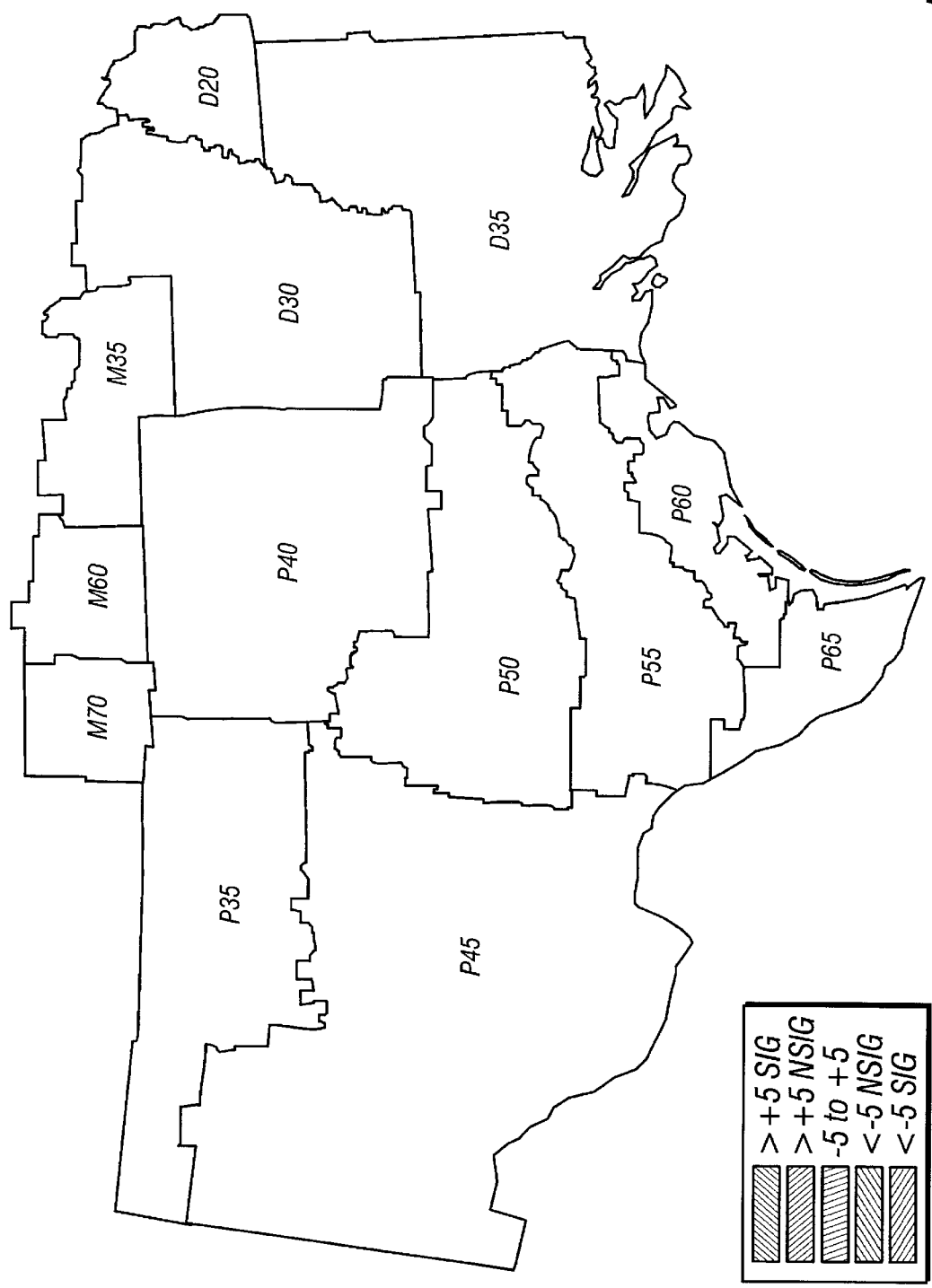
FIG. 2-C

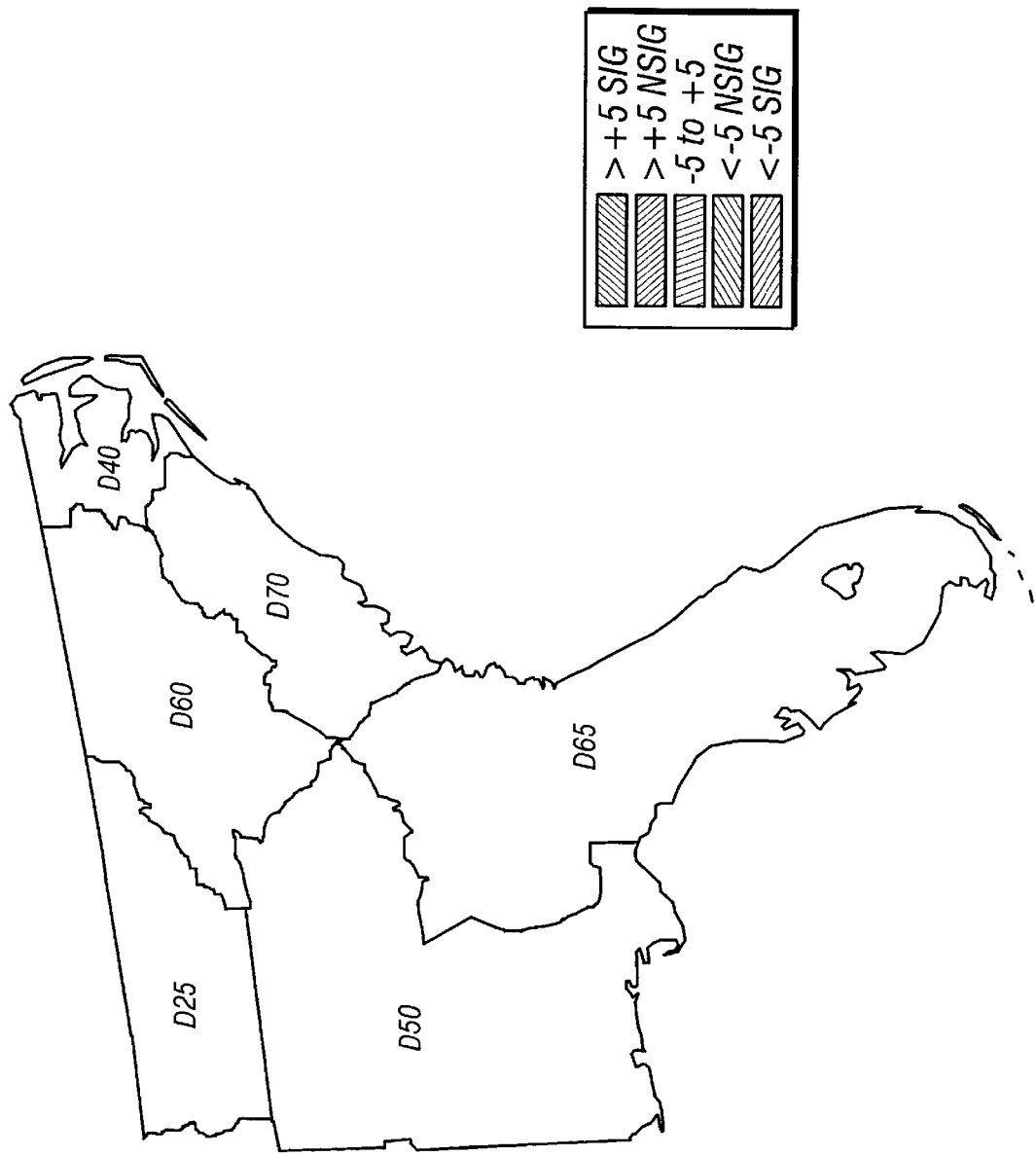
FIG. 2-D

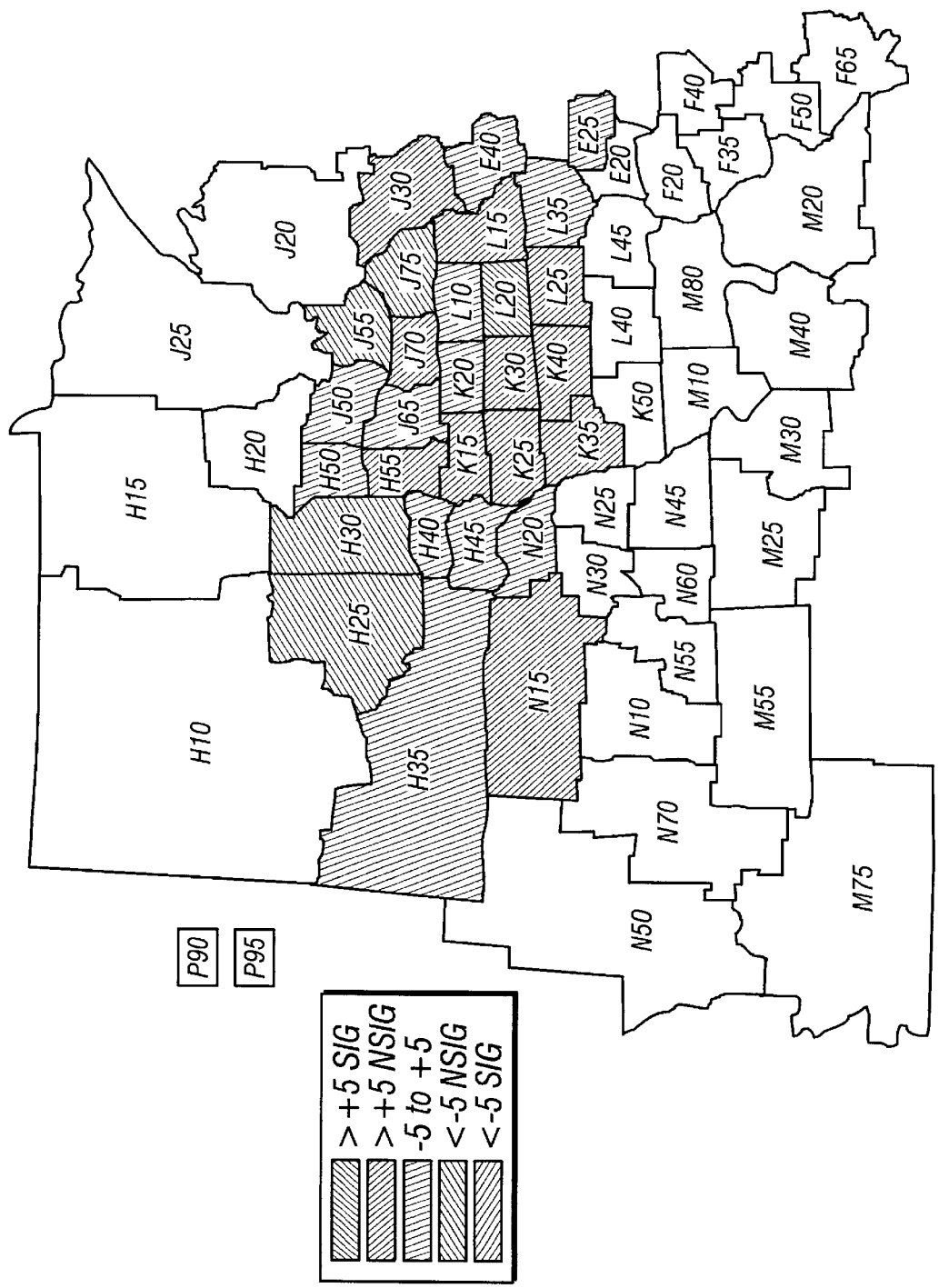
FIG. 3-A

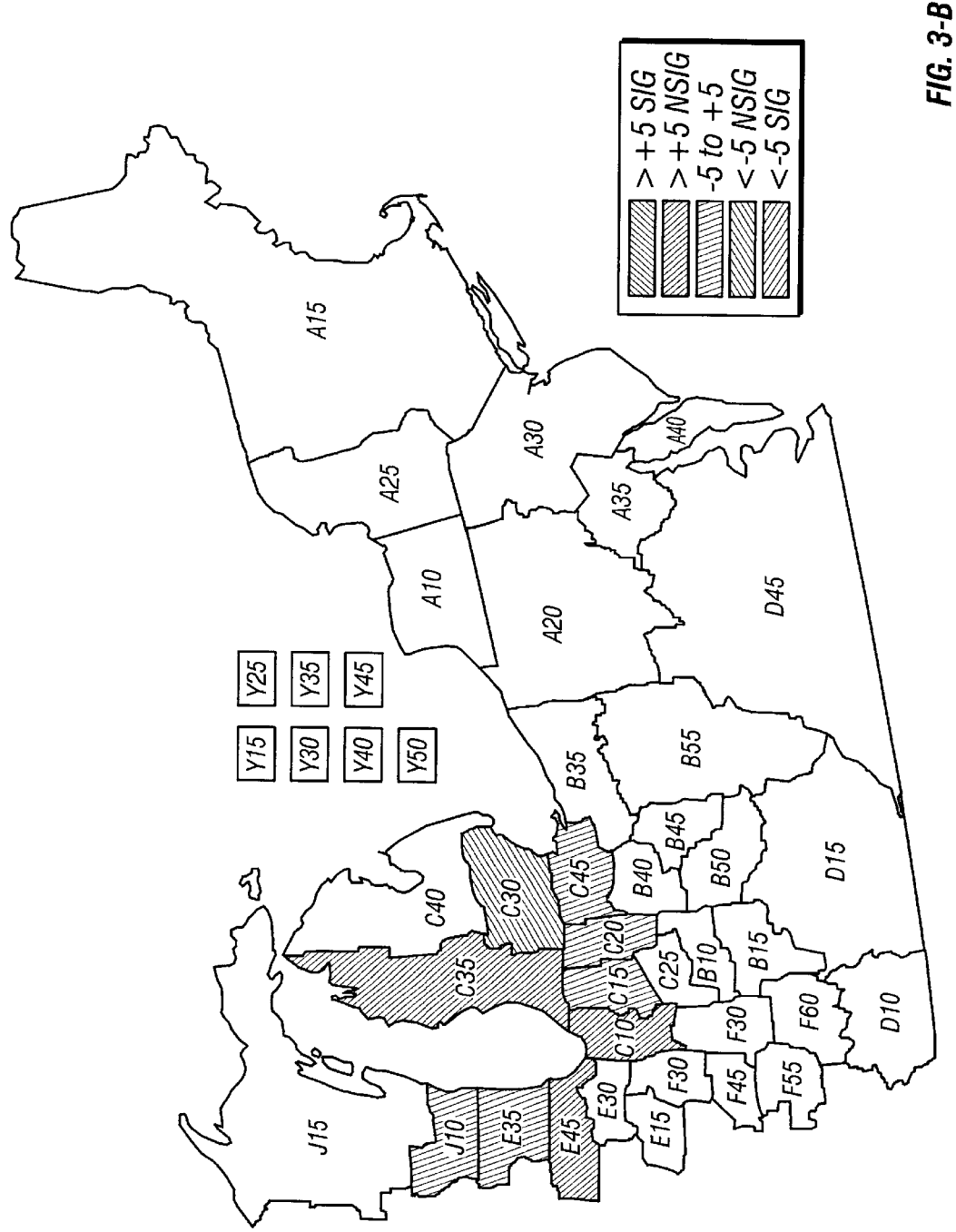
FIG. 3-B

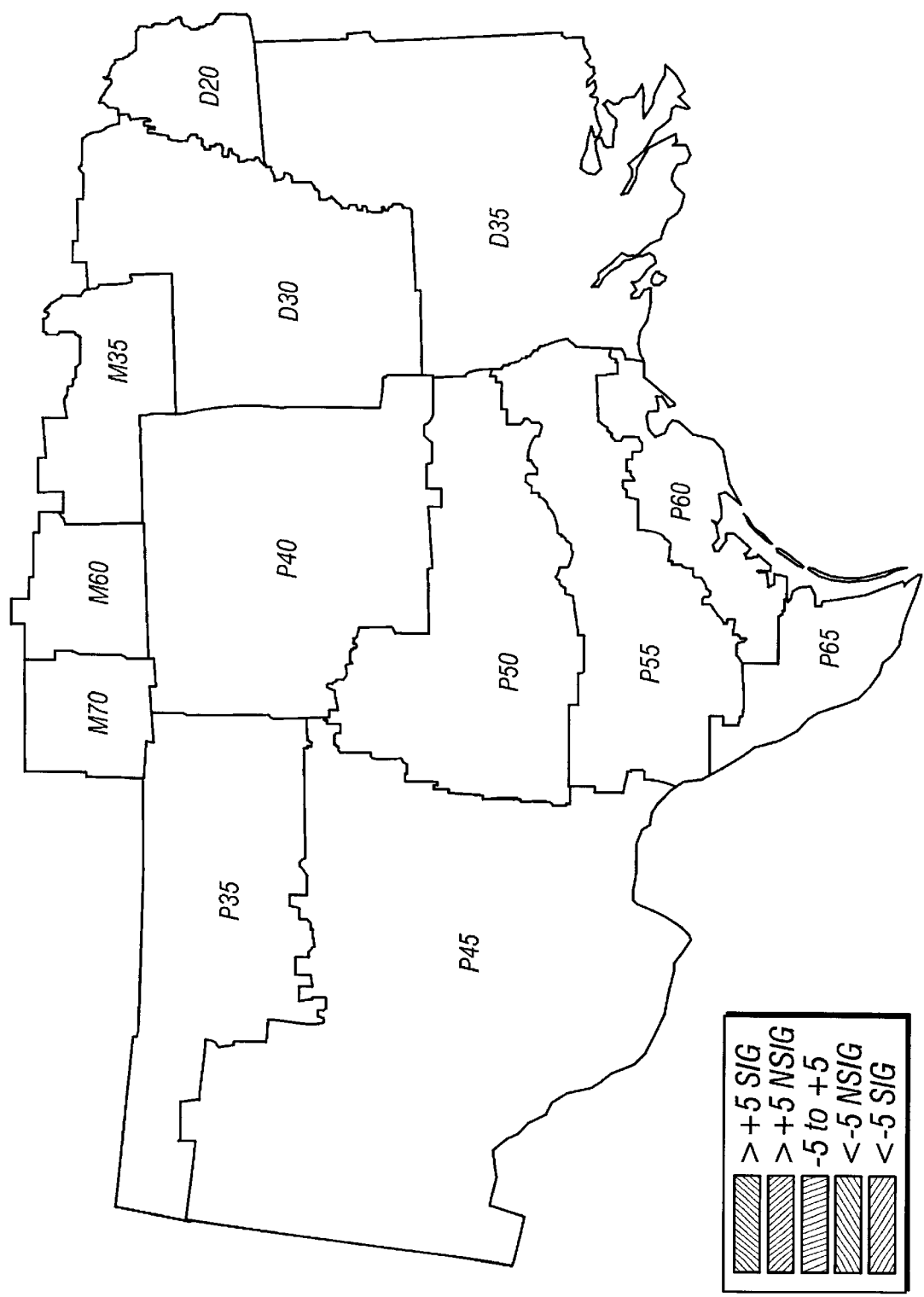
FIG. 3-C

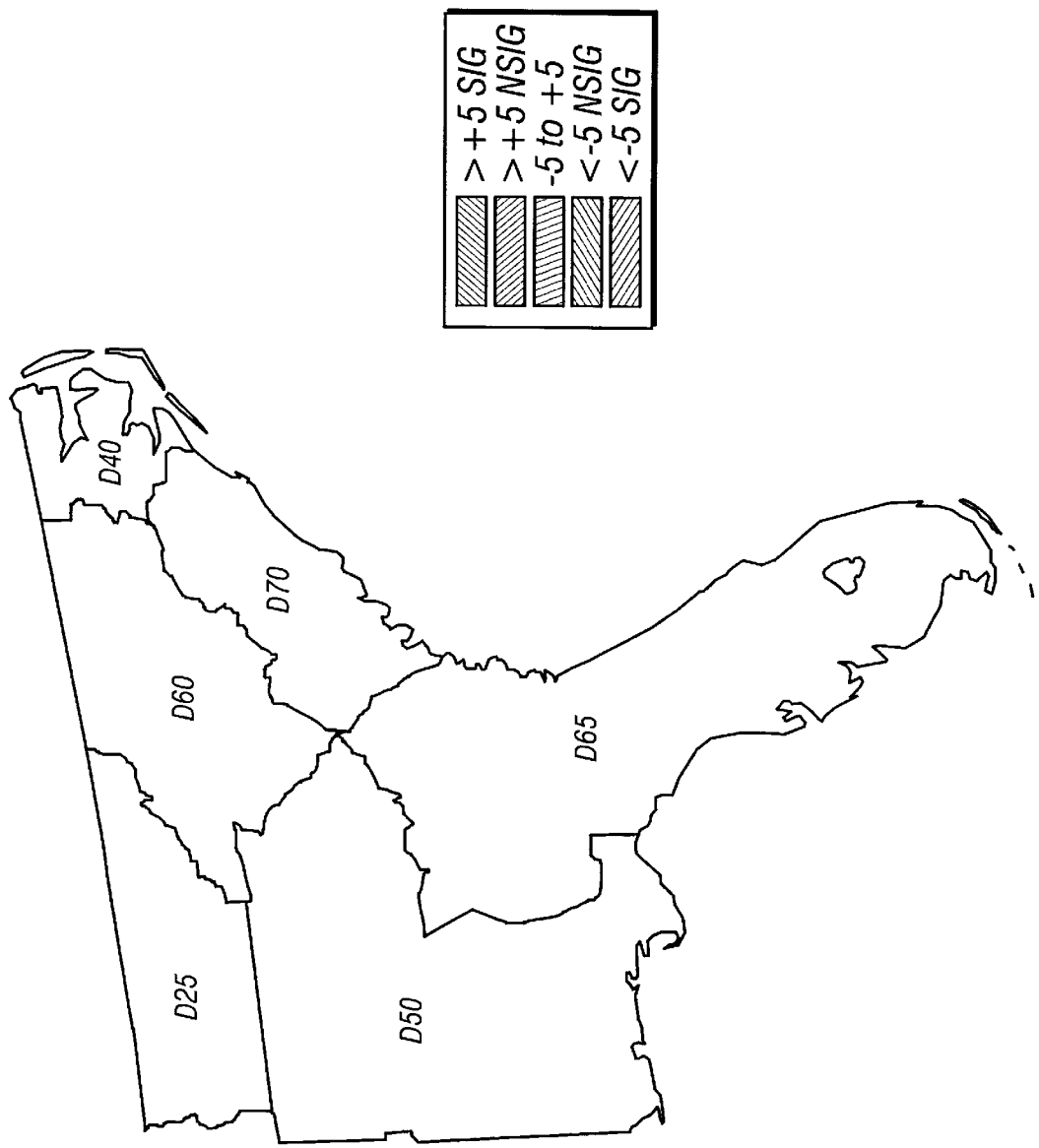
FIG. 3-D

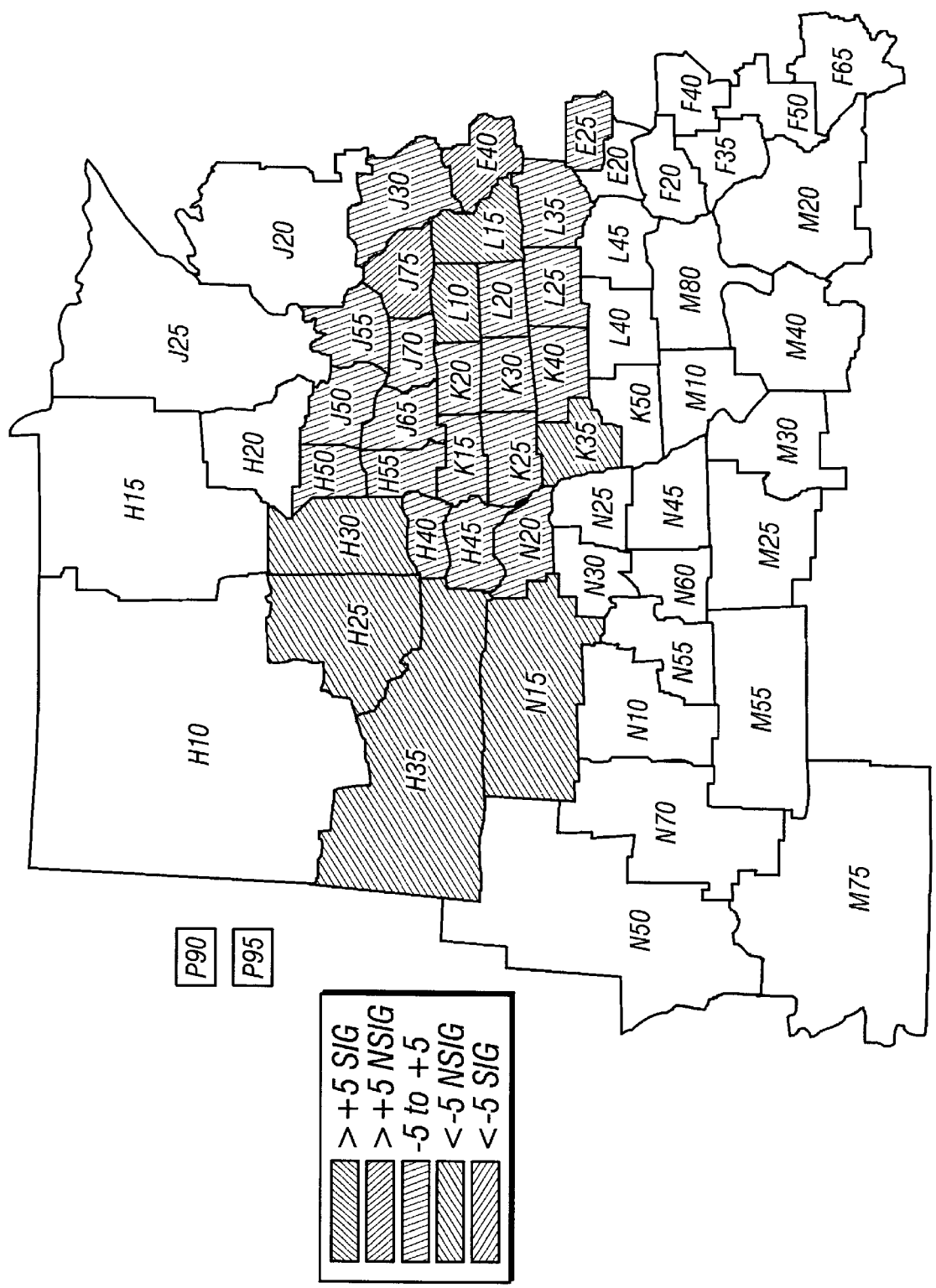
FIG. 5-A

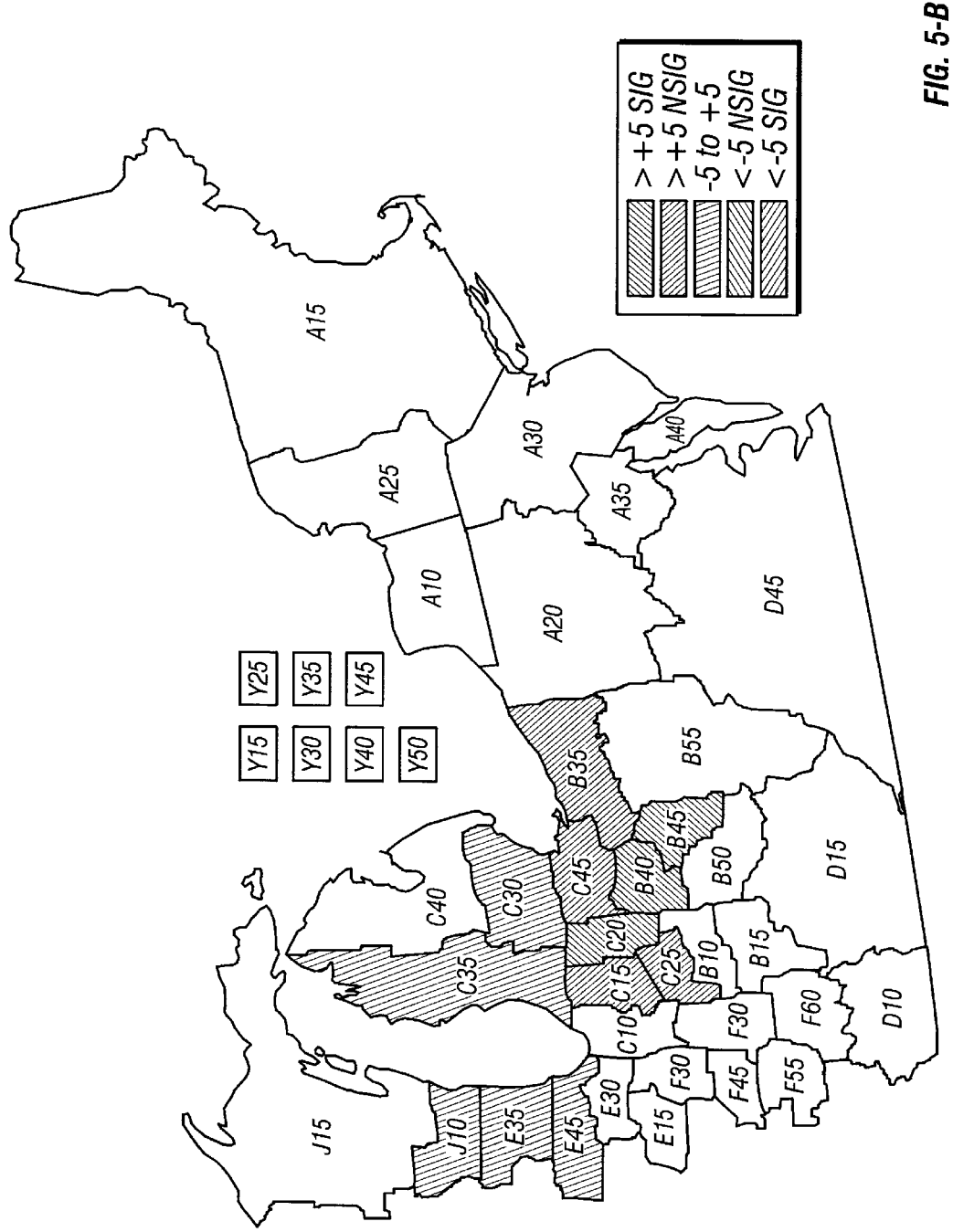
FIG. 5-B

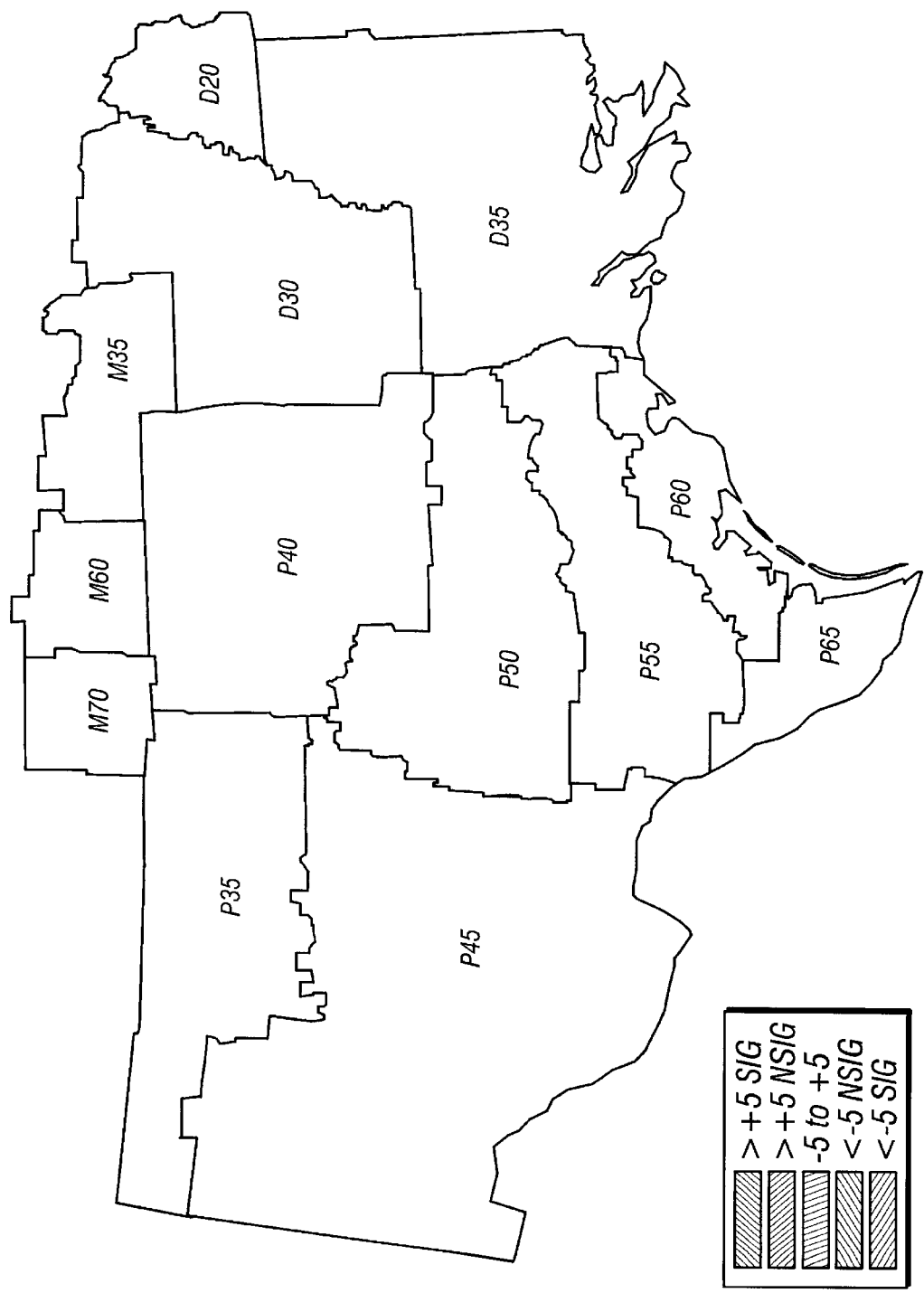
FIG. 5-C

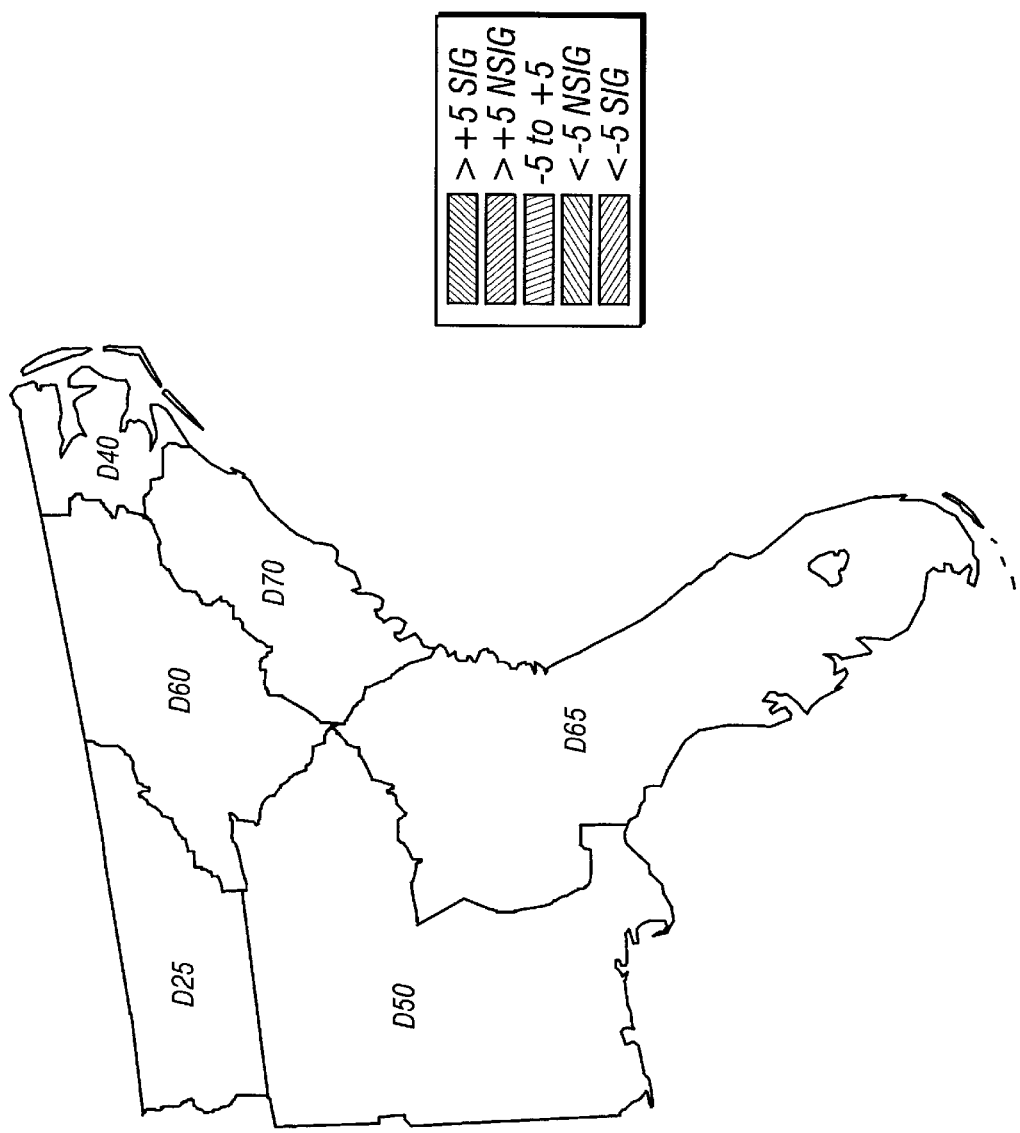
FIG. 5-D

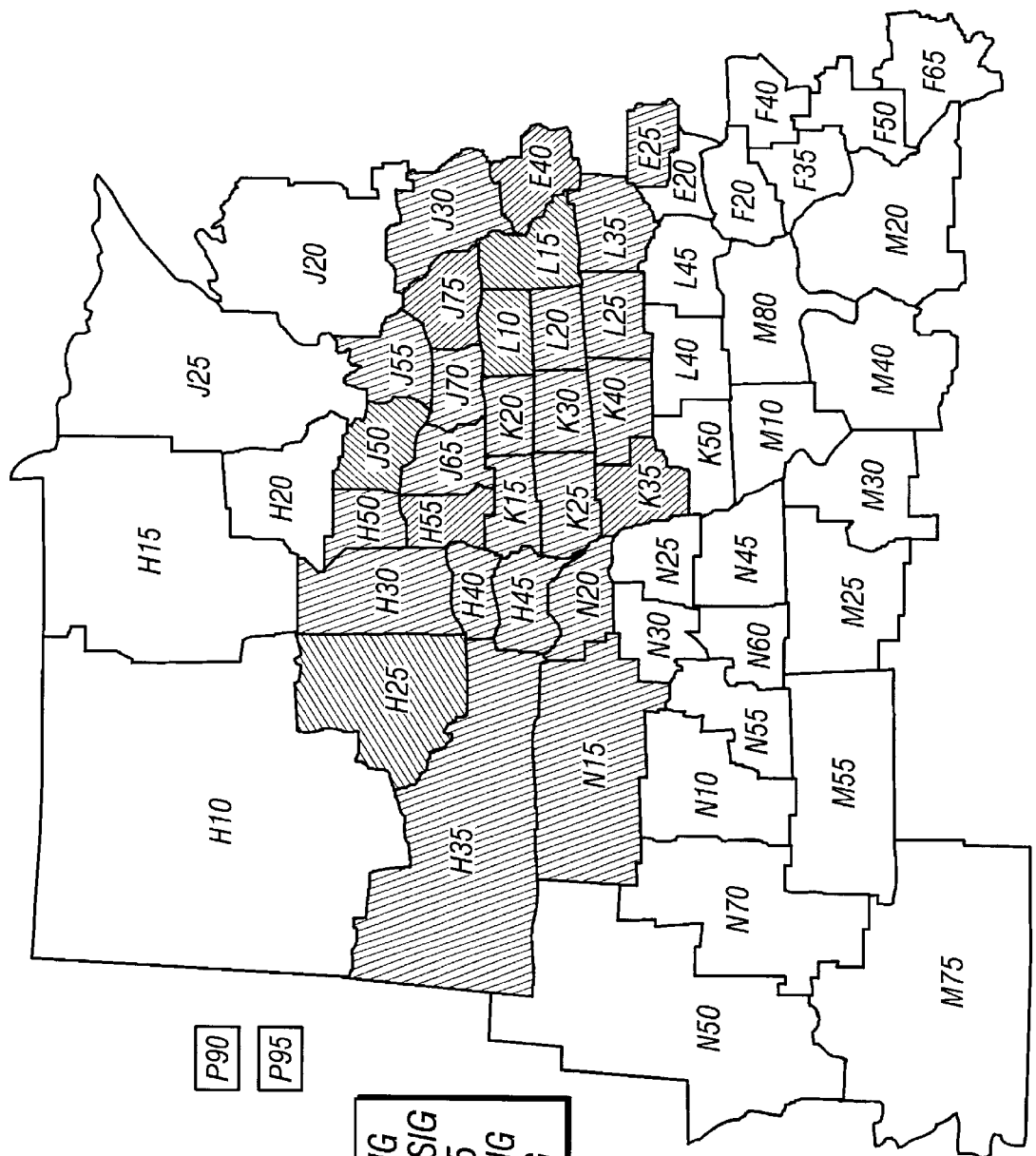
FIG. 6-A

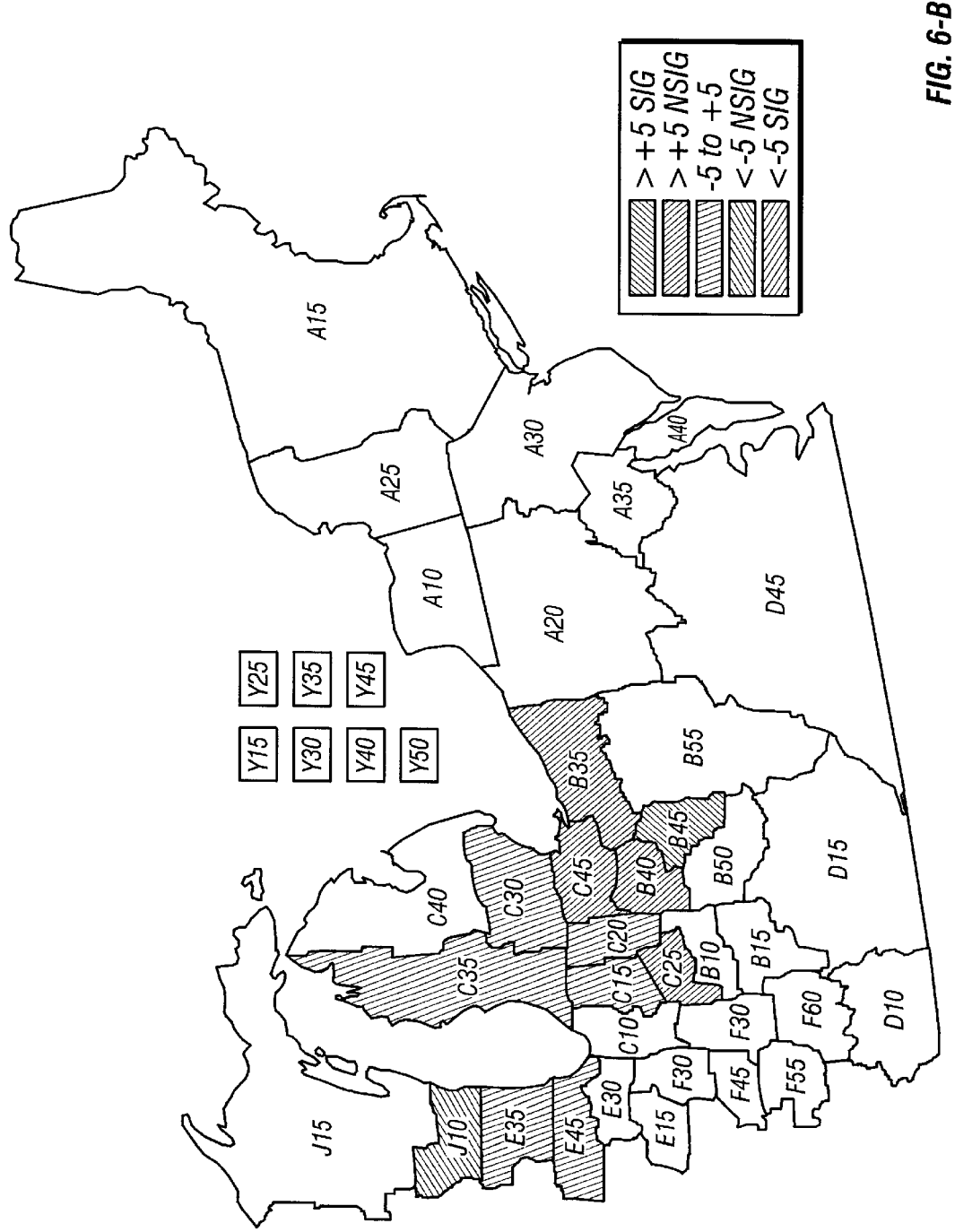
FIG. 6-B

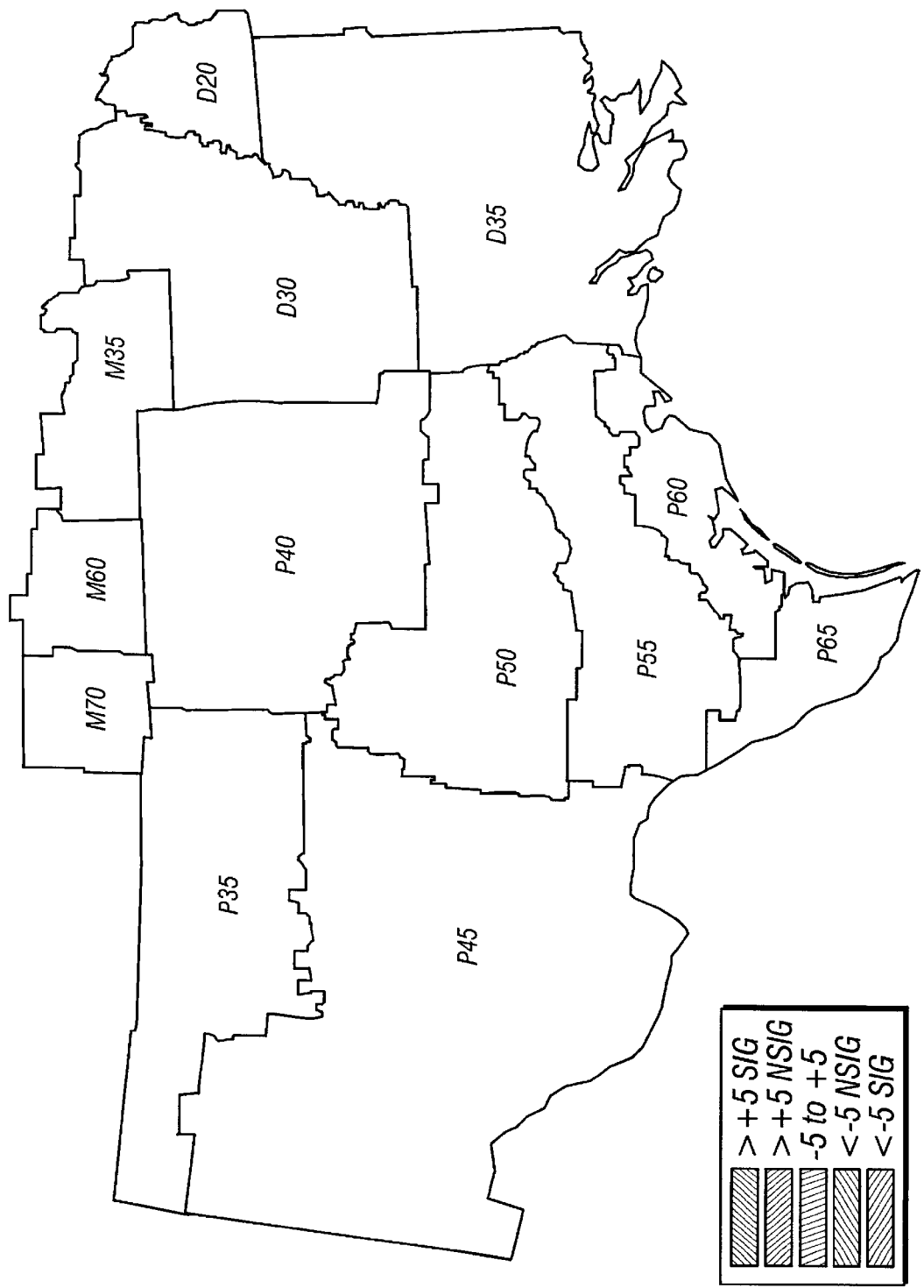
FIG. 6-C

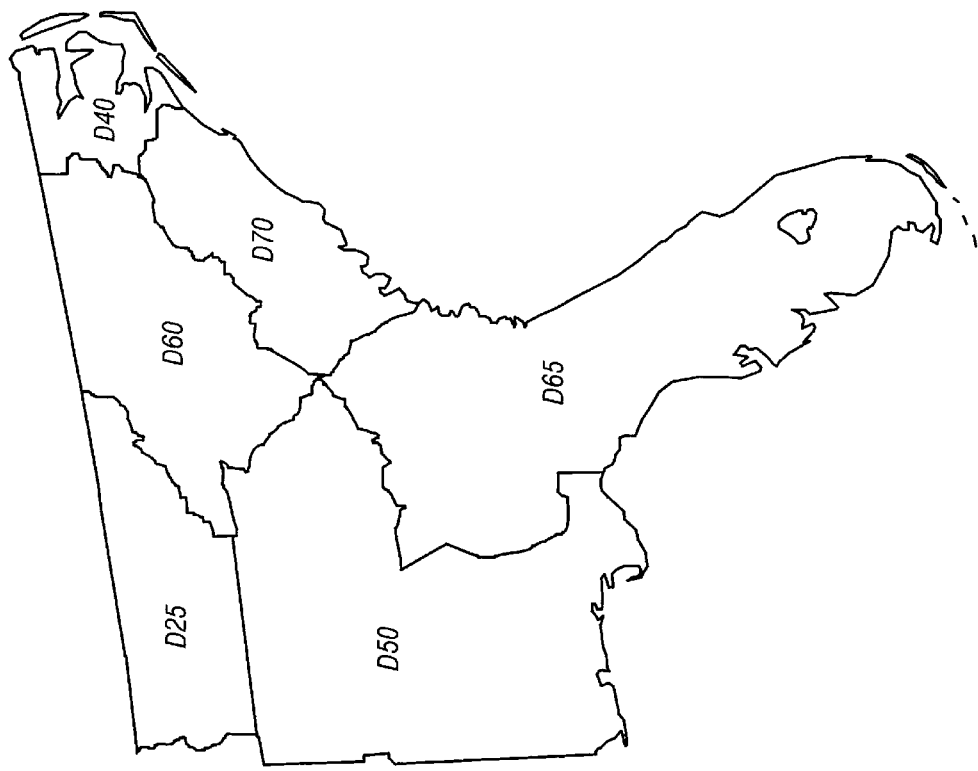
FIG. 6-D

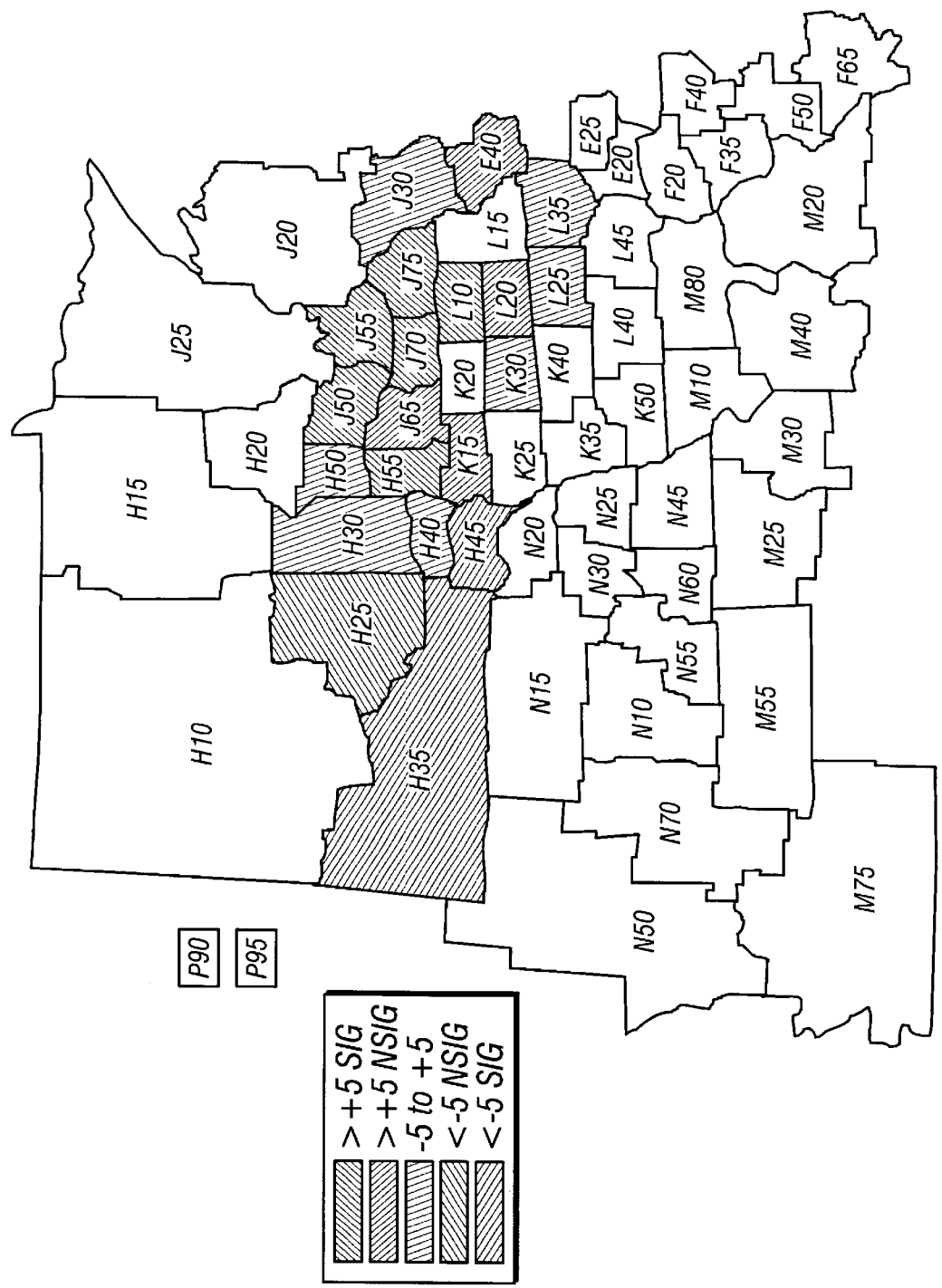
FIG. 8-A

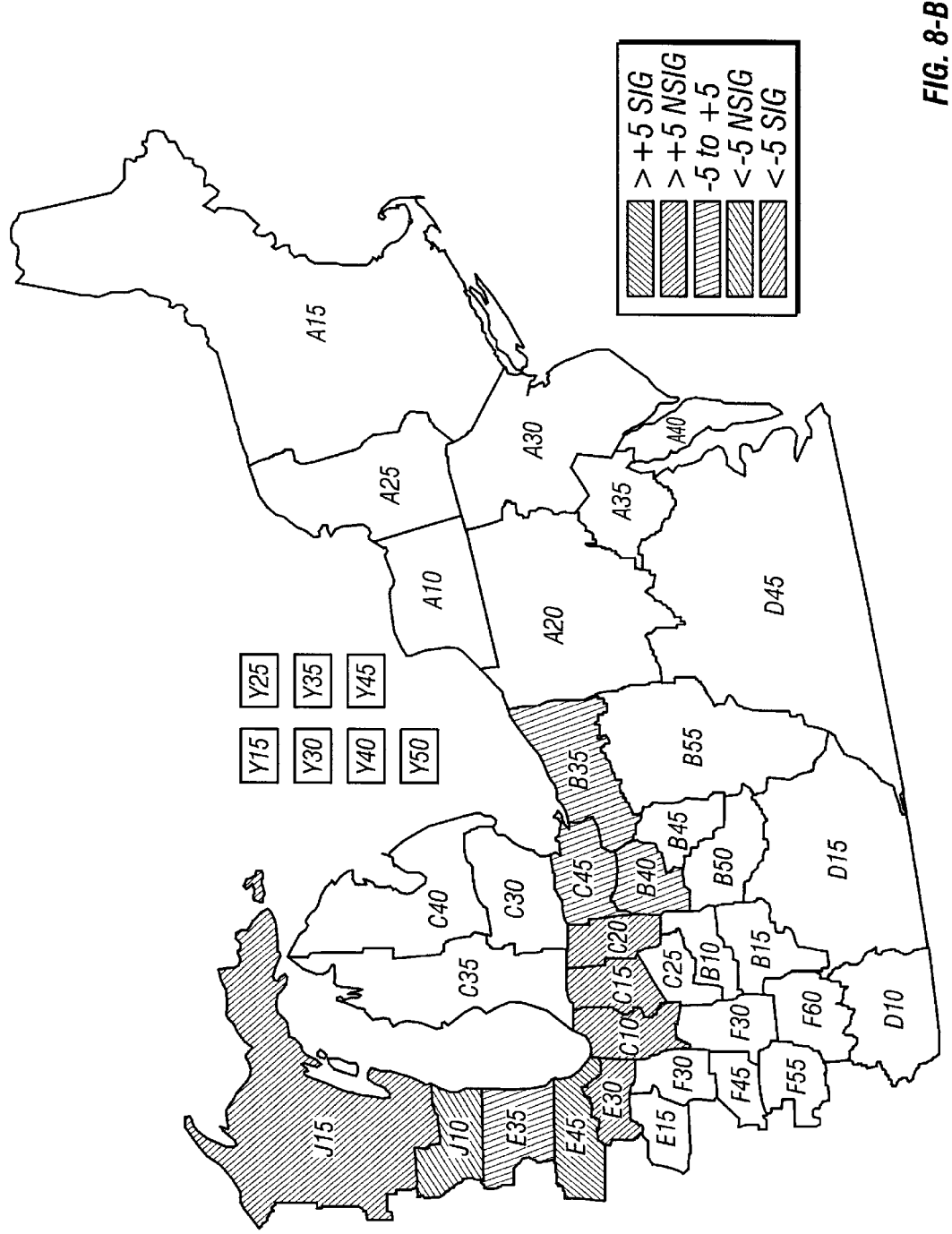
FIG. 8-B

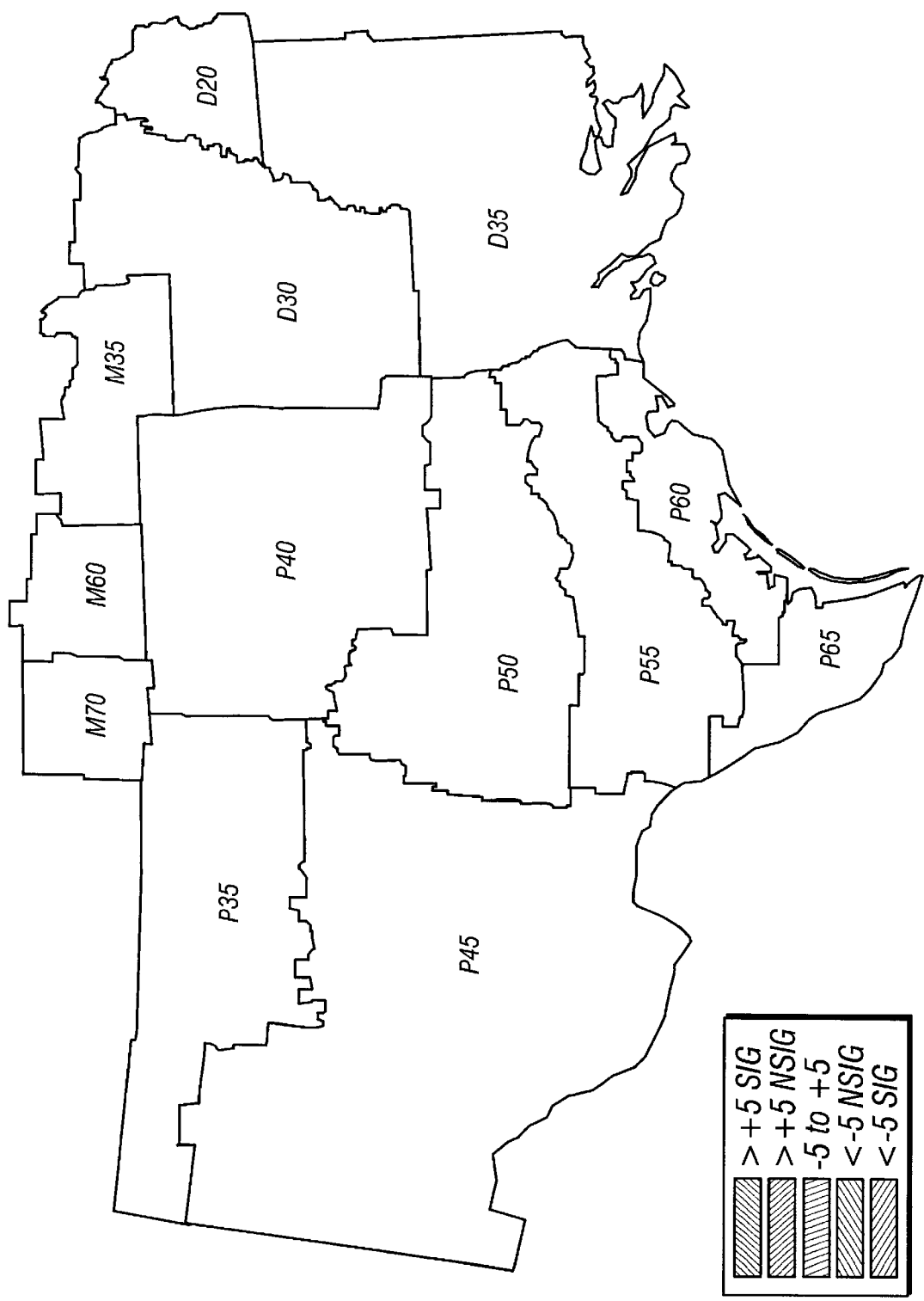
FIG. 8-C

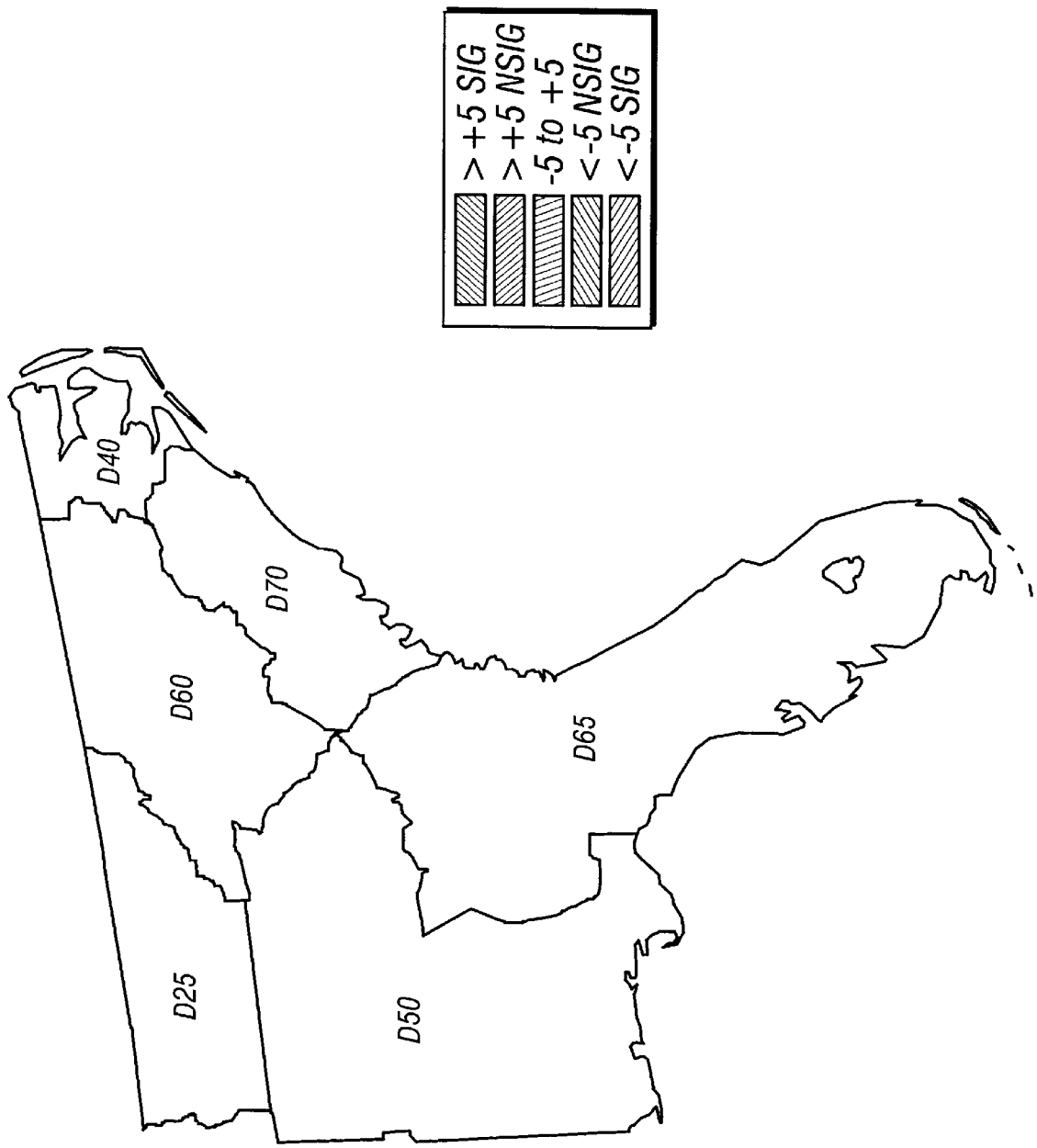
FIG. 8-D

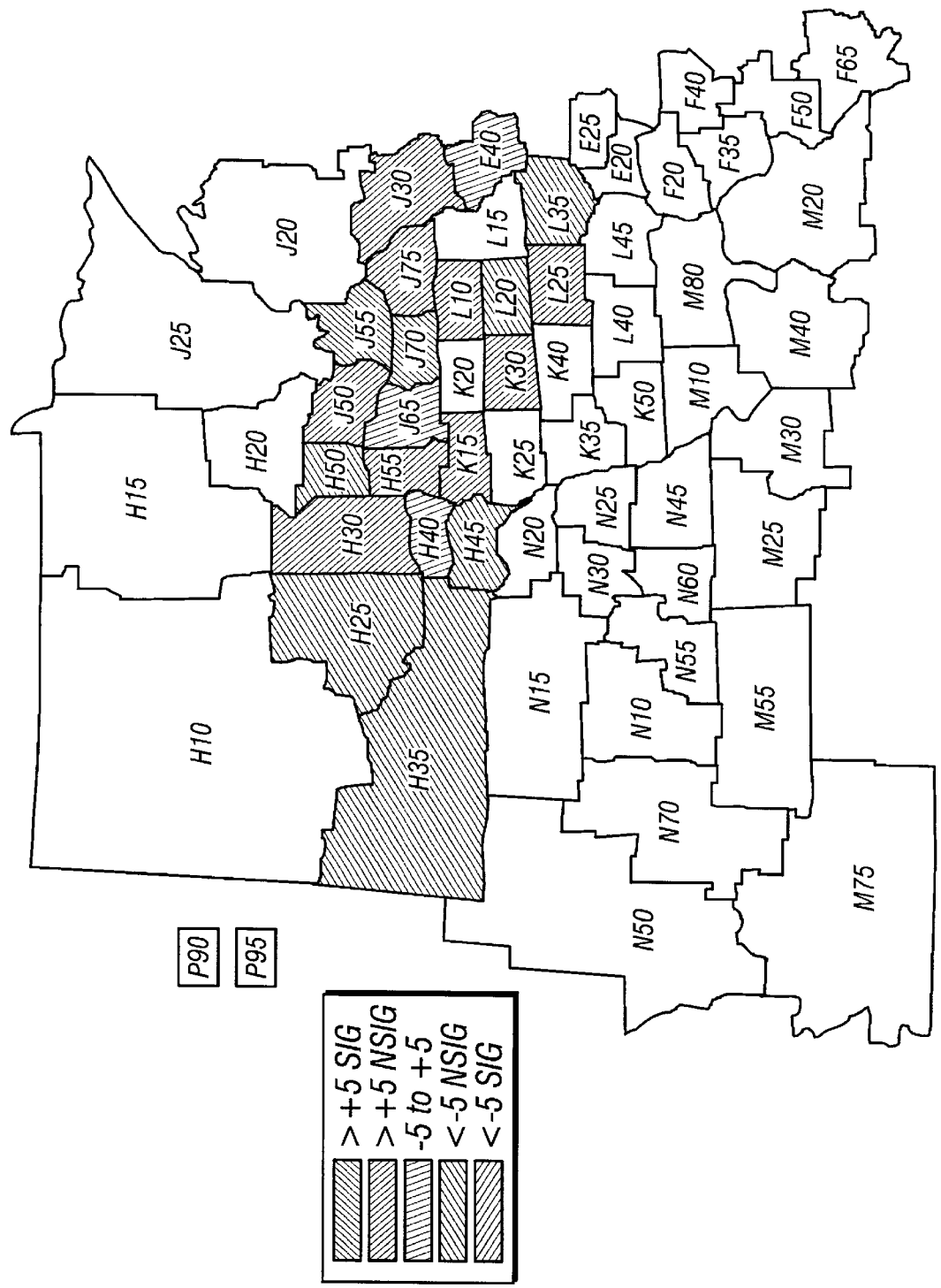
FIG. 9-A

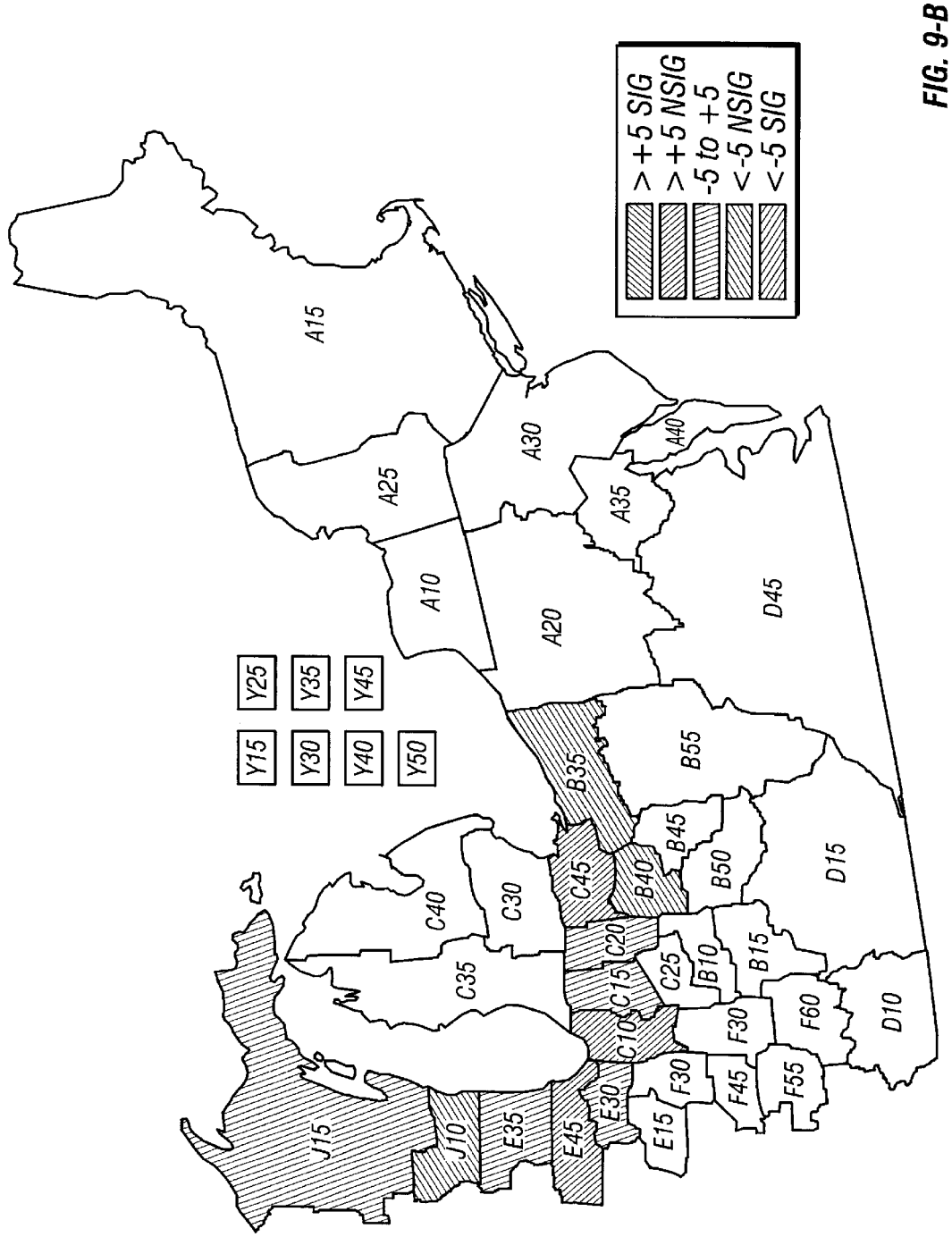
FIG. 9-B

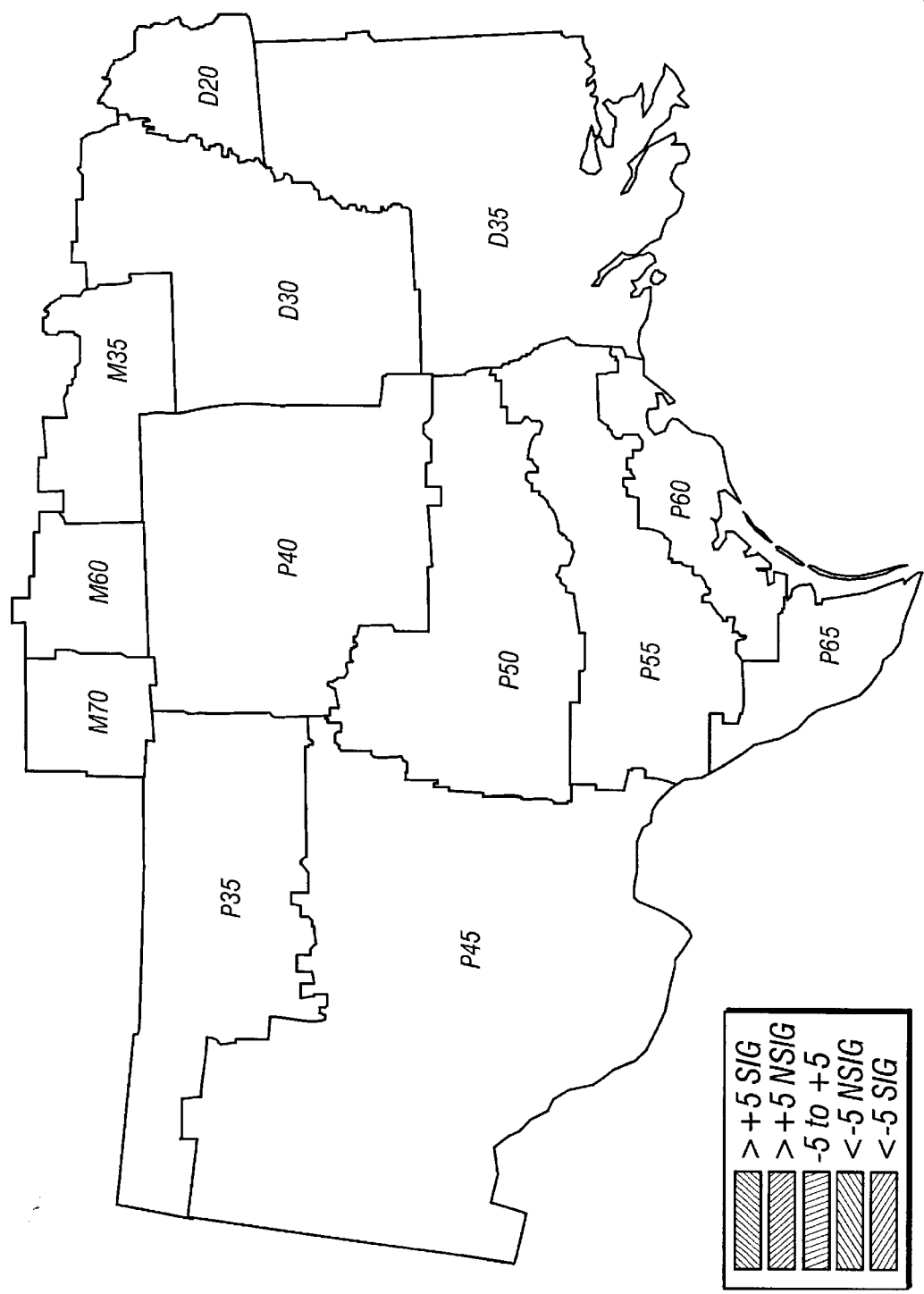
FIG. 9-C

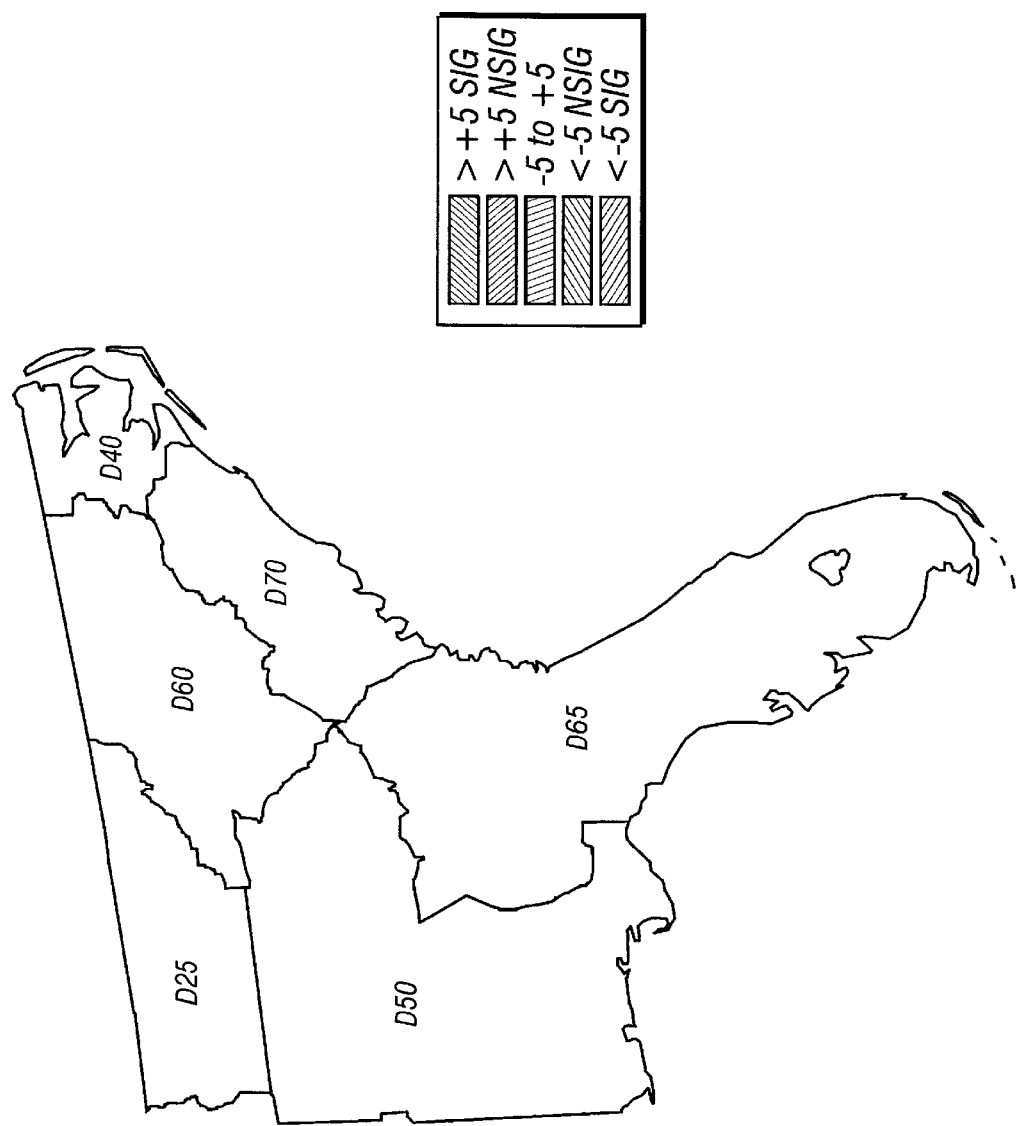
FIG. 9-D

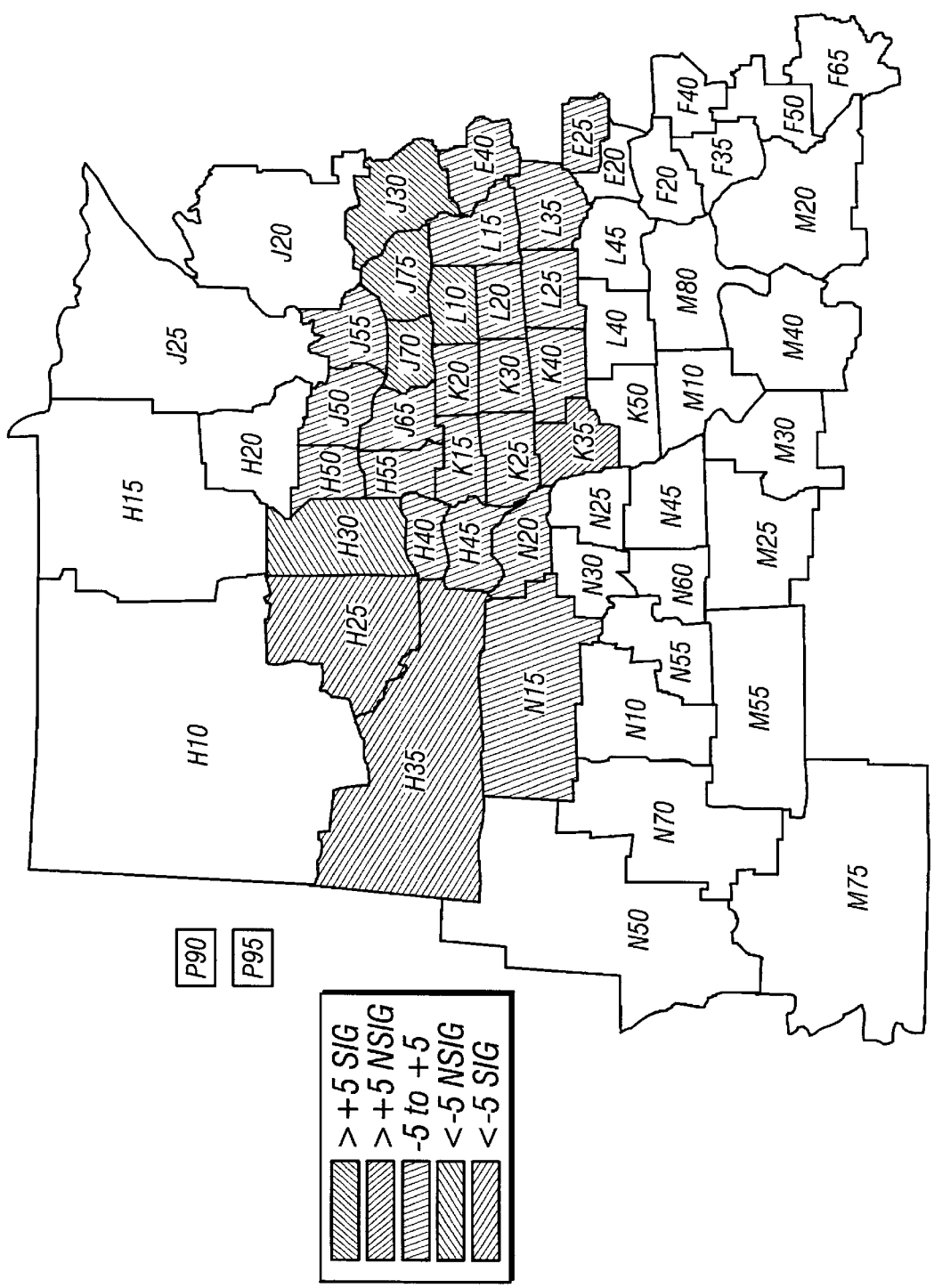
*FIG. 11-A*

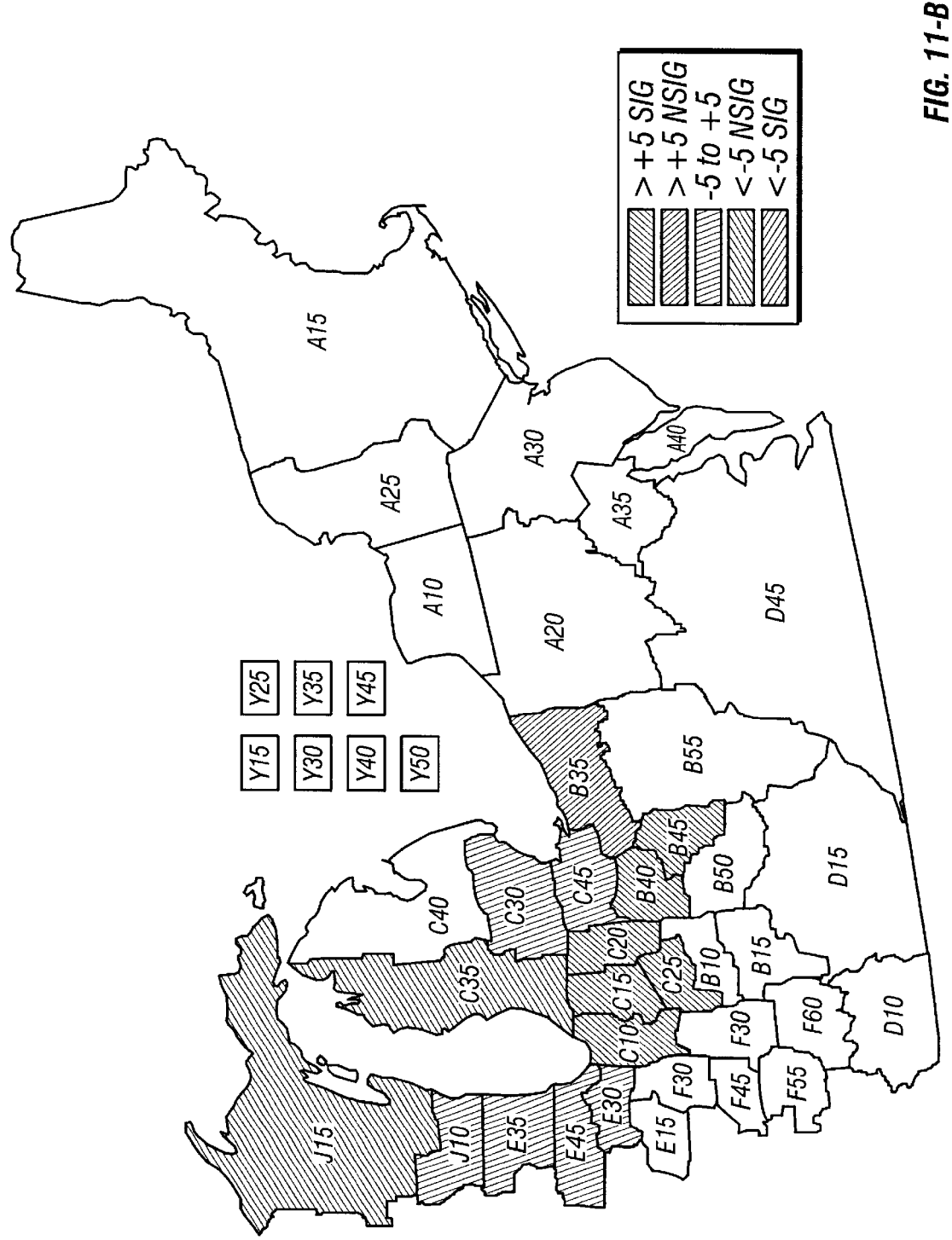
FIG. 11-B

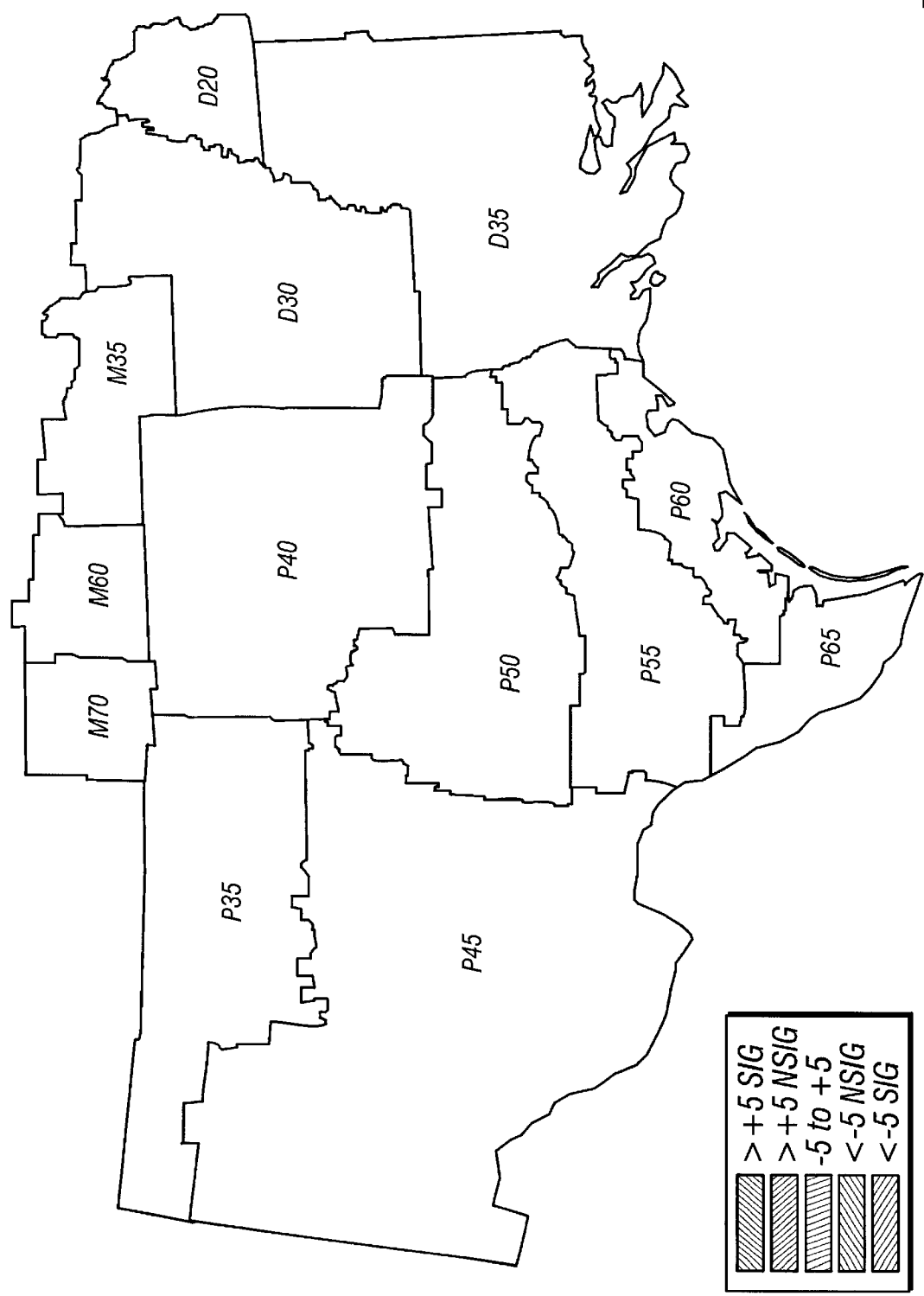
FIG. 11-C

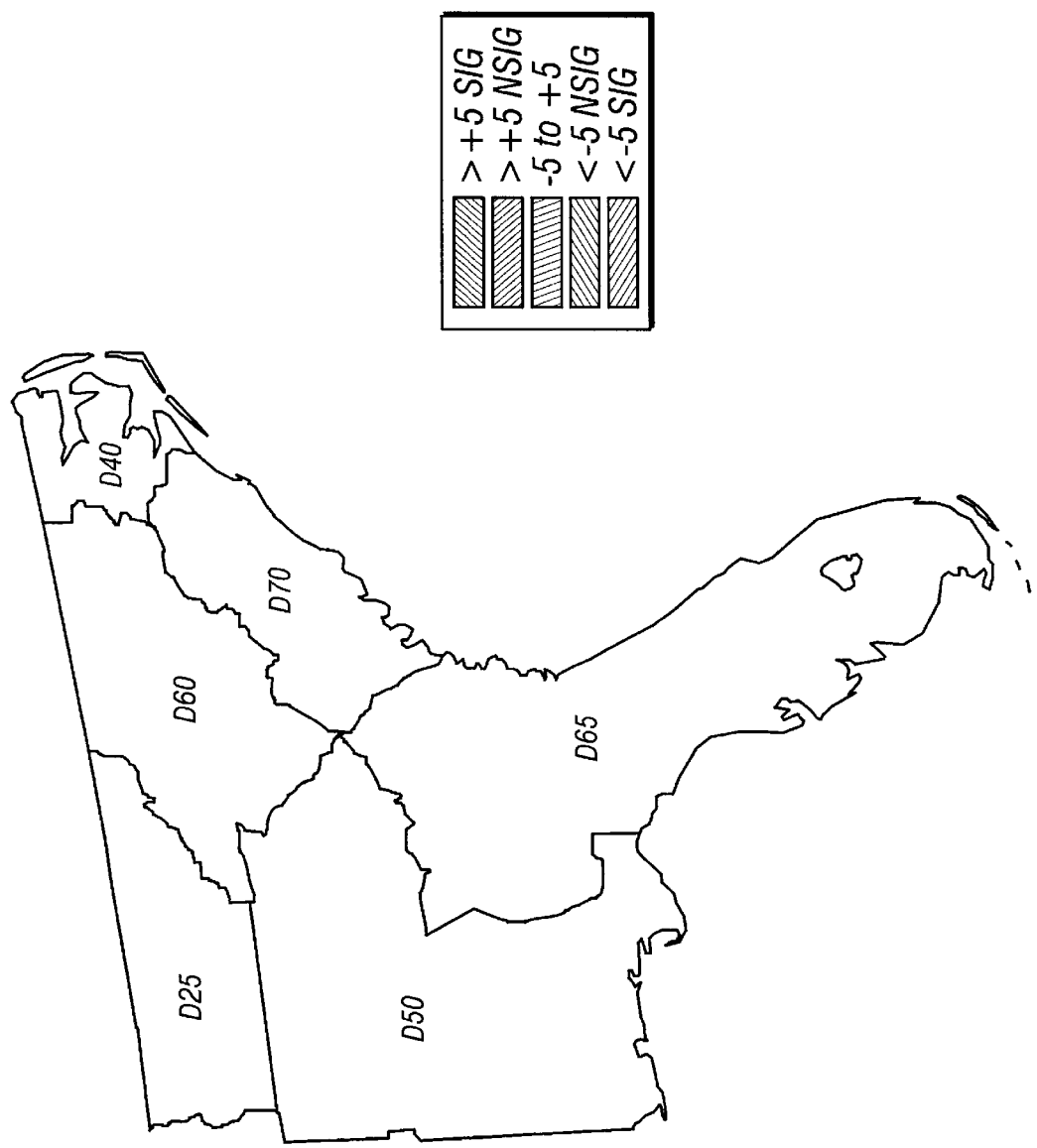
FIG. 11-D

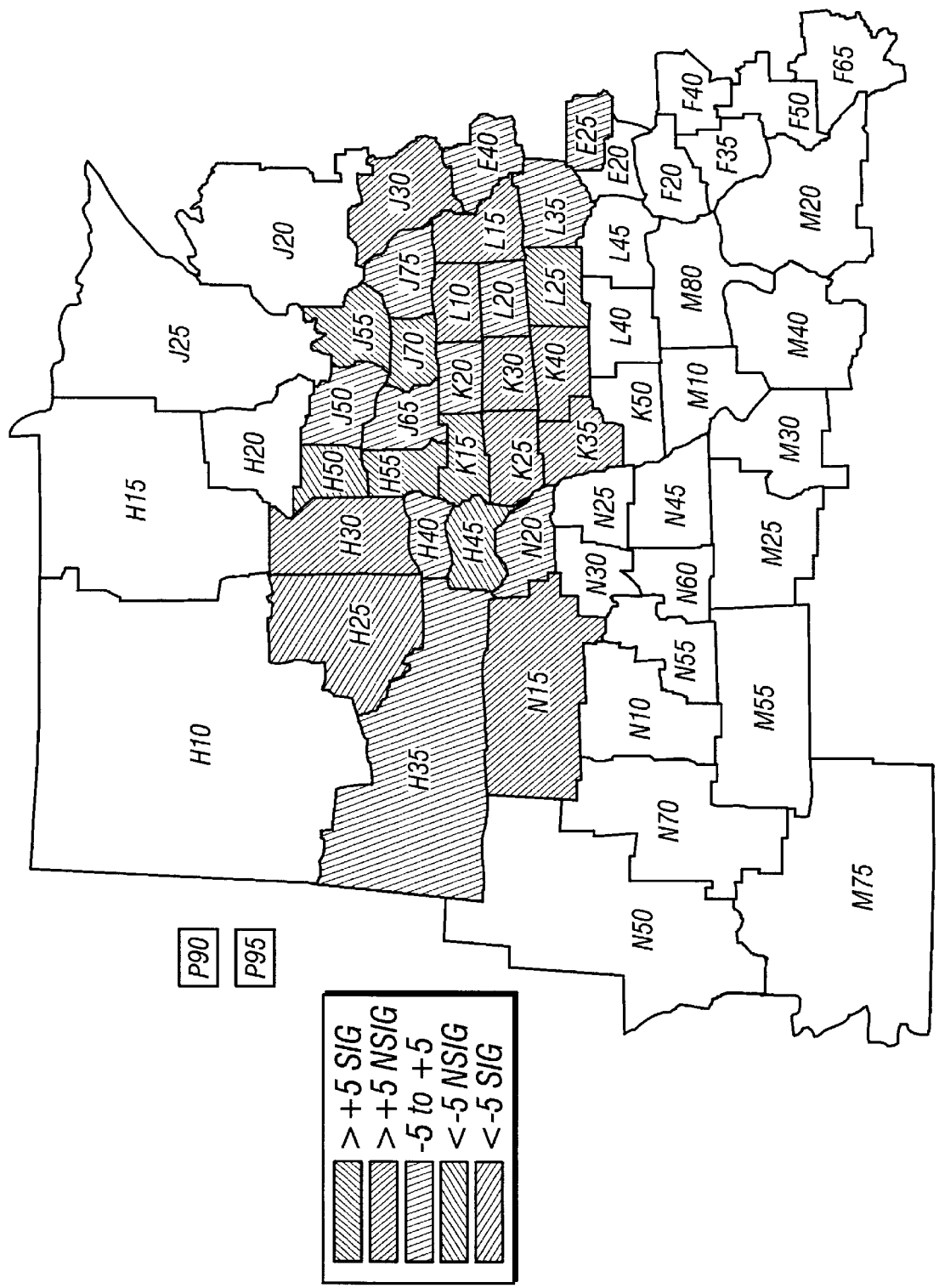
FIG. 12-A

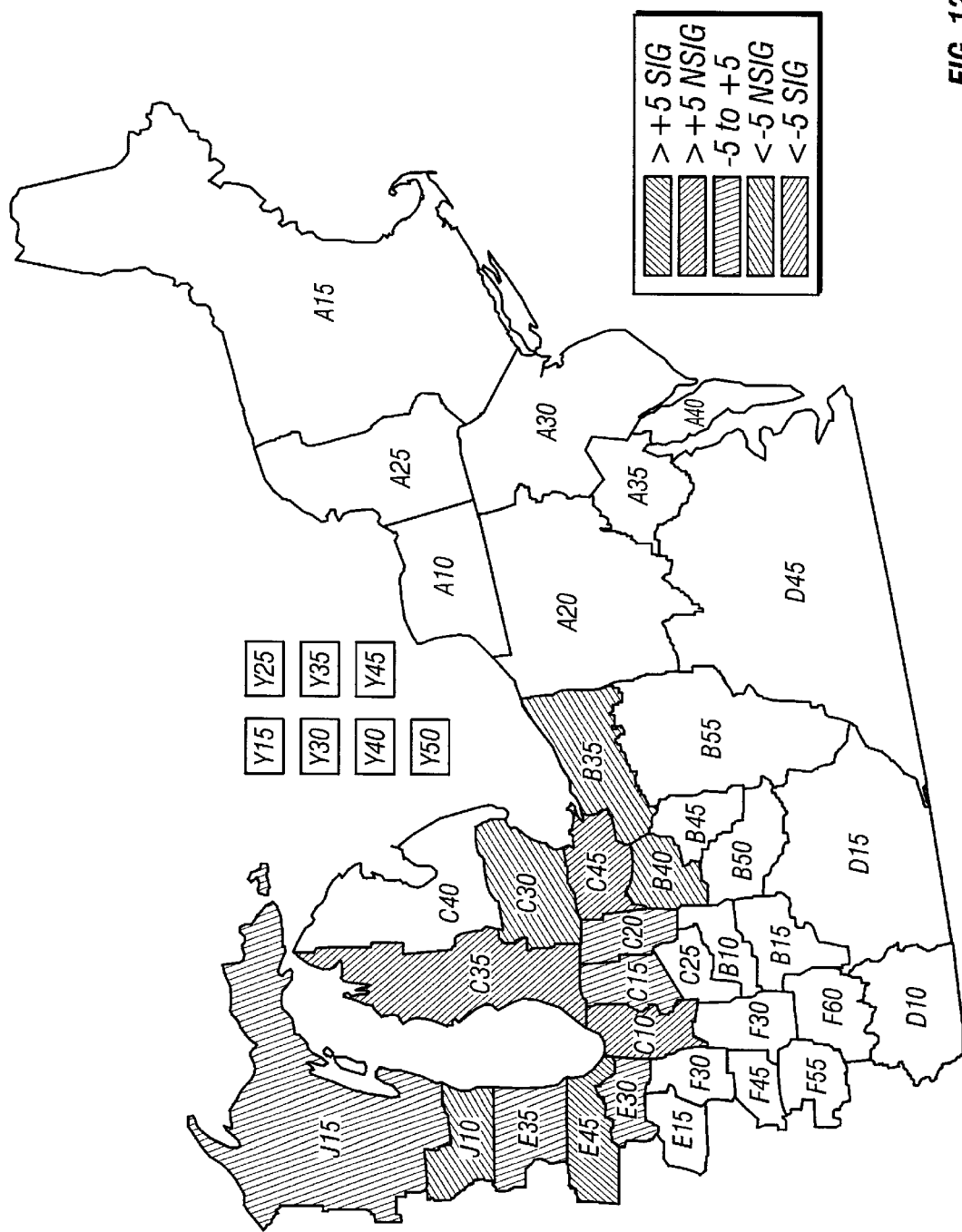
FIG. 12-B

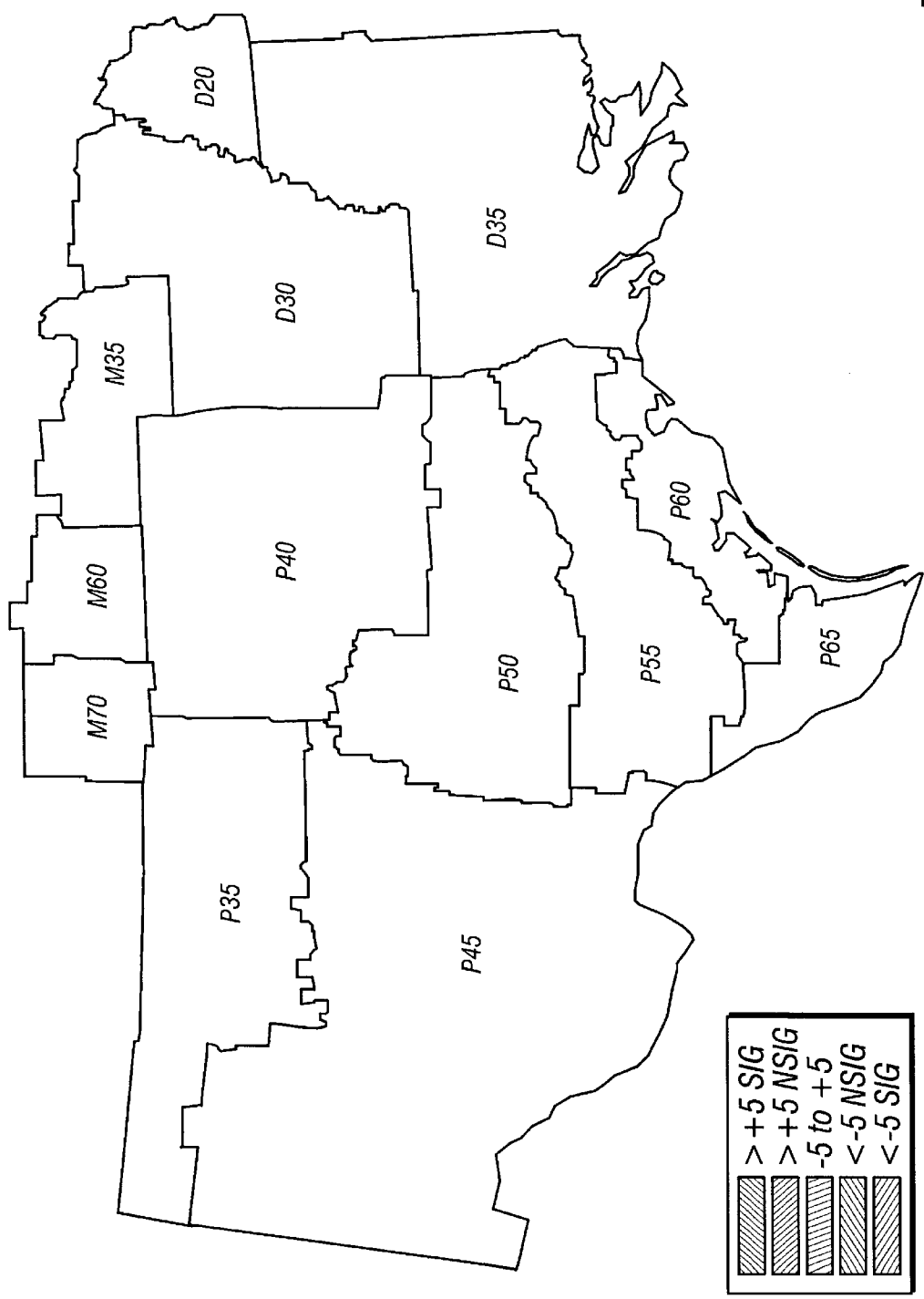
FIG. 12-C

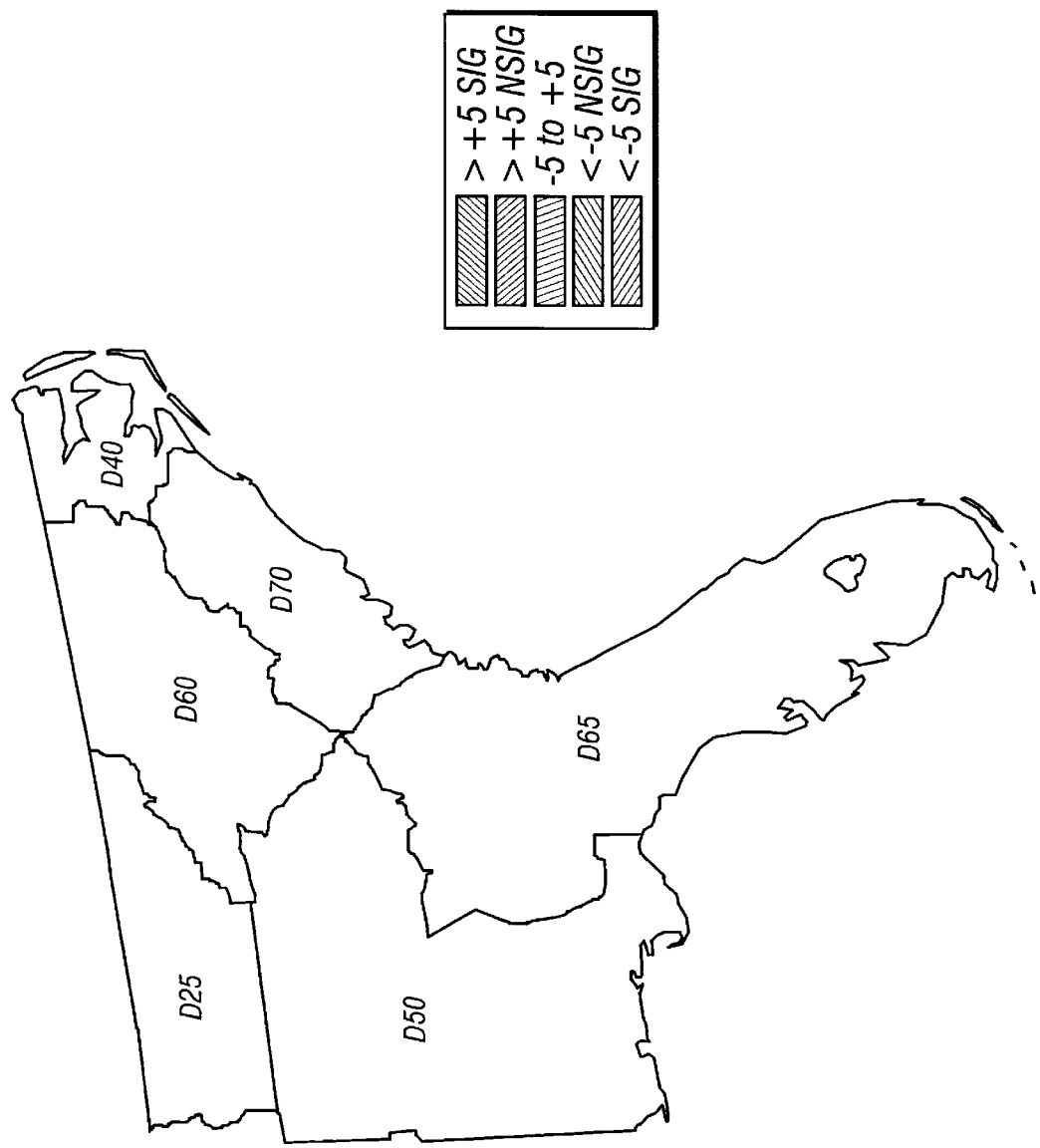
FIG. 12-D

METHODS AND SYSTEMS FOR PLANT PERFORMANCE ANALYSIS

This application claims priority to provisional patent application Serial No. 60/159,802 filed Oct. 15, 1999 entitled, "SYSTEM FOR PLANT PERFORMANCE ANALYSIS." The entire text of the above-referenced disclosure is specifically incorporated by reference herein without disclaimer.

BACKGROUND OF THE INVENTION

1. Field of the Invention

The present invention relates to a process of assessing the performance of crop varieties based on wide-area performance testing data. A process of the present invention compares varietal performance using spatial estimation and spatial prediction based on a statistical mixed effects model.

2. Description of Related Art

In the development of a new crop variety, performance data are collected on the variety and on other competing varieties. These performance data include measurements on various agronomic traits relevant to the given crop; e.g., for *Zea mays*, measurements taken on grain yield, grain moisture, and plant lodging.

In assessing the potential commercial value of a new crop variety (hereafter referred to as "variety"), its agronomic performance is compared to the agronomic performance of other varieties. The other comparison varieties include commercial and pre-commercial varieties from the company developing the variety and commercial varieties from competitor companies. Note that this same type of assessment is also performed on existing commercial varieties, to determine if they should remain on the market or be replaced by newer varieties in development.

Agronomic performance data for the new variety and for the comparison varieties come from multiple testing locations. The testing locations are usually widely distributed over the area of adaptation of the varieties included in the test. The area of adaptation covered by these testing locations is typically quite large, on the scale of hundreds of square miles. For example, a new *Zea mays* cultivar may be tested from western Iowa to eastern Michigan and from central Wisconsin to southern Illinois.

Due to variation in testing programs, the data for a given variety and its competitors tend to be quite 'unbalanced' in the sense that not all of the given set of varieties appear at all testing locations. Considering the testing data for a single pair of varieties, i.e., the new variety and a single competitor, some of the testing locations will have both of the varieties, while the rest will have only one of the two varieties.

These performance data are analyzed in order to determine the geographic regions over which the new variety has large enough performance advantages relative to the comparison varieties to justify its introduction to the market in those regions. Ideally, the variety under consideration will have a significant performance advantage relative to all of the comparison varieties over its entire area of testing. However, in some cases a variety may have performance advantages only on a regional basis, but it could still serve a significant market need within that region. Thus, it is important to characterize the performance of the given variety relative to other comparison varieties not only over the entire area where it was tested, but also within the various regions.

The variations in relative performance (performance difference) of two varieties in different geographic locations or regions arise from what is referred to as 'genotype by environment interaction' (Sprague & Eberhart, 1976). Genotype by environment interaction is caused by differential responses of varieties to environmental conditions. These environmental conditions may include, for example, day length, temperature, soil moisture, disease and insect pressure. Note that the term 'environments' can refer to different locations in a given year or different years for a given location or some combination of locations and years.

Methods involving traditional statistical analyses for varietal performance assessment are described in Bradley, et al (1988). These traditional methods are usually based on "location-matched" data, i.e., for a given variety relative to a comparison variety, data from only the testing locations where both varieties co-occur are used in the analysis. A paired t-test is used to test the hypothesis of no difference in performance of the two varieties. Moreover, for inferences regarding relative performance in a given geographic region, data from the testing locations only within that region are used in the analysis.

Traditional analysis using the t-test for location-matched data is inefficient for at least five reasons. First, it does not use all of the data; it only uses data from testing locations where both of the varieties co-occur. Second, for regional performance comparisons, it does not use data from nearby areas outside the region of interest. Third, it does not make use of covariates related to the performance trait of interest (e.g., irrigation or soil series) to help explain and predict the differences. Fourth, it only uses within-year data in the analysis model; more robust inferences can be accomplished by having a model that uses data from multiple years. Fifth, it is based on an incorrect assumption that the observations from one testing location are independent of those from other locations.

There are two broad reasons why the inefficiencies, listed above, are limitations in wide-area crop assessment. First is efficient use of the data. It is natural for the experimenter to want to use all of the data when making inferences. In the present scenario, this includes data on a variety at a location where the other variety does not occur, it includes data from areas that are in proximity to the region of interest, it includes data on covariates, and it includes data across years. Statistical methods should strive to make full use of all available information. The second reason that the traditional analysis is limited is that it is based on the classical assumption that data are independent Varietal performance data almost invariably violate the assumption of independence and render the statistical inference invalid, typically causing one to infer that the variety differences exist when the data do not really justify it.

Review of Current Literature

A brief review of current literature also highlights underlying deficiencies in the art, which the present invention strives to solve.

One of the most relevant papers and probably the most noteworthy work in the area of application of spatial statistics to field plot experiment is by Zimmerman and Harville (1991), where the authors have introduced the so-called random field linear model (RFLM) by considering the observations as realization of a random field. In this model the trend is modeled by a mean structure and the small scale dependence is modeled through spatial autocorrelation structures. The parameter estimation is done through a likelihood approach. Through real data analysis, the authors have tried to demonstrate the superiority of their model over nearest neighbor analysis (NNA) approach. Note that their study is exclusively in the context of small area estimation where the range of spatial dependence is confined to a testing location.

Another noteworthy paper in the context of the use of covariate in spatial prediction is by Gotway and Hartford (1996), where the authors have presented the use of auxiliary or secondary variable(s) in spatial prediction by applying cokriging to predict soil nitrate level with data on grain yield as a covariate. Through an application of their method to data from a test site, they have demonstrated the benefit of their method over the more traditional external drift method. Again the scope of their study is limited to intra-site prediction.

One of the recent papers that deal with multi-location yield trials is by Cullis et.al. (1998). In this paper the authors have proposed a method for spatial analysis for multi-environment early generation variety trials. The method uses best linear unbiased prediction (BLUP) for genotype effect and genotype by environment interaction effect and REML for the spatial parameters and variance components. However, the proposed method is based on separately modeling the covariance structure for each trial, i.e., no across-trial correlation is taken into consideration.

Yost, Uehara and Fox (1982a and 1982b) were one of the first researchers in agricultural sciences to publish in the area of application of geostatistics to soil chemistry over large land area. In two consecutive publications they reported results of studies on spatial prediction of soil chemistry across the island of Hawaii. However, their study was limited to kriging only and did not consider any aspect of cokriging. Moreover, no other type of variables other than selected soil chemistry variables were used in their studies. Another similar but relatively more recent work in the area of soil science that is worth-mentioning is by Ovalles and Collins (1988). The authors used universal kriging to study spatial variation of selected soil properties in the entire northwest Florida covering an approximate area of 380 km by 100 km with a reported auto-correlation range of approximately 40 km. No attempt of any spatial estimation or cokriging was done in their study.

One of the papers that deal with spatial prediction of crop yield is by Bhatti, Mulla and Frazier (1991). The authors used an experimental field with approximate dimension of 655 meters by 366 meters to study wheat yield along with soil organic matter and soil phosphorus content. Kriging and cokriging were used to predict yield. However, the study was limited to a single experimental field, and therefore it did not contain any aspect of modeling of large scale trend that usually exists in wide-area testing. Another paper in the area of spatial analysis of crop yield is by Brownie, Bowman, and Burton (1993). In this paper, the authors have compared three alternative spatial methods: trend analysis, nearest neighbor Papadakis analysis, and correlated error analysis to study spatial variation in yield data on corn (Zea mays) and soybean (Glycine max). As in the case of other existing studies on crop yield, their study is also intra-site, i.e., it does not consider spatial correlation across experimental sites. In fact, the authors, as a concluding remark in their paper, have noted that no across-sites spatial analysis, where data from multiple locations are combined for analysis, exists in the literature with respect to data on crop yield.

Other papers related to spatial analysis of crop yield also exist in the literature. Bhatti, Mulla, Kooehler and Gurmani (1991) have used semi-variogram to identify spatial autocorrelation in crop yield. They show the effectiveness of NNA in removing spatial variability by studying the semi-variogram before and after the application of NNA. The scope of their study is again limited to intra-site analysis with the maximum range of spatial autocorrelation being approximately 20 meters. Moreover, no aspect of spatial estimation or prediction is covered in their study. Wu et. al. (1997) have compared the so-called first difference with errors in variables (FD–EV) method (Besag and Kempton, 1986) to the more traditional Papadakis nearest neighbor method and classical randomized complete block (RCB) analysis in terms of elimination of spatial variation in yield data from cereal breeding trials. However, their approach does not require pre- specified model for trend and the spatial autocorrelation structure. Moreover, their study is confined to only intra-site spatial variation.

Stroup, Baenziger and Mulitze (1994) have used data from breeding nurseries to compare the traditional RCB analysis, NNA, and the random field linear model analysis (Zimmerman and Harville, 1991) in terms of comparison of treatment effects through effective removal of noise due to spatial variability. Naturally, their study of spatial correlation is limited to data within each nursery.

A paper by Gotway and Stroup (1997) is unique in that the authors have extended the theory of generalized linear model to include spatial estimation and prediction of discrete and categorical spatial variables. They have applied their extensions to two data sets, one on plant damage due to insects and the other on weed count. However, as in the case of all other studies, the scope of their study and its application are limited to data within each experimental site.

In the above paragraphs, a review of the literature that currently exists in areas relevant to the present invention has been presented. The ensemble of research work in these areas can be broadly classified into two categories: (a) application of geostatistics and spatial statistics to areas of soil sciences in wide and small area testing, and (b) application of geostatistics and spatial statistics to crop response analysis to intra-field small area testing. The existing literature lacks the presence of research in the area of crop response analysis (e.g., Zea mays grain yield) in the context of wide area testing where the range of spatial correlation extends beyond individual experimental sites.

In the assessment of performance of crop varieties, it is essential that the conclusion be drawn across environments, i.e., across broad geographic regions covering multiple test sites. In the literature review, it should also be noticed that the existing literature does not address the use of both spatial estimation and spatial prediction in any study. In contrast, and as will be discussed in detail below, the current invention concerns a novel approach to the problem of variety assessment in that not only it is based on multi-environment wide area testing, it also has two components to answer two distinct questions: (a) an estimation component to answer the question of long term average performance of a variety or performance difference of two varieties, and (b) a prediction part to answer the question on performance of a variety or performance difference of two varieties at given points in time (year), and/or at given points in space (geography). The methodology behind the present invention takes into account large scale trend through universal kriging and universal block kriging and readily incorporates use of covariates through cokriging. The current literature lacks any work that combines all of the above features into a unified approach for the study of performance of crop varieties.

Problems enumerated above are not intended to be exhaustive, but rather are among many that tend to impair the effectiveness of previously known techniques concerning crop performance analysis. Other noteworthy problems may also exist; however, those presented above should be sufficient to demonstrate that methodology appearing in the art have not been altogether satisfactory.

SUMMARY OF THE INVENTION

Embodiments of the present invention employ a statistical model called a linear mixed model along with geostatistical methods to assess the performance of a crop variety from wide-area testing data. Crop performance may be assessed by measuring commercially important traits such as (but not limited to) yield, grain moisture, and plant lodging. In addition to the presence of variety main effect and the variety specific trend components as fixed effects, the mixed model that is employed in the present invention also allows the use of covariates such as year, soil type, irrigation, etc., as fixed effects in the model. Furthermore, it allows the use of random effects such as testing location, that can help explain the variation in crop performance. The residual variation that is not explained by the fixed and the random effects is modeled using geostatistical methods. The geostatistical models take into account the spatial autocorrelation in the data and allow valid confidence intervals to be obtained to assess uncertainty in the estimates and predictions.

Embodiments of the present invention have two distinct components: spatial estimation, and spatial prediction. The estimation component may be used as follows.

(1) Point estimation: estimate the long-term expected performance of a variety or performance difference between varieties and compute the associated standard errors at a each of a plurality of spatial locations Use these point estimates to construct a surface for performance or performance difference over a wide geographical area (e.g., collection of counties or states).

(2) Block estimation: estimate the long-term expected performance of a variety or performance difference between varieties and compute the associated standard errors over each of one or more given geographical areas such as market districts.

The prediction component may be used as follows.

(1) Point prediction: predict the average performance of a variety or performance difference between varieties and compute the associated standard errors at a each of a plurality of spatial locations and at each of one or more given time periods (years). Use these point predictions to construct a surface for performance or performance difference over a wide geographical area (e.g., collection of counties or states).

(2) Block prediction: predict the average performance of a variety or performance difference between varieties and compute the associated standard errors over each of one or more given geographical areas such as a market districts and at each of one or more given time periods (years).

Estimation and prediction of varietal performance, as described above, are required in decision making for selection of newly developed varieties which have the best performance compared to other varieties. Decisions need to be made about whether to bring a candidate variety to commercial status, and if so, to position it in appropriate geographies where it will perform well against its competitors.

From a marketing stand point, quantitative assessment of relative performance of a variety is required for two distinct reasons, first, for introducing a new variety into the market by advancing the variety to commercial status, and second, for decision making on replacement of an existing commercial variety by a new variety that shows better relative performance.

One of the most important criteria on which the above decisions are based on is the expected long-term performance advantage of a variety. This is required for assessing the commercial value of the variety in the marketplace where the value of a variety is measured over its entire lifetime on the market. The estimation component of the present invention provides answer to this question through an assessment of the long-term relative performance of a variety at a given location or over a given geographic region.

The prediction component of the present invention allows assessment of the performance of a variety and the performance difference between varieties in a given year and at a given location or over a given geographic region. This space- and/or time-specific performance assessment is necessary in determining the consistency of performance or relative performance of a variety across space and/or time. Consistency of performance, which is called "variety stability" in plant breeding terminology, is a very desirable attribute for a commercial variety.

Advantages of the present invention over traditional methods of wide-area testing include the following. First, it does not require that the data be location-matched (each location in the data set contains observations on both varieties), instead, it uses data from all testing locations having at least one of the varieties under consideration. Second, for regional performance assessment, it is not restricted to data from within the region. Instead, it also uses data from test locations in surrounding regions. Third, it readily incorporates information on covariates, which are related to the primary trait of interest (e.g., data on soil series when yield is the primary trait of interest). Fourth, it uses a model that can accommodate multiple year data by incorporating year as a model factor. Fifth, it does not assume independence of observations coming from different testing locations. Instead, it utilizes the spatial dependence between the testing locations to provide improved statistical inferences.

Steps in one embodiment of the present invention may be summarized as follows:

1. Construct a database of wide-area performance of crops that includes names and spatial coordinates of testing locations, geographic areas in which the testing locations reside, names and performance trait values of a number of varieties, and names and values of the covariates.
2. Select two varieties for comparison, e.g., a 'head' variety under consideration for advancement to commercial status and a 'competitor' variety, which is already in the market.
3. Remove outliers from the data on the two varieties by visual inspection and by using statistical tests based on the hat matrix, and Cook's D.
4. Choose a spatial covariance model for the linear mixed model.
5. Estimate the spatial covariance parameters and other fixed and random effect parameters of the linear mixed model.
6. Use the estimated parameters to
   (a) estimate the across-years average or predict the yearly,
   (b) continuous surface, or block averages over geographical regions,
   (c) for a performance trait of each variety, or the difference in the performance trait between varieties, and
   (d) obtain standard errors of estimates or predictions.
7. Use the estimates and the predictions, along with their standard errors for assessment of variety performance, e.g., for the assessment of the relative performance of the head variety for taking decision on its advancement to commercial status.

In one respect, the invention is a method for assessing wide-area performance of a crop variety using a linear mixed model that incorporates geostatistical components and includes parameters for fixed effects, random effects and covariances. By "wide area," it is simply meant the putative area of a tested variety. For instance, by "wide area," it may be meant the area of adaptation of a tested variety, which may include many testing locations. By "crop variety," it is meant a cultivar of a given plant species and any other usage as is known in the art. A wide-area database is constructed that includes spatial coordinates of testing locations of one or more crop varieties and performance trait values of one or more crop varieties. By "database," it is meant any collection of data. For instance, a "database" may refer to an electronic collection of data that is searchable. By "performance trait value," it is meant any agronomic trait of interest associated with a particular variety. For instance, "performance trait value" may refer to any number of traits known in the art. For example, it may refer to grain yield, grain moisture, or plant lodging of, for instance, Zea mays. The parameters for the fixed effects, random effects and covariances are estimated by fitting the linear mixed model with data in the wide-area database. Long-term expected performance of the crop variety is estimated for each of one or more given spatial locations using the parameter estimates. By "estimating long-term expected performance," it is meant estimating a value of an agronomic trait of a variety as that phrase is known in the art. This estimate, by definition not being dependent on any given time period, can still be used to characterize expected performance over a commercially-relevant time period, e.g., the time the variety is on the market. 'Time period' may refer to, for example, a year, a collection of years, or any other period.

In other respects, the database further may also include covariate data. The estimating long-term expected performance may include estimating long-term expected performance differences between the crop variety and another crop variety. The estimating the parameters may include a method of restricted maximum likelihood. The estimating long-term expected performance may include a method of generalized least squares. The method may also include removing data from the database using a method of leverage or Cook's Distance prior to estimating the parameters. The method may also include calculating a standard error associated with the long-term expected performance. The method may also include forming an output of the long-term expected performance. The output may include text output. The output may include graphical output. The graphical output may include a contour plot representing a continuous surface of long-term expected performance.

In another respect, the invention is a method for assessing wide-area performance of a crop variety using a linear mixed model that incorporates geostatistical components and includes parameters for fixed effects, random effects and covariances. A wide-area database is constructed that includes spatial coordinates of testing locations of one or more crop varieties, geographic areas in which the testing locations reside, and performance trait values of one or more crop varieties. The parameters for the fixed effects, random effects and covariances are estimated by fitting the linear mixed model with data in the wide-area database. Long-term expected performance of the crop variety is estimated for each of one or more given geographic areas using the parameter estimates.

In another respect, the invention is a method for assessing wide-area performance of a crop variety using a linear mixed model that incorporates geostatistical components and includes parameters for fixed effects, random effects and covariances. A wide-area database is constructed that includes spatial coordinates of testing locations of one or more crop varieties and performance trait values of one or more crop varieties. The parameters for the fixed effects, random effects and covariances are estimated by fitting the linear mixed model with data in the wide-area database. Average performance of the crop variety is predicted for each of one or more given spatial locations and for each of one or more given time periods using the parameter estimates. By "predicting average performance," it is simply meant predicting a value of an agronomic trait of a variety for a given geographic locations and for a given time period and the normal usage of that phrase as known in the art.

In other respects, the estimating the parameters may include a method of restricted maximum likelihood. The predicting average performance may include the method of universal kriging. The database may also include covariate data. The covariate data may include one or more response variables. The predicting average performance may include the method of universal cokriging. The covariate data may include only one or more fixed effects. The predicting average performance may include the method of universal kriging. The predicting average performance may include predicting average performance differences between the crop variety and another crop variety. The method may also include removing data from the database using a method of leverage or Cook's Distance prior to estimating the parameters. The method may also include calculating a standard error associated with the predicted average performance. The method may also include forming an output of the predicted average performance.

In another respect, the invention is a method for assessing wide-area performance of a crop variety using a linear mixed model that incorporates geostatistical components and includes parameters for fixed effects, random effects and covariances. A wide-area database is constructed that includes spatial coordinates of testing locations of one or more crop varieties, geographic areas in which the testing locations reside, and performance trait values of one or more crop varieties. The parameters for the fixed effects, random effects and covariances are estimated by fitting the linear mixed model with data in the wide-area database. Average performance of the crop variety for each of one or more given geographic areas and for each of one or more given time periods is predicted using the parameter estimates.

In another respect, the invention is a method of hybrid development. A hybrid is developed. Performance data for the hybrid and a comparison hybrid is obtained. A cubic polynomial surface is fitted to the performance data for each hybrid using the method of generalized least squares and modeling the residual variance using a spherical variogram. The performance of the new and comparison hybrid is compared.

In another respect, the invention is a system including a computer and a program. The program executes on the computer and includes program code for: fitting a cubic polynomial surface to the performance data for each hybrid using the method of generalized least squares; modeling the residual variance using a spherical variogram; and comparing the performance of the new and comparison hybrid.

As will be understood with the benefit of this disclosure, point prediction, block prediction, point estimation, and block estimation may be combined in any number of different permutations to obtain valuable performance assessments. All such combinations fall within the scope of this invention.

BRIEF DESCRIPTION OF THE DRAWINGS

The present invention is illustrated by way of example and not limitation in the accompanying figures, in which:

FIG. 2 is a choropleth map showing the block predictions of yield difference within each of a number of geographic regions for two commercial hybrids, DK512 and DK527, in 1996. Patterns on the choropleth map indicate both the level of yield difference (−3, 0, +3 bushels/acre) and whether the difference is statistically significant at the 5% level.

FIG. 3 is a choropleth map showing the simple mean yield difference within each of a number of geographic regions for two commercial hybrids, DK512 and DK527, in 1996. Patterns on the choropleth map indicate both the level of yield difference (−3, 0, +3 bushels/acre) and whether the difference is statistically significant at the 5% level.

FIGS. 4, 5, 6 show the same information as FIGS. 1, 2, and 3, respectively, for the year 1997.

FIGS. 7, 8, 9 show the same information as FIGS. 1, 2, and 3, respectively, for the year 1998.

FIG. 11 is a choropleth map showing the across-years block estimates of yield difference within each of a number of geographic regions for two commercial hybrids, DK512 and DK527, for the years 1996, 1997, and 1998. Patterns on the choropleth map indicate both the level of yield difference (−3, 0, +3 bushels/acre) and whether the difference is statistically significant at the 5% level.

FIG. 12 is a choropleth map showing the across-years simple mean yield difference within each of a number of geographic regions for two commercial hybrids, DK512 and DK527, for the years 1996, 1997, and 1998. Patterns on the choropleth map indicate both the level of yield difference (−3, 0, +3 bushels/acre) and whether the difference is statistically significant at the 5% level.

DESCRIPTION OF ILLUSTRATIVE EMBODIMENTS

Figure 1:
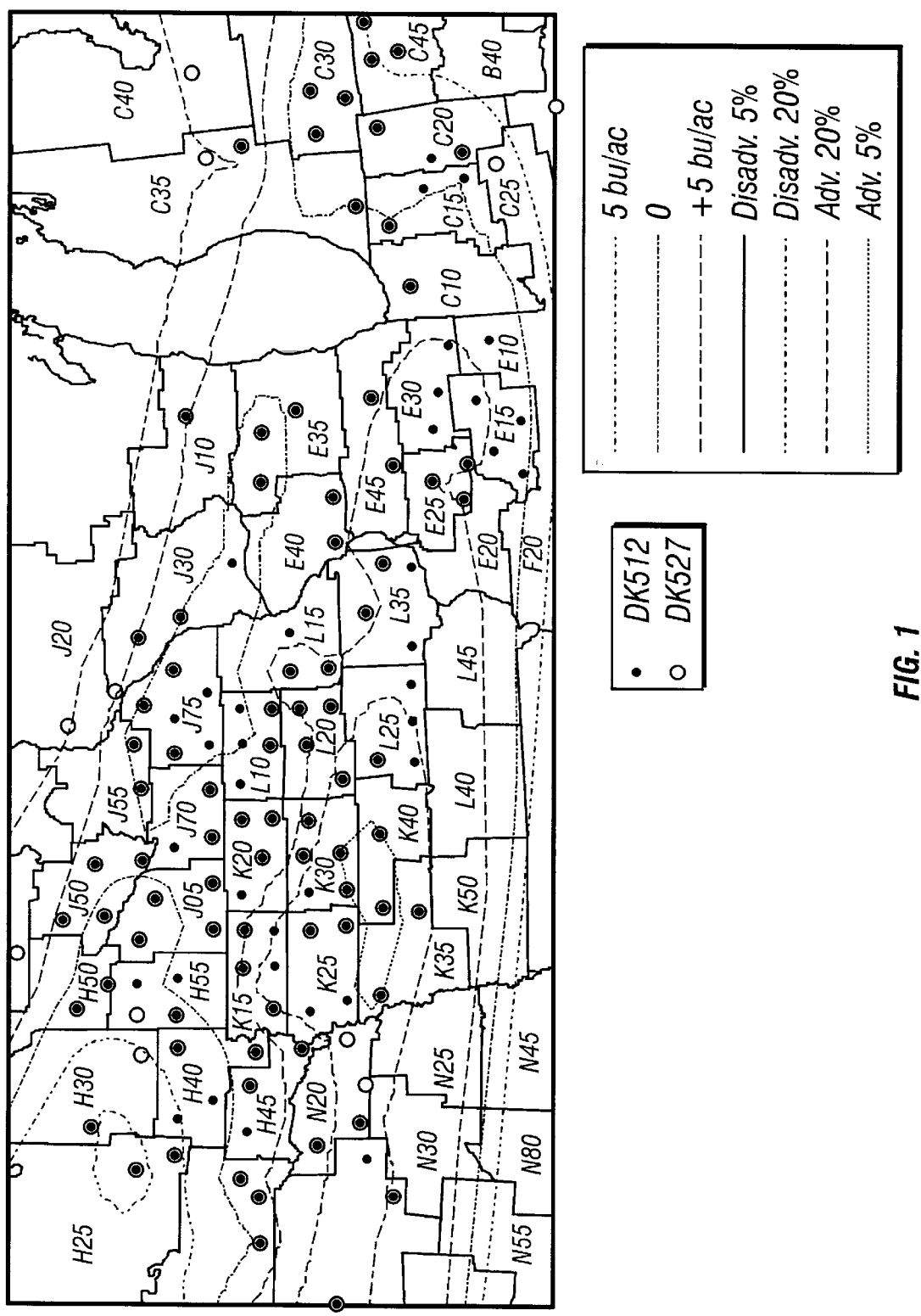
FIG. 1 is a contour plot showing the prediction surface of yield difference for two commercial hybrids, DK512 and DK527, in 1996. Three yield difference contours (−5, 0, and +5 bushels/acre) and four statistical significance level contours (5% and 20% for both positive and negative yield difference) are shown. Also shown are the testing locations for the two hybrids and market district boundaries and names.

Reference will now be made in detail to the preferred embodiments of the disclosed device, examples of which are illustrated in the accompanying drawings.

The present invention addresses all five of the limitations of the traditional methods of statistical analysis mentioned above in the description of related art. First, it does not require location-matched data. Instead, it uses data from all testing locations having at least one of the varieties in the test. Second, it is not restricted to data from within the region for regional performance assessment. Instead, it also uses data from test locations in surrounding regions. Third, it uses covariates readily. Fourth, it uses a model that can accommodate multiple year data by incorporating year as a model factor. Fifth, it does not assume independence of observations coming from different testing locations. Instead, it utilizes the spatial dependence between testing locations to provide improved statistical inferences.

It is rather natural to expect spatial correlation in variety performance data because of the sensitivity of the varietal response to environmental conditions. However, to make a quantitative assessment of the extent of spatial correlation in variety performance data, especially in yield data, a study was conducted on Zea mays yield data from Monsanto (DEKALB) corn research system. Three years of historical yield data (1994–1996) involving numerous Zea mays varieties were analyzed. The analysis results revealed that data from approximately 80% of the varieties had strong spatial auto-correlation as evidenced by large positive range for the fitted covariance models (Bhatti, Mulla, Kooehler and Gurmani, 1991). This result was supported by a mixed model analysis of Zea mays yield data from the years 1994 and 1995, where a likelihood ratio test was conducted for each individual variety to test for significance of spatial auto-correlation. On the average, 75% of the varieties showed significant auto-correlation in their data.

The present invention uses a statistical model that gives the ability to do both spatial estimation and spatial prediction, which provide some distinct advantages over traditional methodologies for the assessment of varietal performance. Spatial estimation allows assessment of the long-term average performance of varieties and of varietal differences. This information is of value in determining whether there is some long-term performance advantage of a given variety relative to other competing varieties. This can be determined at specific locations, or over larger regions. This is required for assessing the commercial value of the variety in the marketplace where the value of a variety is measured over its entire lifetime on the market. Spatial prediction allows assessment of performance and performance difference of varieties at given points in time (year), and/or at given points in space (geography) or points in space aggregated into larger regions. This space- and/or time-specific performance assessment is useful in determining the consistency of varietal performance across space and/or time. Consistency of performance, which is called variety stability in plant breeding terminology, is a very desirable attribute for a commercial variety. The stability issue can be addressed by conducting mixed model analysis of varietal performance (Littell et. al., 1996, p. 250).

The present invention incorporates geostatistical models into a method for comparing varietal performance. A geostatistical model uses sample points taken at different locations in a landscape and creates (interpolates) a continuous surface from the sample points. The sample points are measurements of some phenomenon, such as the level of an air pollutant or the grade of ore from a geological core. Credit for the origin of geostatistics comes from several sources. Interpolation using covariance, which is also called best linear unbiased prediction (BLUP), came from Wold (1938), Kolmogorov (1941), Wiener (1949), Gandin (1959) and Goldberger (1962). Interpolation using variograms is attributed to Gandin (1959, 1963) and Matheron (1962, 1969). Cressie (1990) has given more details on the origins of geostatistics. Geostatistics was originally applied to the area of mining, followed by application to areas such as meteorology and environmental sciences. In recent years, it has been applied in agriculturally-related areas such as the modeling of soil properties and crop yield.

Mixed Effect Models

The "mixed effects model" forms the context for understanding the present invention and should therefore be discussed in some detail to provide the reader with contextual information relevant to embodiments discussed herein. Consider the following general model:

$$y = X\theta + Dr + \epsilon, \quad [1]$$

where y is the vector of responses, $\theta$ is a vector of unknown fixed effect parameters, r is a vector of unknown random effect parameters, X and D are known design matrices, and $\epsilon$ is a vector of unknown random error components. This model is called a mixed effects model or more simply a "mixed model" because it has both fixed and random effect parameters. It is assumed that r and $\epsilon$ are normally distributed with $$E\begin{pmatrix} r \\ \varepsilon \end{pmatrix} = \begin{pmatrix} 0 \\ 0 \end{pmatrix}, \text{ and} \quad [2]$$

$$\operatorname{var}\begin{pmatrix} r \\ \varepsilon \end{pmatrix} = \begin{pmatrix} G & 0 \\ 0 & \Sigma \end{pmatrix}. \quad [3]$$

In the following paragraphs, it is shown how the geostatistical models are related to the mixed model.

Mixed Model in Geostatistics

Geostatistics assumes a spatial linear model given by, $$Z(s) = \mu(s) + \epsilon(s), \quad [4]$$

where the vector s contains spatial coordinates (e.g., latitude and longitude) and denotes the spatial location of the random variable Z(s). Equation [4] is composed of two parts: a deterministic part $\mu(s)$ and a random part $\epsilon(s)$. For two distinct points s and u, the random variables $\epsilon(s)$ and $\epsilon(u)$ are spatially correlated. Because this correlation is between terms within the same random process $\epsilon(\cdot)$, it is termed "autocorrelation". To provide replication for statistical modeling, it is assumed that the spatial autocorrelation depends only on the distance and the direction that separates s and u, and not on their exact locations. This property is termed "stationarity."

The most common model used in geostatistics is a special case of [4] where the deterministic surface $\mu(s)$ does not change with location s. The model is given by $$Z(s) = \mu + \epsilon(s). \quad [5]$$

Models [4] and [5] can both be used for prediction, where the term "prediction" corresponds to inference on random quantities (Cressie, 1993, p. 15). Here, the word inference refers to prediction of the random quantities, along with the associated uncertainty about the prediction. Under model [4], where the deterministic surface $\mu(s)$ changes with location, the prediction of $Z(s_0)$ for some location $s_0$, is termed "universal kriging". Under model [5], where the deterministic part of the model is a constant and is not dependent on location, the prediction of $Z(s_0)$ is termed "ordinary kriging."

Models [4] and [5] can also be used for estimation, where the term "estimation" refers to inference on fixed or deterministic quantities (Cressie, 1993, p. 13). Here, inference refers to the estimation of the fixed quantities, along with the associated uncertainty about the estimation. Note that under model [4] estimation refers to the determination of $\mu(s)$ and under model [5], estimation refers to the determination of $\mu$.

The above descriptions of prediction and estimation are concerned with inference at points; i.e., prediction or estimation of quantities at specific locations. Prediction and estimation can also be applied at a spatially-aggregated, or regional level; for example, for an entire state. In this case, we are either predicting the average value of the random variable Z(s) or estimating the average value of the deterministic trend surface $\mu(s)$ over some region A. These two operations are respectively termed "block prediction", $Z(A) = \int_A Z(s) ds/|A|$, and "block estimation", $\mu(A) = \int_A \mu(s) ds/|A|$, where $|A| = \int_A 1\, ds$ is the area of A.

Model [4] can be written as a general linear model, $$z = X\theta + \epsilon \quad [6]$$

showing the joint expectation of all random variables for a variety. Here, the variance-covariance matrix of the random errors is given by $\operatorname{var}(\epsilon) = \Sigma$. Note that model [6] can be seen as a special case of model [1]. It can be generalized to accommodate the multivariable case (e.g., of two varieties) if we write it as $$\begin{pmatrix} z_1 \\ z_2 \end{pmatrix} = \begin{pmatrix} X_1 & 0_1 \\ 0_2 & X_2 \end{pmatrix} \begin{pmatrix} \theta_1 \\ \theta_2 \end{pmatrix} + \begin{pmatrix} \varepsilon_1 \\ \varepsilon_2 \end{pmatrix}, \quad [7]$$

where $$\operatorname{var}(\varepsilon) = \operatorname{var}\begin{pmatrix} \varepsilon_1 \\ \varepsilon_2 \end{pmatrix} \equiv \Sigma = \begin{pmatrix} \Sigma_{11} & \Sigma_{12} \\ \Sigma_{12} & \Sigma_{22} \end{pmatrix}, \quad [8]$$

which is still a special case of model [1]. For example, if there are $n_i$ observations from the ith variety, i=1,2, then vectors $z_i$ and $\epsilon_i$, i=1,2, in equation [7] are vectors of size $n_i$, i=1,2. The matrix $0_i$, i=1,2, is a matrix of zeros. The row dimension of $0_i$ and $X_i$ is $n_i$, i=1,2, but the column dimensions of these two matrices and the size of the vector $\theta_i$, i=1,2 depend on the number of parameters used in the model.

In model [7], when the prediction is for the ith variety $Z_i(s_0)$, i=1,2, the procedure is called cokriging for the simple case where $$X\theta = \begin{pmatrix} 1_{n_1} & 0_{n_1} \\ 0_{n_2} & 1_{n_2} \end{pmatrix} \begin{pmatrix} \mu_1 \\ \mu_2 \end{pmatrix}, \quad [9]$$

where $1_{n_i}$ and $0_{n_i}$, i=1,2, are vectors of $n_i$ ones and zeros, respectively, i=1,2. The procedure is called universal cokriging for the more general case given by model [7]. When predicting multiple varieties jointly, represented by the vector $z(s_0)$, the procedure is called multivariable spatial prediction (Ver Hoef and Cressie, 1993).

Geostatistical Models for Covariance

So far we have not specified the structure of the covariance matrix of the random errors, $\operatorname{var}(\epsilon) = \Sigma$. Indeed, what makes the method "geostatistical" is the use of spatial coordinates to specify the structure of the matrix $\Sigma$. Let the spatial coordinates of a location be contained in the 2×1 vector s. Let the jth observation of the ith variable (e.g., variety 1) be at location $s = (x_s, y_s)$, and let the mth observation of the kth variable (e.g., variety 2) be at location $u = (x_u, y_u)$. Then the covariance between the jth observation of the ith variable and the mth observation of the kth variable can be modeled by a geostatistical covariance model. An example of one such covariance model is a spherical model (Cressie, 1993, p. 61), which is given as $$cov(Z_{ij}, Z_{km}) = \begin{cases} \phi_{ik}\left[1 - \left(\frac{3\|h\|}{2\rho_{ik}} - \frac{\|h\|^3}{2\rho_{ik}^3}\right)\right] & \text{for } \|h\| \leq \rho_{ik}, \\ 0 & \text{for } \|h\| > \rho_{ik}, \end{cases} \quad [10]$$

where $h=u-s$ and $\|h\|$ is the length of the vector h. Essentially $\|h\|$ is the Euclidean distance from s to u which is equal to $\sqrt{(x_s-x_u)^2+(y_s-y_u)^2}$. In geostatistics, the parameter $\phi_{ik}$ is called the sill and $\rho_{ik}$ is called the range. If $i=k$, Equation [10] defines autocorrelation, else it defines cross-correlation. Physically, the sill parameter represents the variance and the range parameter represents the distance beyond which the correlation is reduced to zero.

Care must be taken to ensure that the variance-covariance matrix $var(\epsilon)=\Sigma$ is positive definite. In the case of a single variety, the use of Equation [10] ensures that $\Sigma$ is positive-definite. For example, notice that with respect to autocorrelation, it is enough that $\phi_{ii}$ and $\rho_{ii}$ be greater than 0 for each i to ensure positive-definiteness. However, with respect to cross-correlation, to ensure positive-definiteness, there are restrictions on $\phi_{ii}$, $\phi_{kk}$ and $\phi_{ik}$ (Goovaerts, 1997, p. 108). A class of models known as coregionalization models have traditionally been used to ensure that the matrix $\Sigma$ is positive definite. Other approaches for modeling cross-correlation have been given by Ver Hoef and Barry (1998). Notice that under the embodiment $\Sigma_{12}=\Sigma_{21}=0$, the variance-covariance matrix in [8] is trivially positive definite when using Equation [10] for $\Sigma_{11}$ and $\Sigma_{22}$ with $\phi_{ii}$ and $\rho_{ii}$ greater than 0 for each i.

We will now describe a class of coregionalization models that will be used for the details of the invention and in the example. For a given integer m, m=1,2, . . . , M, let us start by constructing a process for the ith variable, i=1, . . . , K, as $$Y_{im}(s) = \sqrt{1-r_{im}^2}W_{im}(s)+r_{im}W_{0m}(s), \quad [11]$$

where $-1 \leq r_{im} \leq 1$ and $W_{im}$, m=1,2, . . . , M, is another spatial process with the following covariance properties:

$$cov[W_{im}(s), W_{km}(s+h)]=0,$$

for all $i \neq k$ (i,k=0,1, . . . , K), and $$f_m(h;\gamma_m) \equiv cov[W_{im}(s), W_{im}(s+h)],$$

for i=0, 1, . . . , K. Here, the function $f_m(h;\gamma_m)$ is some unscaled ($f_m(0;\gamma_m)=1$) model that is valid as a covariance model, i.e., all possible covariance matrices are positive-definite. For example, the spherical model defined in Equation [10], but without the scale parameter $\phi_{ik}$, is valid as a covariance model and is given by, $$f_m(h;\gamma_m) = \begin{cases} \left[1 - \left(\frac{3\|h\|}{2\rho_m} - \frac{\|h\|^3}{2\rho_m^3}\right)\right] & \text{for } \|h\| \leq \rho_m, \\ 0 & \text{for } \|h\| > \rho_m. \end{cases} \quad [12]$$

where $\gamma_m=\rho_m$. Another trivial example for $f_m(h;\gamma_m)$ is the unscaled "nugget effect", where $f_m(h;\gamma_m)=1$ for all h. A nugget effect is usually caused by sampling error and/or variability at scales finer than the closest locations in the observed data set. Most geostatistical models include a nugget effect along with some other model, such as the spherical model above in Equation [12], which causes a discontinuity at the origin when h=0.

Using Equation [11] and the definition of $f_m(h;\gamma_m)$ we have, $$cov[Y_{im}(s), Y_{km}(s)] = \begin{cases} f_m(h;\gamma_m) & \text{if } i=k, \\ r_{im}r_{km}f_m(h;\gamma_m) & \text{if } i \neq k. \end{cases} \quad [13]$$

Next, we construct the "linear model of coregionalization" by defining the sum, $$\varepsilon_i(s) = \sum_{m=1}^{M} \phi_{im}Y_{im}(s), \quad [14]$$

for i=1,2, . . . , K. Note that Equation [14], by construction, provides a valid spatial stochastic process. In other words, as long as the component processes $Y_{im}(s)$, i=1,2, . . . , K; m=1,2, . . . , M, exist, so does the process $\epsilon_i(s)$, i=1,2, . . . , K. Also note that the processes $Y_{im}(s)$, m=1,2, . . . , M, may have different underlying covariance models (e.g., spherical, exponential, etc.).

The construction in Equation [14] provides the following covariance model (coregionalization model) for the construction $\epsilon_i(s)$:

$$C_{ik}(h;\gamma) \equiv cov[\varepsilon_i(s), \varepsilon_k(s)] = \begin{cases} \sum_{m=1}^{M} \phi_{im}^2 f_m(h;\gamma_m) & \text{if } i=k, \\ \sum_{m=1}^{M} r_{im}r_{km}\phi_{im}\phi_{km}f_m(h;\gamma_m) & \text{if } i \neq k. \end{cases} \quad [15]$$

Note that when K=2, the parameters $r_{1m}$ and $r_{2m}$ are not individually identifiable, but their product is identifiable, which we denote simply as $r_m \equiv r_{1m} \cdot r_{2m}$. It remains now to estimate the parameters in the above covariance model [15], as well as the fixed effects $\theta$. We discuss them in the following paragraphs.

Restricted Maximum Likelihood

For the mixed model described in Equation [1], for which the geostatistical model [6] is a special case, it is necessary to use data to estimate the parameters of the model. Broadly speaking, the parameters can be divided into two parts: the fixed effects $\theta$, given in Equation [1], and the covariance parameters contained in $\Sigma$, given by Equation [8].

Let's denote the dependence of $\Sigma$ on the vector of parameters $\phi$ by $\Sigma(\phi)$. For example, $\phi$ could be the parameters of a spherical covariance model [12] or the parameters of a coregionalization model [15]. A general estimation method is to use the restricted (or, residual) maximum likelihood (REML) method to estimate $\theta$ and $\phi$.

We now present a brief introduction to REML estimation method, which was developed by Patterson and Thompson (1971, 1974). Assuming that the data are from a multivariate normal distribution $N(X\theta,\Sigma(\phi))$, the traditional maximum likelihood estimation method could be used to estimate $\theta$ and $\phi$, where twice the negative log-likelihood, $$L(\theta,\phi) = N\log(2\pi) + \log|\Sigma(\phi)| + (y-X\theta)'\Sigma(\phi)^{-1}(y-X\theta), \quad [16]$$

is minimized for both $\theta$ and $\phi$ simultaneously within their parameter spaces. A solution for $\theta$, in terms of $\phi$, is given by $$\hat{\theta}(\phi) = [X'\Sigma(\phi)^{-1}X]^{-1}X'\Sigma(\phi)^{-1}y, \quad [17]$$

which is the well-known generalized least-squares estimator of $\theta$. Upon substituting Equation [17] into Equation [16], the likelihood function for the covariance parameters becomes $$L(\phi)=N\log(2\pi)+\log|\Sigma(\phi)|+[y-X\hat{\theta}(\phi)]'\Sigma(\phi)^{-1}[y-X\hat{\theta}(\phi)]. \quad [18]$$

It is well-known that maximum likelihood estimation of the covariance parameters $\phi$ given by minimizing $L(\phi)$ in Equation [18] is biased (Mardia and Marshall, 1984). REML estimation is a modification of maximum likelihood estimation that corrects for the bias of maximum likelihood estimation of $\phi$. The REML estimator is obtained by minimizing $$L_R(\phi)=(N-d)\log(2\pi)+\log|\Sigma(\phi)|+[y-X\hat{\theta}(\phi)]'\Sigma(\phi)^{-1}[y-X\hat{\theta}(\phi)]+\log|X'\Sigma(\phi)X| \quad [19]$$

with respect to $\phi$, where $d=\text{rank}(X)$. Equation [19] requires a numerical solution. More details on REML for spatial covariance structures can be found in Cressie (1993, p. 91). Computational details for minimizing [19] can be found in Harville (1977), Zimmerman (1989), and Wolfinger et al. (1994). Although REML was developed assuming that the data come from a multivariate normal distribution, Heyde (1994) and Cressie and Lahiri (1996) show that Equation [19] is also an estimating equation (Godambe, 1991); so REML estimation of $\phi$ is unbiased even when the data do not come from a multivariate normal distribution.

With reference to the above discussion, embodiments of the present invention may now be discussed in detail.

The model

A statistical model is developed for estimation and prediction at the point level or some block level of aggregation, for either a single variety or for comparing varieties. In the context of advancement of varieties, where comparison of the varieties is the most important objective, it is almost never the case that the experimenter considers one variety at a time or fits single variety models. Note that statistical tests for comparing varieties are not possible if single variety models are fitted to data on individual hybrids. On the other hand, using a model for two or more varieties is the most general case and still allows inference (estimation and prediction) for a single variety as well as for comparing varieties. Therefore, the general model is considered in detail. The model under consideration here is a statistical model, containing both fixed and random effects and is called a mixed effect model. The model is, $$y=X\theta+Dr+z+\epsilon. \quad [20]$$

The vector y in model [20] contains the main variables of interest (e.g., grain yield) and possibly other concomitant variables. As an example of these concomitant variables, consider precipitation averaged across the growing season. These precipitation data come from weather stations in the general area of the testing locations where the variables of interest are measured. The reason for introducing observations from these other variables into y is to use the covariance between these variables and the variable(s) of interest in prediction and estimation. In the context of prediction, the reader is referred to the discussion on cokriging presented earlier.

In one embodiment, y may contain responses on one variable from exactly two varieties, which will be assumed henceforth. Note that this embodiment still represents a general form of the vector y, since it allows the use of the covariance between the responses on that variable from the two varieties. Under this embodiment, the vector y is written as $y=(y'_1,y'_2)'$ where $y'_i=(Y_{i1}, Y_{i2}, \ldots, Y_{in_i})$, $i=1, 2$, with $n_1$ observations from variety 1 and $n_2$ observations from variety 2. In other words, there is a total of $N=n_1+n_2$ observations from both varieties.

The matrix X in model [20] is the design matrix for the fixed effects, $$X = \begin{pmatrix} X_1 & 0 \\ 0 & X_2 \end{pmatrix}, \quad [21]$$

where $$X_i = \begin{pmatrix} v'_{i1} & x'_{i1} \\ v'_{i2} & x'_{i2} \\ \vdots & \vdots \\ x'_{in_i} & x'_{in_i} \end{pmatrix}, i=1, 2, \quad [22]$$

for $i=1,2$. In Equation [22], the column vector $v_{ij}$, $i=1, 2$, and $j=1, 2, \ldots, n_i$ contains fixed effects used to model a trend surface. These vectors are composed of functions of the spatial coordinates for the jth observation, $j=1, 2, \ldots, n_i$. For example, the x-coordinate for the jth observation could be the latitude and the y-coordinate could be the longitude of that observation. Other coordinate systems can also be used, such as Universal Trans Meridian (UTM). If the x-coordinates and y-coordinates are denoted by $x_j$ and $y_j$ for $i=1, 2$, then an embodiment of $v_{ij}$ contains the terms of a third-order polynomial for the jth observation of the ith variety, $$v_{ij}=(1,x_j,y_j,x_j^2,y_j^2,x_jy_j,x_j^3,y_j^3,x_jy_j^2,x_j^2y_j)'. \quad [23]$$

Note that the presence of 1 in $v_{ij}$ corresponds to the main effect of variety as one of the fixed effects in the model. In Equation [22] the column vector $x_{ij}$, $i=1, 2$, and $j=1, 2, \ldots, n_i$, contains other fixed covariate effects for the jth observation of the ith variety. These covariates could include factors such as the effect of presence or absence of irrigation, effect of the year, etc. Thus the fixed effects parameter vector $\theta$ can be written as $$\theta = \begin{pmatrix} \alpha_1 \\ \beta_1 \\ \alpha_2 \\ \beta_2 \end{pmatrix}, \quad [24]$$

where the subvector $\alpha_i$ is an $a_i\times 1$ vector of fixed effects for the spatial trend surface for the ith variety formed by the polynomial $v'_{ij}\alpha_i$, and $\beta_i$ is a $b_i\times 1$ vector of fixed effects of the covariates for the ith variety, $i=1, 2$. Let the dimension of $\theta$ be $d\times 1$, i.e., $d=a_1+b_1+a_2+b_2$. Under an embodiment given by [23], $\alpha_i$, $i=1, 2$, is a $10\times 1$ vector.

In model [20], r, z, and $\epsilon$ are vectors of random effects. The vector r contains random effects for locations. If there are $n_c$ locations with observations on both varieties, there are $N-n_c$ unique locations and r becomes an $(N-n_c)\times 1$ vector. It is assumed that $E(r)=0$ and that $$\text{var}(r)=\sigma_0^2 I_r, \quad [25]$$

where $I_r$ is the $(N-n_c)\times(N-n_c)$ identity matrix. In model [20], D is an $N\times(N-n_c)$ incidence matrix for the random effect of location. The incidence matrix D has all elements in a row set to zero, except a single 1 in each row that indicates the incidence of a particular location for that observation (e.g., see Searle et al., 1992, pp. 138–139). Furthermore, the presence of two 1's in a single column indicates the co-occurrence of the two varieties at a location.

In model [20], z represents a spatial stochastic process. The vector z may contain spatially-correlated random variables of the two varieties; $z=(z'_1,z'_2)'$ where $z'_i=(Z_{i1}, Z_{i2}, \ldots Z_{in_i})$, $i=1, 2$. It is assumed that $E(z)=0$ and that $$cov(z) = \begin{pmatrix} \Sigma_{11} & \Sigma_{12} \\ \Sigma_{21} & \Sigma_{22} \end{pmatrix}, \quad [26]$$

has some variogram/covariance model for the spatial autocorrelation and cross-correlation. Let the spatial coordinates of a location be contained in the 2×1 vector s. Let the jth observation of the ith variety be at location $s=(x_s,y_s)$, and let the nith observation of the kth variety be at location $u=(x_u, y_u)$. Then an embodiment of the covariance between the jth observation of the ith variety and the mth observation of the kth variety is a spherical covariance model as given in Equation [10].

In model [20], $\epsilon$ is a vector containing independent random errors. The vector $\epsilon$ may contain random variables of two varieties; $\epsilon=(\epsilon'_1,\epsilon'_2)'$ where $\epsilon'_i=[\epsilon_{i1}, \epsilon_{i2}, \ldots, \epsilon_{in_i}]$, $i=1, 2$. It is assumed that $E(\epsilon)=0$ and that $$cov(\varepsilon) = \begin{pmatrix} \sigma_1^2 I_1 & 0 \\ 0 & \sigma_2^2 I_2 \end{pmatrix}, \quad [27]$$

where $I_i$ is the $n_i \times n_i$ identity matrix for $i=1, 2$. It is also assumed that r, z and $\epsilon$ are independent of each other.

From Equations [20], [25], [26], and [27], and the fact that r, z and $\epsilon$ are independent of each other, it follows that the variance-covariance matrix for the response vector y is given by, $$\Sigma = \sigma_0^2 DD' + \begin{pmatrix} \Sigma_{11} & \Sigma_{12} \\ \Sigma_{21} & \Sigma_{22} \end{pmatrix} + \begin{pmatrix} \sigma_1^2 I_1 & 0 \\ 0 & \sigma_2^2 I_2 \end{pmatrix}. \quad [28]$$

Note that the matrix DD' contains only 0's and 1's, with 1's on the diagonal. The presence of a 1 in the off-diagonal position in DD' indicates that both varieties were tested together at some location.

Influence Diagnostics

Before fitting model [20] to draw inferences, it is important to locate influential data points and assess their impact on the model. Preferably, these data points should be removed before model fitting is conducted. Note that a visual inspection of the spatial distribution of the data can allow removal of a location, or cluster of locations, that is spatially disjoint from the rest of the observations. In our procedure, in addition to a visual inspection of the data, we use the following two objective measures of influence to identify unusual or influential observations. The first measure of influence is called leverage. For the most general case of a mixed effect model, Christensen et al. (1992) have defined the so called "hat" matrix, $$H = X(X'\Sigma^{-1}X)^{-1}X' \quad [29]$$

as a measure of leverage. The jth data point is considered a high-leverage point if $h_{jj} > 2t/N$, where $h_{jj}$ is the jth diagonal element of H, t is the trace of H and N is the total number of data points. In one embodiment, when $\Sigma$ is an identity matrix, the hat matrix reduces to the following form (Hoaglin and Welsh, 1978):

$$H = X(X'X)^{-1}X'. \quad [30]$$

In this case, the jth data point is considered a high-leverage point if $h_{jj} > 2d/N$ (Montgomery and Peck, 1992, p. 182), where, as defined earlier, d is the number of parameters in $\theta$. The second measure of influence used in our procedure is Cook's distance $D_j$ (Cook, 1977) defined for the jth observation. For the most general case of a mixed effect model, this distance is given by, $$D_j = \frac{(\hat{\theta}_{(j)} - \hat{\theta})' X' \Sigma^{-1} X (\hat{\theta}_{(j)} - \hat{\theta})}{d}, \quad [31]$$

where $\hat{\theta}_{(j)}$ is an estimate of $\theta$ with the jth observation removed, and $\Sigma$ is the estimated variance-covariance matrix. Observations with $D_j > 1$ are usually considered influential (Montgomery and Peck, 1992, p. 182). In one embodiment, when $\Sigma$ is an identity matrix, the following expression is used for Cook's distance for identifying influential observations:

$$D_j = \frac{(\hat{\theta}_{(j)} - \hat{\theta})' X' X (\hat{\theta}_{(j)} - \hat{\theta})}{d\hat{\sigma}^2}, \quad [32]$$

where, as before, observations with $D_j > 1$ are considered influential. For influence diagnostics in our procedure, we use formulas [30] and [32], and a model without any covariate effect.

The reason for using both H and $D_j$ to screen out influential observations is as follows. The calculation of H is based entirely on the spatial locations (not the values) of the data points. Therefore H is sensitive to spatial outliers and could be used to screen spatial outliers. On the other hand, Cook's distance $D_j$ is partly based on the spatial location and partly on the value of the observation. Therefore, $D_j$ can be used to identify data points that have unusually high or low values but are not necessarily spatial outliers.

Estimation of the Parameters for the Mixed Model

After describing the model for the data, given in [20], the problem of parameter estimation should be addressed next. Broadly speaking, the parameters can be divided into two categories: the fixed effects $\theta$, given by Equation [24], and the covariance parameters contained in $\Sigma$, given by Equation [28]. Let's denote the dependence of $\Sigma$ on parameters $\phi \equiv (\sigma_0^2, \sigma_1^2, \sigma_2^2, \phi_{11}, \phi_{12}, \phi_{21}, \phi_{22}, \rho_{11}, \rho_{12}, \rho_{21}, \rho_{22})'$ by $\Sigma(\phi)$. In a preferred embodiment, the method of restricted maximum likelihood (REML) is used to estimate the parameters $\theta$ and $\phi$. After $\Sigma$ is estimated by REML, $\theta$ is estimated by generalized least squares, which is given by Searle (1971, p. 87) as $$\hat{\theta} = (X'\Sigma^{-1}X)^{-1}X'\Sigma^{-1}y, \quad [33]$$

where, as defined before, y is the vector of all selected data points.

The parameter estimates are used in two different procedures: estimation and prediction. In both procedures, the interest is either on a single location or on the mean over a geographic region. The former is called point estimation (prediction) and the latter is called block estimation (prediction). Note that point estimates are also used for construction of the estimation trend surface, which is done by conducting point estimation at every grid point of a grid superimposed on the data. Similarly, a prediction surface can be constructed by using point predictions at all grid points of a grid superimposed on the spatial extent of the data.

In the following two sub-sections, we will consider estimation and prediction by fitting model [20]. Note that before the block estimation or prediction is conducted for individual regions, model [20] is fitted only once using all selected data points (original data set minus the influential observations). The parameters estimated from this model are then used for estimation and prediction of individual points and region means.

Block and Point Estimation

Suppose the goal is to estimate the mean value of a trend surface of fixed spatial effects. For a location s=(x, y)' and the ith variety, i=1, 2, let's define a vector-valued function $w_i(s)$ of the spatial coordinates by $$w_i(s)=(w_{i1}(s),w_{i2}(s),\ldots,w_{ia_i}(s))'. \quad [34]$$

Notice that, under the embodiment given by Equation [23], we have, $a_1=a_2=10$ and $w_i(s)=(1,x,y,x^2,y^2,xy,x^3,y^3,xy^2,x^2y)'$. Therefore, the value of the trend surface at some location s is given by $w'_i(s)\alpha_i$. However, the average value of the trend surface over some geographic region A is often of interest. As mentioned before, estimating this average over A is called block estimation and the block estimate is given by $$\mu_i(A) = x'_{i0}\beta_i + \frac{1}{|A|}\int_A w'_i(s)\alpha_i\,ds, \quad [35]$$

for i=1, 2, where |A| is the area of the region A and the vector $x_{i0}$, i=1, 2 contains a set of values for the covariates corresponding to region A. It is assumed that the covariates $x_{i0}$ do not interact with the trend surface; specifying values for $x_{i0}$ simply moves the trend surface within the corresponding region up or down without affecting its shape.

In an embodiment of model [20], the covariate effects $x_{ij}$ in Equation [22] could be completely dropped from the model for reasons such as unavailability of covariate data or absence of an appropriate covariate. In that case the term $x'_{i0}\beta_i$, which corresponds to the covariate(s), drops out of Equation [35]. Note that the term $x'_{i0}\beta_i$ is taken outside the integral in Equation [35] to help distinguish covariates from trend surface components. The covariates may be spatial or non-spatial, and may be observed or specified by the user. They can also be either continuous or discrete valued. Examples of some of the covariate types are in order. As an example of a discrete non-spatial covariate, consider year effect, which is not spatially integrable. When a covariate is spatial and continuous valued, the corresponding component of the vector $x_{i0}$ represents the result of an integral average similar to the integral in Equation [35]. Let the value of a spatial covariate be denoted by $g_i(s)$ for the ith variety at location s and let this covariate correspond to the kth component of vector $x_{ij}$ in Equation [22]. Then the kth component of $x_{i0}$ would be $$\frac{1}{|A|}\int_A g_i(u)du,$$

where $g_i(u)$ is assumed to be Reimann integrable. As an example of an observed spatial covariate, consider soil series. This covariate must be known at all points. Fortunately, soil series maps are available for all major agricultural regions and provide classification of any region (e.g. county) into various soil series. This implies that data on soil series as, a covariate, can be obtained at all possible spatial locations. As an example of a user-specified spatial covariate, consider irrigation, which can be treated as a binary-valued function (1≡irrigated, 0≡non-irrigated). For example, the user might be interested in estimating (predicting) the difference between the two varieties for a region in a scenario of 100% irrigation. If irrigation as a covaniate corresponds to the lth component of the vector $x_{ij}$, then this would mean that the lth component of $x_{i0}$ is specified to have a value of 1 to represent the condition of irrigation.

Under an embodiment where there are responses from one variable from exactly two varieties, let's define the difference in the block averages for the varieties over a region A as $\mu_0(A)$. Then $\mu_0(A)$ is given by, $$\mu_0(A) \equiv \mu_1(A) - \mu_2(A) = \quad [36]$$
$$x'_{10}\beta_1 - x'_{20}\beta_2 + \frac{1}{|A|}\int_A [w'_1(s)\alpha_1 - w'_2(s)\alpha_2]\,ds.$$

Now, let's define a set $S_A=\{p:s_p \in A\}$, where $\{s_p\}$ are points either on a regular grid superimposed on A or are randomly chosen from within A, with $n_A$ elements in $S_A$. Let's also define $$\lambda_1(s_p) \equiv \begin{pmatrix} w_1(s_p) \\ x_{10} \\ 0 \\ 0 \end{pmatrix}, \lambda_2(s_p) \equiv \begin{pmatrix} 0 \\ 0 \\ w_2(s_p) \\ x_{20} \end{pmatrix}, \text{ and } \lambda_0(s_p) \equiv \begin{pmatrix} w_1(s_p) \\ x_{10} \\ -w_2(s_p) \\ -x_{20} \end{pmatrix}. \quad [37]$$

Then, approximating the integrals in [35] and [36] and using the definition of θ from [24] we have $$\mu_i(A) \approx x'_{i0}\beta_i + \frac{1}{n_A}\sum_{p \in S_A} w'_i(s_p)\alpha_i = \frac{1}{n_A}\sum_{p \in S_A} [\lambda_i(s_p)]'\theta, \quad [38]$$

for i=1,2, and $$\mu_0(A) \approx x'_{10}\beta_1 - x'_{20}\beta_2 + \frac{1}{n_A}\sum_{p \in S_A} [w'_1(s_p)\alpha_1 - w'_2(s_p)\alpha_2] = \frac{1}{n_\lambda}\sum_{p \in S_A} [\lambda_0(s_p)]'\theta. \quad [39]$$

Upon substituting the generalized least squares estimator of θ from [33] in [38] and [39], we get the estimators of $\mu_i(A)$ as $$\hat{\mu}_i(A) \approx \frac{1}{n_A}\sum_{p \in S_A} [\lambda_i(s_p)]'(X'\Sigma^{-1}X)^{-1}X'\Sigma^{-1}y, \quad [40]$$

for i=0, 1, 2. The variance of $\hat{\mu}_i(A)$ is $$\text{var}(\hat{\mu}_i(A)) \approx \frac{1}{n_A^2}\sum_{p \in S_A}\sum_{q \in S_A} [\lambda_i(s_p)]'(X'\Sigma^{-1}X)^{-1}[\lambda_i(s_q)], \quad [41]$$

with the standard errors, $\text{se}(\hat{\mu}_i(A))=\sqrt{\text{var}[\hat{\mu}_i(A)]}$ for i=0, 1, 2.

Let's now consider the case of point estimation. The objective is to estimate the following function which is a special case of Equation [35] where the region A is now reduced to a location (point). The point estimate at $s_0$ is $$\mu_i(s_0)=x'_{i0}\beta_i+w'_i(s_0)\alpha_i. \quad [42]$$

As in the case of block estimation, the value of the covariate $x_{i0}$ merely introduces an additive effect in [42] by either increasing or decreasing the point estimate. However, since the magnitude and direction of this additive effect could vary from point to point, the shape of the overall trend surface, which is constructed using the point estimates, could change substantially by the presence of covariates in the model.

The estimator of $\mu_i(s_0)$ can be derived as a special case block estimator given in Equation [40] as follows:

$$\hat{\mu}_i(s_0) = [\lambda_i(s_0)]'(X'\Sigma^{-1}X)^{-1}X'\Sigma^{-1}y, \qquad [43]$$

for i=0, 1, 2. The estimation variance of $\hat{\mu}_i(s_0)$ is obtained similar to that for the block estimate in Equation [41] and is given by, $$var[\hat{\mu}_i(s_0)] = [\lambda_i(s_0)]'(X'\Sigma^{-1}X)^{-1}[\lambda_i(s_0)]. \qquad [44]$$

The standard errors of the point estimates are $se[\hat{\mu}_i(s_0)] = \sqrt{var[\hat{\mu}_i(s_0)]}$ for i=0, 1, 2.

Universal Block and Point Cokriging

Let's first consider block prediction, which is also called block cokriging, as discussed in the Background of the Invention section. The goal here is to predict, over some specified geographic region, the mean value of the response surface, which is a sum of three components: the trend surface of fixed spatial effects, fixed covariate effects, and an autocorrelated random surface. Define the random function $Z_i(s)$, where the set $\{Z_i(s); S \in A\}$; i=1, 2, forms a random surface that can be integrated as defined by Cressie (1993, page. 107). Let $Z_0(s) \equiv Z_1(s) - Z_2(s)$ be a random function, where $\{Z_0(s); s \in A\}$ forms a random surface that can be integrated if $Z_1(s)$ and $Z_2(s)$ can be integrated. Now, let's define the function $$S_i(A) \equiv x'_{i0}\beta_i + \frac{1}{|A|}\int_A [w'_i(s)\alpha_i + Z_i(s)] ds, \qquad [45]$$

for i=1, 2, as the average realized value of the ith variety over a region A at a specified set of values for the covariates given by $x_{i0}$, i=1, 2. As in the case of block estimation (see discussion following equation [35]), the term $x'_{i0}\beta_i$ in equation [45] can accommodate covariates of all types and represents the results of an averaging corresponding to the covariate $x_{i0}$.

The objective here is to predict the block means $S_1(A)$, $S_2(A)$, and $S_0(A) \equiv S_1(A) - S_2(A)$ with some linear combination of the data, say, $\omega'_i y$. The estimation of the vector $\omega_i$, i=0, 1, 2, is accomplished by a method known as best linear unbiased prediction, where the predictor, which is a linear function of the data, is unbiased, and has the minimum mean squared prediction error in the class of all linear unbiased predictors.

Let's start with assuming the linear model given by Equation [20]. For predicting the block means $S_i(A)$, i=0, 1, 2, the best linear unbiased predictor (BLUP) is obtained by minimizing $$E[S_i(A) - \omega'_i y]^2, \qquad [46]$$

subject to the unbiasedness condition $$E[S_i(A)] = E((\omega'_i y)), \qquad [47]$$

for i=0, 1, 2.

Now, using Model [20] and Equation [45], for i=1, 2, Equation [47] can be written as, $$\frac{1}{|A|}\int_A w'_i(s)\alpha_i ds + x'_{0i}\beta_i = \omega'_i X\theta, \qquad [48]$$

and, for i=0, Equation [47] can be written as, $$\frac{1}{|A|}\int_A w'_1(s)\alpha_1 ds + x'_{01}\beta_1 - \frac{1}{|A|}\int_A w'_2(s)\alpha_2 ds - x'_{02}\beta_2 = \omega'_0 X\theta. \qquad [49]$$

In general, using the definition of the vector-valued function $w_i(s)$, i=0, 1, 2, from [34], Equations [48] and [49] can be combined into a single equation as $$u'_i\theta = \omega'_i X\theta, \qquad [50]$$

for i=0, 1, 2, where $$u_1 \equiv \begin{pmatrix} \frac{1}{|A|}\int_A w_{11}(s)ds \\ \vdots \\ \frac{1}{|A|}\int_A w_{1a_1}(s)ds \\ x_{01} \\ 0 \\ \vdots \\ 0 \\ 0 \end{pmatrix}, u_2 \equiv \begin{pmatrix} 0 \\ \vdots \\ 0 \\ 0 \\ \frac{1}{|A|}\int_A w_{21}(s)ds \\ \vdots \\ \frac{1}{|A|}\int_A w_{2a_2}(s)ds \\ x_{02} \end{pmatrix}, \text{ and } u_0 \equiv \begin{pmatrix} \frac{1}{|A|}\int_A w_{11}(s)ds \\ \vdots \\ \frac{1}{|A|}\int_A w_{1a_1}(s)ds \\ x_{01} \\ -\frac{1}{|A|}\int_A w_{21}(s)ds \\ \vdots \\ -\frac{1}{|A|}\int_A w_{2a_2}(s)ds \\ -x_{02} \end{pmatrix}. \qquad [51]$$

To satisfy the condition of unbiasedness, Equation [50] must be true for every possible $\theta$, which yields $$u'_i = \omega'_i X, \qquad [52]$$

for i=0, 1, 2.

The vectors in Equations [51] are approximated by, $$u_1 \approx \begin{pmatrix} \frac{1}{n_A}\sum_{p\in S_A} w_{11}(s_p) \\ \vdots \\ \frac{1}{n_A}\sum_{p\in S_A} w_{1a_1}(s_p) \\ x_{01} \\ 0 \\ \vdots \\ 0 \\ 0 \end{pmatrix}, \quad u_2 \approx \begin{pmatrix} 0 \\ \vdots \\ 0 \\ 0 \\ \frac{1}{n_A}\sum_{p\in S_A} w_{21}(s_p) \\ \vdots \\ \frac{1}{n_A}\sum_{p\in S_A} w_{2a_2}(s_p) \\ x_{02} \end{pmatrix}, \quad [53]$$

and $$u_0 \approx \begin{pmatrix} \frac{1}{n_A}\sum_{p\in S_A} w_{11}(s_p) \\ \vdots \\ \frac{1}{n_A}\sum_{p\in S_A} w_{1a_1}(s_p) \\ x_{01} \\ -\frac{1}{n_A}\sum_{p\in S_A} w_{21}(s_p) \\ \vdots \\ -\frac{1}{n_A}\sum_{p\in S_A} w_{2a_2}(s_p) \\ -x_{02} \end{pmatrix}$$

where $S_A$ has been defined before.

Now, using [20], [45] and [51], the mean square prediction error [46] can be written as, $$E[S_i(A) - \omega_i'y]^2 = E\left[u_i'\theta + \frac{1}{|A|}\int_A Z_i(s)\,ds - \omega_i'(X\theta + Dr + z + \varepsilon)\right]^2 \quad [54]$$

for i=0, 1, 2.

Let's define the N-vector $\delta = (\delta_{11}, \delta_{12}, \ldots, \delta_{1n_1}, \delta_{21}, \delta_{22}, \ldots, \delta_{2n_2})'$ as $$\delta = Dr + z + \varepsilon \text{ and let } Z_i(A) \equiv \frac{1}{|A|}\int_A Z_i(s)\,ds \text{ for } i = 0, 1, 2.$$

[54] can be written as $$E[S_i(A) - \omega_i'y]^2 = E[Z_i(A) - \omega_i'\delta]^2, \quad [55]$$

for i=0, 1, 2.

Evaluating the expectation in [55] requires the evaluation of $cov[Z_i(A), \delta]$, which can be approximated as $$\begin{pmatrix} \frac{1}{N_A}\sum_{p\in S_A} cov[Z_i(s_p), \delta_{11}] \\ \vdots \\ \frac{1}{N_A}\sum_{p\in S_A} cov[Z_i(s_p), \delta_{1n_1}] \\ \frac{1}{N_A}\sum_{p\in S_A} cov[Z_i(s_p), \delta_{21}] \\ \vdots \\ \frac{1}{N_A}\sum_{p\in S_A} cov[Z_i(s_p), \delta_{2n_2}] \end{pmatrix}, \quad [56]$$

for i=0, 1, 2.

Now, since $cov(z, \varepsilon)=0$ and $cov(z, r)=0$, the vector in [56] can be written as, $$c_i \equiv cov[Z_i(A), \delta] \approx \begin{pmatrix} \frac{1}{N_A}\sum_{p\in S_A} cov[Z_i(s_p), Z_1(s_1)] \\ \vdots \\ \frac{1}{N_A}\sum_{p\in S_A} cov[Z_i(s_p), Z_1(s_{n_1})] \\ \frac{1}{N_A}\sum_{p\in S_A} cov[Z_i(s_p), Z_2(s_1)] \\ \vdots \\ \frac{1}{N_A}\sum_{p\in S_A} cov[Z_i(s_p), Z_2(s_{n_2})] \end{pmatrix} \quad [57]$$

for i=0, 1, 2.

Evaluating the expectation in Equation [55] also requires evaluation of $C_i(A, A) \equiv var[Z_i(A)]$ which can be approximated as $$C_i(A, A) \approx \frac{1}{n_A^2}\sum_{p\in S_A}\sum_{q\in S_A} cov[Z_i(s_p), Z_i(s_q)], \quad [58]$$

for i=0, 1, 2. Now, since $$Z_i(A) \equiv \frac{1}{|A|}\int_A Z_i(s)\,ds,$$

which can be approximated by $$\frac{1}{n_A}\sum_{p\in S_A} Z_i(s_p),$$

we note that $$E[Z_i^2(A)] = E\left[\frac{1}{n_A}\sum_{p\in S_A} Z_i(s_p)\right]^2$$

$$= \frac{1}{n_A^2}\sum_{p\in S_A}\sum_{q\in S_A} E[Z_i(s_p)Z(s_q)]$$

$$= \frac{1}{n_A^2}\sum_{p\in S_A}\sum_{q\in S_A} cov[Z_i(s_p), Z(s_q)]$$

-continued $$= C_i(A, A)$$

since $E[Z_i(s_p)]=0$ for any $p \epsilon S_A$ and $i=0, 1, 2$. Therefore, the mean squared prediction error in [55] can be written as $$E[Z_i(A) - \omega_i'\delta]^2 = E[Z_i^2(A) - 2Z_i(A)\omega_i'\delta + \omega_i'\delta\delta'\omega_i] \quad [59]$$
$$= E[Z_i^2(A)] - 2\omega_i'E[Z_i(A)\delta] + \omega_i'E(\delta\delta')\omega_i$$
$$= C_i(A, A) - 2\omega_i'c_i + \omega_i'\Sigma\omega_i,$$

for $i=0, 1, 2$. Now, adding a Lagrange multiplier $m_i$ for the unbiasedness condition given by Equation [52], Equation [59] can be written as, $$L(\omega_i, m_i) \equiv C_i(A,A) - 2\omega_i'c_i + \omega_i'\Sigma\omega_i - 2(u_i' - \omega_i'X)m_i, \quad [60]$$

for $i=0,1,2$. Differentiating [60] with respect to $\omega_i$ and $m_i$ yields $$\frac{\partial L(\omega_i, m_i)}{\partial \omega_i'} = -2c_i + 2\Sigma\omega_i + 2Xm_i, \text{ and,} \quad [61]$$

$$\frac{\partial L(\omega_i, m_i)}{\partial m_i'} = -2(u_i - X'\omega_i), \quad [62]$$

for $i=0,1,2$.

Setting the two partial derivatives in [61] and [62] equal to zero and then solving them simultaneously minimizes the mean square prediction error in [59] subject to the unbiasedness condition given by [52] and yields the best linear unbiased predictor (BLUP) of varietal performance (or performance difference) over a region A as follows. The block prediction (cokriging) equations are, $$\begin{pmatrix} \Sigma & X \\ X' & 0 \end{pmatrix} \begin{pmatrix} \omega_i \\ m_i \end{pmatrix} = \begin{pmatrix} c_i \\ u_i \end{pmatrix}, \quad [63]$$

for $i=0, 1, 2$. The solution to Equation [63] for $\omega_i$ is given by $$\Sigma\omega_i + Xm_i = c_i \rightarrow \omega_i = \Sigma^{-1}(c_i - Xm_i), \quad [64]$$

for $i=0, 1, 2$. The predictor of varietal performance (or performance difference) over a region A is therefore given by, $$\hat{S}_i(A) = \omega'_i y, \quad [65]$$

for $i=0, 1, 2$. Substituting the solution for $\omega_i$ from [64] into the expression [59] provides an expression for the mean squared prediction error or prediction variance as, $$\text{var}[\hat{S}_i(A)] = C_i(A, A) - 2\omega_i'c_i + \omega_i'\sum\left[\Sigma^{-1}(c_i - Xm_i)\right] \quad [66]$$
$$= C_i(A, A) - 2\omega_i'c_i + \omega_i' - \omega_i'Xm_i$$
$$= C_i(A, A) - \omega_i'c_i - \omega_i'Xm_i$$
$$= C_i(A, A) - \omega_i'(c_i + Xm_i),$$

for $i=0, 1, 2$. Substituting the solution for $\omega_i$ from Equation [64] into the equation $X'\omega_i = u_i$ obtained from the lower half of the matrix equation [63] provides an expression for the Lagrange multipliers $m_i$ as, $$X'\omega_i = u_i \Rightarrow X'\Sigma^{-1}(c_i - Xm_i) = u_i \Rightarrow X'\Sigma^{-1}c_i - X'\Sigma^{-1}Xm_i = \quad [67]$$
$$u_i \Rightarrow m_i = (X'\Sigma^{-1}X)^{-1}(X'\Sigma^{-1}c_i - u_i),$$

for $i=0, 1, 2$.

We now consider the case of point prediction or point cokriging. Notice that a special case of Equation [45] is when region A is a single point, say $s_0$, i.e., $S_i(s_0) \equiv x'_{i0}\beta_i + w'_i(s_0)\alpha_i + Z_i(s_0)$, $i=1, 2$. The goal now is to make point prediction at $s_0$, i.e., predict $S_1(s_0)$, $S_2(s_0)$ and $S_0(s_0) \equiv S_1(s_0) - S_2(s_0)$, by some linear combination of the data, say $\omega^*_i y$. In other words, the point predictors are given by, $$\hat{S}_i(s_0) = \omega^{*'}_i y, \quad [68]$$

for $i=0, 1, 2$, where the vector of cokriging weights $\omega^*_i$ needs to be determined. Similar to Equation [64], the vector of weights $\omega^*_i$ is given by the equation, $$\omega^*_i = \Sigma^{-1}(c^*_i - Xm^*_i), \quad [69]$$

where the vector $c^*_i$ is similar to the vector $c_i$ defined for block prediction in [57] and the vector of Lagrange multipliers $m^*_i$ is similar to the vector $m_i$ defined for block prediction in [67]. The vectors $c^*_i$ and $m^*_i$ are therefore given by $$c_i^* \equiv cov[Z_i(s_0), \delta] \approx \begin{pmatrix} cov[Z_i(s_0), Z_1(s_1)] \\ \vdots \\ cov[Z_i(s_0), Z_1(s_{n_1})] \\ cov[Z_i(s_0), Z_2(s_1)] \\ \vdots \\ cov[Z_i(s_0), Z_2(s_{n_2})] \end{pmatrix}, \quad [70]$$

and, $$m^*_i = (X'\Sigma^{-1}X)^{-1}(X'\Sigma^{-1}c^*_i - u^*_i), \quad [71]$$

for $i=0, 1, 2$. In Equation [71], the vectors $u^*_i$, $i=0, 1, 2$, are similar to the vectors $u_i$, $i=0, 1, 2$, given in Equation [51] for the case of block prediction and are now defined as $$u_1^* \equiv \begin{pmatrix} w_{11}(s) \\ \vdots \\ w_{1a_1}(s) \\ x_{01} \\ 0 \\ \vdots \\ 0 \\ 0 \end{pmatrix}, u_2^* \equiv \begin{pmatrix} 0 \\ \vdots \\ 0 \\ 0 \\ w_{21}(s) \\ \vdots \\ w_{2a_2}(s) \\ x_{02} \end{pmatrix}, \text{ and } u_0^* \equiv \begin{pmatrix} w_{11}(s) \\ \vdots \\ w_{1a_1}(s) \\ x_{01} \\ -w_{21}(s) \\ \vdots \\ -w_{2a_2}(s) \\ -x_{02} \end{pmatrix}. \quad [72]$$

Finally, the prediction variance of the point predictor $\hat{S}_i(s_0)$ is obtained as in Equation [66] as $$\text{var}[\hat{S}_i(s_0)] = C_i(s_0, s_0) - \omega^{*'}_i(c^*_i + Xm^*_i). \quad [73]$$

Figure 4:
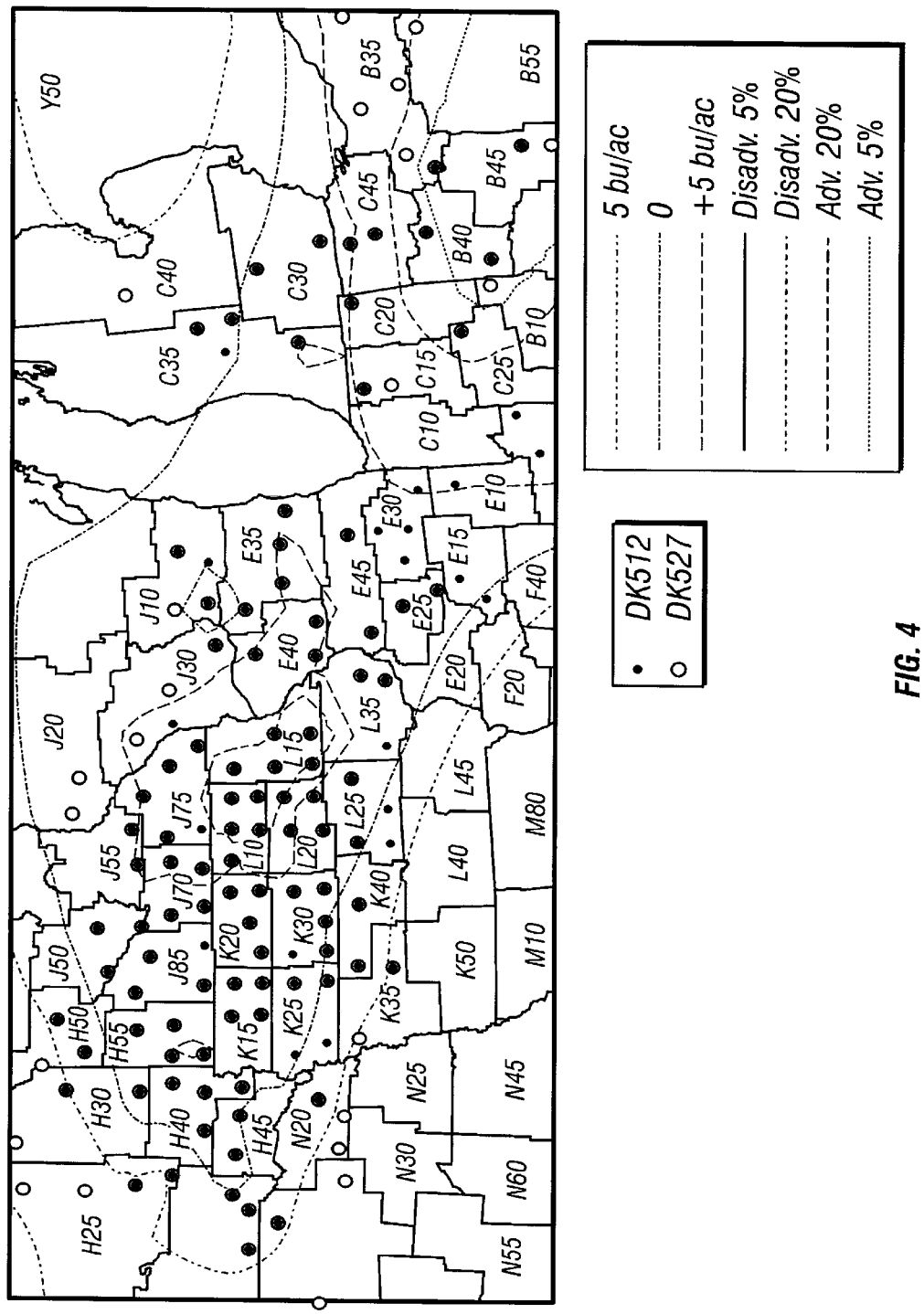
Figure 7:
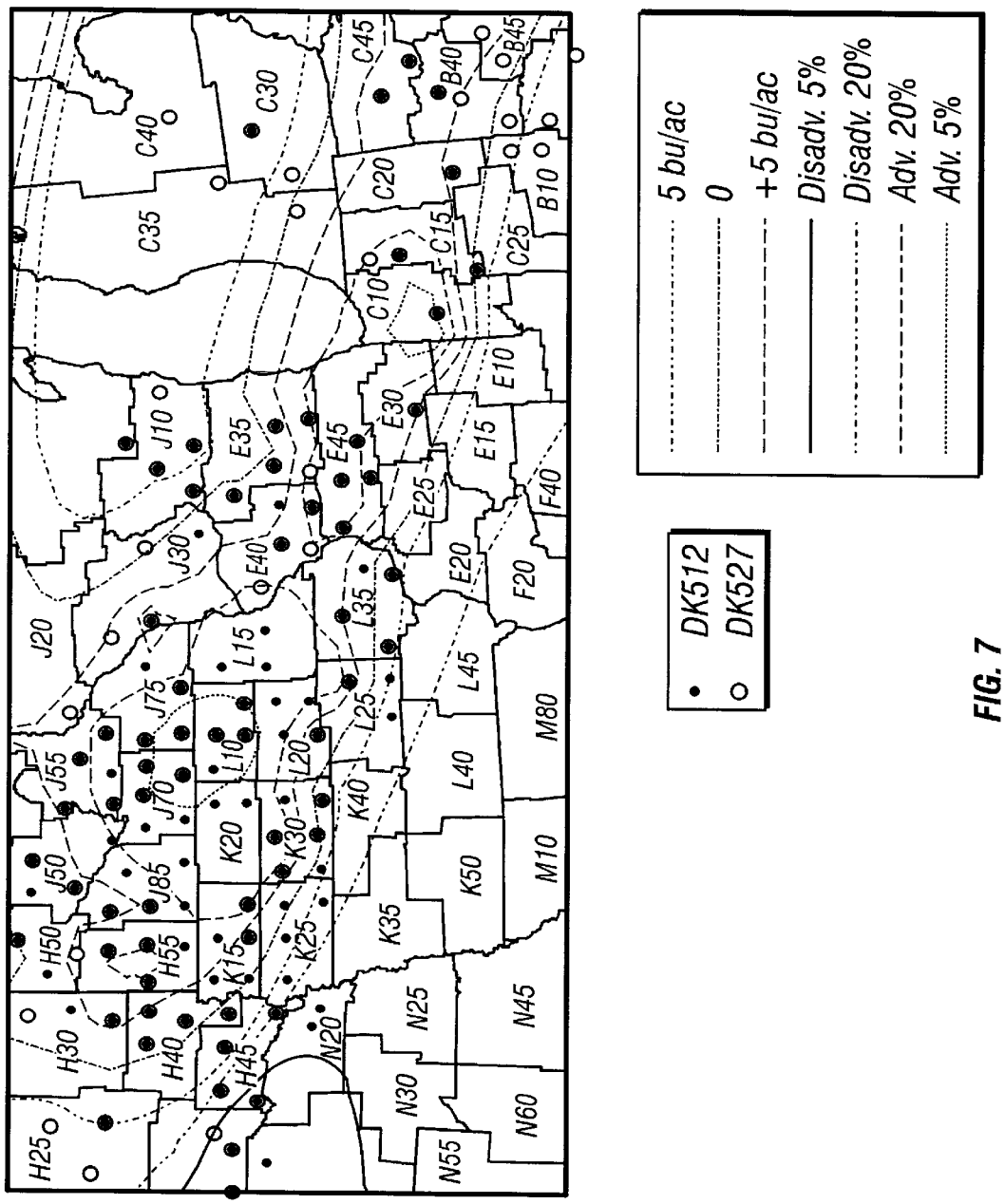
Figure 10:
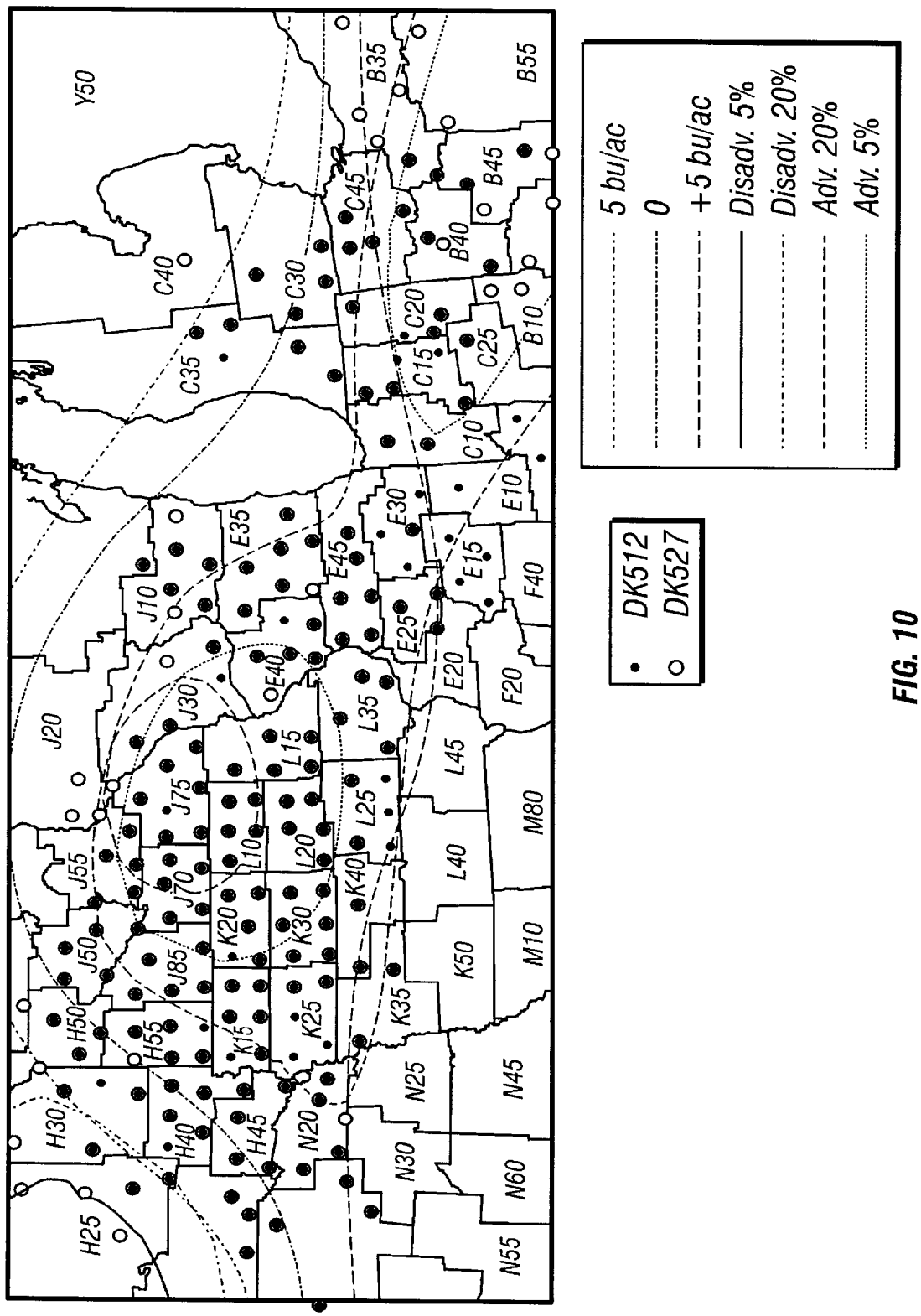
FIG. 10 is a contour plot showing the across-years estimation surface of yield difference for two commercial hybrids, DK512 and DK527, for the years 1996, 1997, and 1998. Three yield difference contours (−5, 0, and +5 bushels/acre) and four statistical significance level contours (5% and 20% for both positive and negative yield difference) are shown. Also shown are the testing locations for the two hybrids and market district boundaries and names.

The following examples are included to demonstrate specific embodiments of the invention. It should be appreciated by those of skill in the art that the techniques disclosed in the examples which follow represent techniques discovered by the inventors to function well in the practice of the invention, and thus can be considered to constitute specific modes for its practice. However, those of skill in the art will, with the benefit of the present disclosure, appreciate that many changes may be made in the specific embodiments which are disclosed and may still obtain a like or similar result without departing from the spirit and scope of the invention. Example 1 should be read with reference to FIGS. 1–12, summarized above in the Brief Description of Drawings section.

EXAMPLE 1

Comparison of Yield in Wide-area Testing of Two Zea mays Varieties

We begin with a demonstration of how the invention works for wide-area comparison of yields of two varieties of Zea mays. The two varieties, named DK512 and DK527, were compared using three years of wide-area testing data, from 1996 to 1998.

The first step of the process involved trimming the data by using the hat matrix [30] and Cook's distance [32]. Locations were also visually inspected to remove any spatial clusters of outliers. After trimming, the across-years sample sizes for the two hybrids were $n_1=445$, $n_2=389$, for DK512 and DK527, respectively. For combined data on both hybrids, the across-years sample size was N=834. By-year sample sizes are given in the following table.

TABLE 1

| Year | Hybrid | No. of Samples |
| --- | --- | --- |
| 1996 | DK512 | 141 |
|  | DK527 | 113 |
| 1997 | DK512 | 150 |
|  | DK527 | 155 |
| 1998 | DK512 | 154 |
|  | DK527 | 121 |

The next step of the process involved the fitting of the mixed model as given in [20]. The fixed effects $X\theta$ in [20] are given in [23], without the 1 for the intercept term, for both hybrids. Thus the $\beta_1$ and $\beta_2$ components of the $\theta$ vector [24], each have dimension 9×1. In vector $\theta$, the $\alpha_1$ and $\alpha_2$ components are 3×1 sub-vectors with intercept parameters for each of the three years, 1996 to 1998. Thus, $X_i$, i=1,2, in [22] is $n_i$×12 and X in [21] is an N×24 matrix. For the variance covariance matrix in [26], we used the coregionalization model given in [15] with M=2, where $f_1(h;\gamma_m)$ and $f_2(h;\gamma_m)$ were both spherical models given in [12]. A model with a separate nugget effect for each variable is given in [27]. Using the coregionalization model with nugget effect, and a random effect for location, as described in the paragraph preceding Equation [25], the variance-covariance model for all of the data is given in [28].

The next step is to estimate the fixed effects parameters and the covariance parameters. The variance-covariance parameters were estimated by minimizing the REML equation given in [19]. The estimated parameters are given in the following table.

TABLE 2

| Parameter | Estimate | Equation References |
| --- | --- | --- |
| $\sigma_1^2$ | 59.6 | [27],[28] |
| $\sigma_2^2$ | 57.6 | [27],[28] |
| $\phi_{11}^2$ | 144.6 | [15],[28] |
| $\phi_{21}^2$ | 108.3 | [15],[28] |
| $r_1$ | 0.941 | [15],[28] |

TABLE 2-continued

| Parameter | Estimate | Equation References |
| --- | --- | --- |
| $\rho_1$ | 0.050 | [12],[15],[28] |
| $\phi_{12}^2$ | 0.307 | [15],[28] |
| $\phi_{22}^2$ | 36.1 | [15],[28] |
| $r_2$ | 0.999 | [15],[28] |
| $\rho_2$ | 0.012 | [12],[15],[28] |
| $\sigma_0^2$ | 367.6 | [25],[28] |

After obtaining the parameter estimates, the model was used to generate both spatial predictions and spatial estimates of the yield difference between the two hybrids. Spatial prediction and spatial estimation of the yield difference were performed both for individual geographic locations (point prediction and estimation) and for geographic regions (block prediction and estimation). In addition to the spatial procedures, the traditional simple mean method was used for estimation of mean yield difference for geographic regions. (The geographic regions selected for use in this example represent regions used in marketing of commercial varieties.)

Recall that the goal of estimation is to determine the long-term average yield difference for the two varieties. The goal of prediction is to determine the average yield difference for the two varieties in specific years and/or at specific locations. For this reason, spatial estimation was done on an across-years basis while spatial prediction was done on a by-year basis. To provide a basis for comparison to the traditional mean method, the simple mean analysis was conducted both for by-year and across-years analyses. (The across-years simple mean method was based on the pooled data from all three years.)

Block estimates of the across-year average yield differences for the market districts were obtained from [40], using the parameter estimates in Table 2 and $\lambda_0(s_p)$ in [37], with $x_{10}=x_0=(1/3,1/3,1/3)'$. (Setting $x_{10}=x_0=(1/3,1/3,1/3)'$ simply provides equal weighting of all three years in the estimation.) In using [40] to get the block estimates, a dense, regular grid of points was produced for each market district, $\{s_p\} \in A$, where A is a market district. Additionally, the estimated value in [40] was assumed to have a standard normal distribution when divided by its standard error, the square-root of [41]; call this the z-statistic. If the z-statistic was less than −1.96 or greater than 1.96, it was assumed to be significant at the $\alpha=0.05$ level for the null hypothesis of no difference between the two hybrids.

Block predictions of the by-year average yield differences for the various market districts were obtained from [65], using the parameter estimates in Table 2, and $u_0$ in [53]. In using [53], both $x_{10}$ and $x_{20}$ were set equal to (1,0,0)', (0,1,0)', or (0,0,1)', for 1996, 1997, and 1998, respectively. The block prediction procedure was similar to the block estimation procedure in the use of the dense, regular grid of points for each market district, as well as in the computation and use of the z-statistic for determination of statistical significance. In the computation of the z-statistic for block prediction, the predicted value in [65] was assumed to have a standard normal distribution when divided by its standard error, the square-root of [66].

Next we will consider point estimation and point prediction of the yield difference between the two varieties. Point estimation and prediction were both performed on a 25×25 rectangular grid which bounded the area where the collection of data from each of the hybrids occurred. The collections of point estimates and predictions over the 25×25 grid form the trend surfaces for the yield difference, which can be used to study the variation in yield difference over the geographic area where the hybrids were tested.

The across-years point estimation used [43] to compute the yield difference, $\mu_0(s_0)$, on the 25×25 grid discussed above. For determination of statistical significance, probability of rejecting a true null hypothesis of no difference between the hybrids were found by taking $$2\{1-\Phi(|\hat{\mu}_0(s_0)/\sqrt{\text{var}[+e,\text{cir}\mu_0(s_0)]}+\text{ee}|)\},$$

where $\text{var}[\hat{\mu}_0(s_0)]$ is given in [44] and $\Phi(\cdot)$ is the cumulative distribution function of a standard normal random variable.

The by-year point prediction used [68] to compute the yield difference, $S_0(s_0)$, on the 25×25 grid discussed above. For determination of statistical significance, probability of rejecting a true null hypothesis of no difference between the hybrids was found by taking $$2\{1-\Phi(|\hat{S}_0(s_0)/\sqrt{\text{var}[+e,\text{cir}S_0(s_0)]}+\text{ee}|)\},$$

where $\text{var}[\hat{S}_0(s_0)]$ is given in [73] and, as before, $\Phi(\cdot)$ is the cumulative distribution function of a standard normal random variable.

The results of all of the above analyses are presented graphically in FIGS. 1–12. There are two types of graphs, one a contour plot, the other a choropleth map. A choropleth map is a two dimensional color map showing variation of a variable value with respect to an area.

In the contour plots, contours are presented for both the yield difference at three levels (−5, 0, and +5 bushels/acre) and for the statistical significance level at four levels (5% and 20% for both positive and negative yield difference). Also shown on the contour plots are the testing locations for the two hybrids and market district boundaries and names.

In the contour plots, solid contour lines represent yield difference and dashed contour lines represent significance level. As with any contour plot, the relation of the lines representing different levels of the same variable (e.g., yield difference) is used to determine the general form of the surface. For example, for yield difference, a transect cutting across red, blue, and green solid lines (in that order) is moving up the yield difference surface from −5 to 0 to +5 bushels/acre, respectively.

The relation between the contour lines for yield difference and significance level is used to determine geographic areas where significant yield difference occur, at the various levels of yield difference and statistical significance. For example, an area enclosed by a green dashed line falling within an area enclosed by a green solid line, which again falls within an area enclosed by a blue solid line identifies an area where there is a statistically significant yield difference (at significance level 0.05) that is greater than +5 bushels/acre.

The other type of graphic, i.e., the choropleth map, shows the average yield difference within each of a number of geographic regions (market districts) for the two hybrids. Patterns on the choropleth map indicate both the level of yield difference (less than −5, between −5 and +5, and greater than +5 bushels/acre) and whether the difference is statistically significant at the 5% level.

Choropleth maps and contour plots are generated for the spatial prediction method (by-year only, 1996 to 1998) and the spatial estimation method (across-years only). Contour plots are not appropriate for the simple mean method, so only choropleth maps (both by-year and across years) are generated. For consistency, the yield difference is presented for a market district in the choropleth maps only if there is at least one testing location in that district that included both of the hybrids. (Recall that the simple mean method requires location-matched data.)

For comparison of the traditional simple mean method to the spatial methods, the by-year maps for the simple mean method can be compared to the by-year block prediction maps and the across-years map for the simple mean method can be compared to the across-years map for the block estimation method.

EXAMPLE 2

Validation Studies

To demonstrate the efficacy of the present invention in terms of its application to the performance assessment of crop varieties, three validation studies were undertaken. Separate sets of validation studies were conducted for the two components of the invention: estimation, and prediction. Recall from Example 1 that each of these two components again consists of two parts: (a) a point estimation (or prediction) part which is used for the construction of the estimation (or prediction) surface map with contours, and (b) a block estimation (or block prediction) part which was used in the example for construction of the market district choropleth maps by mapping the estimated mean value of each district.

We begin with the validation studies conducted for prediction. First, we discuss the validation study for point prediction or point kriging. The basis for this study was a cross-validation (Cressie, 1993, p. 101) using real data from Monsanto corn research system on two DEKALB corn hybrids, DK512 and DK527, for the years 1996 through 1998. Cross-validation was used as a diagnostic check for the prediction quality of the, estimated model for the two hybrids. Cross-validation is a procedure where the basic idea is to delete each datum one at a time, and then use the rest of the data to predict the datum that was removed. This is a popular approach for assessing geostatistical methods of estimation and prediction. In the cross-validation runs, each of the 834 data records was removed one at a time, and then the removed datum was predicted using our procedure. Note that here we will want to predict the random variables $Y_i(s_0); i=1,2$, which is one of the observed values removed from the data set. We do not want to predict the smooth values $S_i(s_0); i=1,2$, which have the error term associated with the nugget effect removed. We have used the cokriging predictors, using covariance, as described in Cressie (1993, p. 138).

The following five statistics were calculated from the cross-validation study.

1. The mean-squared prediction error (MSPE), calculated as the average of the quantity, $[Y_i(s_0)-\hat{Y}_i(s_0)]^2$, where $\hat{Y}_i(s_0)$ is the predicted value of the removed datum, and $Y_i(s_0)$ is the observed value.

2. The average estimated prediction variance (Cressie, 1993, p. 140, Eqn. 3.2.52).

3. The proportion of times the 80% prediction interval contains the true value.

4. The standardized bias: $[Y_i(s_0)-\hat{Y}_i(s_0)]/\text{se}(\hat{Y}_i(s_0))$, (Cressie, 1993, p. 102, Eqn. 2.6.15).

5. The standardized MSPE, which is computed as the square root of the average of the quantity $[Y_i(s_0)-\hat{Y}_i(s_0)]^2/\text{var}(\hat{Y}_i(s_0))$.

In construction of the prediction interval, the lower bound of the prediction interval was calculated as $\hat{Y}_i(s_0)-1.28*$ se($\hat{Y}_i(s_0)$), and the upper bound was calculated as $\hat{Y}_i(s_0)$+ 1.28*se($\hat{Y}_i(s_0)$). Here, se($\hat{Y}_i(s_0)$) is the prediction standard error, which is computed as the square-root of the estimated prediction variance (Cressie, 1993, p. 140, Eqn. 3.2.52).

The above statistics were summarized across all three years. In the following the results of the cross-validation study are summarized, in terms of what is desirable to support the invention and what was actually observed.

a. MSPE (statistic 1) and the average estimated prediction variance (statistic 2) should be close to each other. The cross validation study produced 269.1 and 297.9, respectively for those two statistics.

b. Prediction intervals (statistic 3) should have close to nominal (80%) coverage. The average coverage from the study was 82.7%.

c. The standardized bias (statistic 4) should be close to zero. The computed standardized bias from the study was −0.021.

d. The standardized MSPE (statistic 5) should be close to 1. The standardized MSPE from the study was 1.049.

As one can see, the results from the cross validation are very close what are theoretically desirable. In other words, the validation results support the claim that the proposed model [20] as point prediction tool is performing to one's expectation.

The validation study for the block kniging component of the present invention was also based on real data analysis of corn hybrid yield. The basis for this validation was a comparison of this component with the traditional method. Recall that in the traditional method, the simple mean of all location-matched head-to-head variety difference data coming from a region is used to predict the mean of the region. We shall refer to this method as the MEAN method. The steps involved in the validation runs were as follows:

1. Select a pair of corn hybrids with adequate overlap of data across the country.
2. Take all the location matched head-to-head difference data for that pair of hybrids. This will be called the "original population data".
3. Construct a rectangle interior to the spatial extent of the original population data. We shall call this rectangle "the prediction rectangle," for which we shall construct the mean predicted value.
4. Use the mean of all original population data inside the prediction rectangle to represent the "true mean" for the rectangle.
5. Randomly choose 50% of the original population data. This represents the "sample data" available for analysis.
6. Use the mean of the sample data falling within the prediction rectangle to represent the predicted mean of the rectangle from the MEAN method.
7. Use all of the sample data (in and outside the prediction rectangle) and apply universal block kriging component from the present invention to predict the mean of the prediction rectangle. This represents the value from block prediction.
8. Compute the squared difference between the true mean from step 4 and each of the two predicted means from step 6 and 7.
9. Repeat all of the above steps for several pairs of hybrids.
10. Compute mean squared prediction errors (MSPE) for the MEAN method and the block kriging method using the squared differences from step 8 across all pairs of hybrids.

Data from 12 pairs of corn hybrids from the Monsanto (DEKALB) research system were used for this validation study. The results of the study showed that the MSPE for the block kriging method was 36% lower than the MSPE for the MEAN method. Note that MSPE is a direct measure of prediction error and therefore, lower MSPE corresponds to higher accuracy of prediction.

Finally, we discuss the validation study which was undertaken for the estimation component of the present invention. The analysis was based on an extensive simulation study, which used both real and simulated data in a unique way as will be described below. First, recall that the estimation component of the invention is based on generalized least square (GLS) procedure, which is an improvement over the more traditional ordinary least square (OLS) procedure. Unlike GLS procedure, OLS ignores the spatial autocorrelation in the data and only models the large scale trend. This validation study was planned to compare three distinct methods: (a) GLS method, (b) OLS method, and (c) the traditional MEAN method. The traditional MEAN method, in the context of variety comparison, consists of simply computing the mean of location-matched head-to-head differences for the two varieties under consideration. One of the major objectives of this validation study was to see if there are incremental benefits, first in going from MEAN method to OLS method and then in going from OLS to GLS method.

The following provides a step by step description of the validation procedure.

1. Choose a year (from 1994, 1995, or 1996) and a pair of corn hybrids close in relative maturity (RM). Take all research trial data for the two hybrids regardless of location matching.
2. Trim the data for spatial outliers and enclose the trimmed data by a rectangular box. We shall call this the data rectangle. This will represent the sample data available for analysis.
3. Within the data rectangle, construct another inner rectangle extending from 1/3 to 2/3 of the range of the data in both east-west and north-south direction. We shall name this rectangle the estimation rectangle. This is the rectangle for which we shall conduct estimation.
4. Fit a separate cubic polynomial trend surface to each hybrid using all observations in the data rectangle. This model fitting is done via GLS by fitting a spherical covariance model (see Background of the Invention section) to the residual covariance of each hybrid and then using an estimated nugget effect common to both hybrids. Note that no cross-covariance was assumed between the two hybrids.
5. Compute the estimate of the means of the trend surface over the estimation rectangle for both hybrids and their difference (i.e., the difference in the two fitted trend surfaces). We shall call these the original estimates.
6. Compute auto-correlation for each hybrid and cross-correlation between the two hybrids for Euclidean distances 0.01 and 0.05 (corresponding to approximately 40 and 200 miles, respectively).
7. Simulate data for each hybrid on a 0.01 grid over the data rectangle using the estimated parameters of the respective trend surfaces and covariance parameters as well as the nugget effect from steps 4.
8. Generate two sine waves with random amplitudes and frequencies in both x- and y-directions. For the first sine wave, the mean and the standard deviation of the randomly generated frequency is 100 and 5, respectively, whereas for the second sine wave they are 17 and 3, respectively. Similarly, for the first sine wave, the mean and the standard deviation of the randomly generated amplitude is 4 and 2, respectively, whereas for the second sine wave they are 3 and 1, respectively. (Note that the addition of the sine waves into the simulated data is meant to introduce some systematic variation not easily fit by the cubic model. The resulting data now is equal to the cubic surface plus the sine waves plus the auto-correlated random errors.)

9. Using the cubic surface parameters (fitted through GLS in step 4) and the parameters of the sine waves (from step 8) compute the "true" value of the mean of the two hybrids and their difference over the estimation rectangle. These true means will be used for computing biases of the estimates and coverage of confidence intervals computed in the following steps.

10. Drop, at random, 40% of the data points independently for each hybrid to create artificial non-matching of the two hybrids at the grid points.

11. Compute the average of the hybrids and their difference using the simulated values within the estimation rectangle from only the grid points where both values exist. This will be called the MEAN estimate.

12. Use OLS to estimate the mean (over the estimation rectangle) of the two hybrids and their difference by fitting cubic polynomials (different polynomials for the two hybrids) to all sampled values inside and outside the estimation rectangle (i.e., using the entire data rectangle) and assuming independence of residuals but different residual variances for the two hybrids. This provides the OLS estimate.

13. Use GLS to estimate the mean (over the estimation rectangle) of the two hybrids and their difference using all sampled values inside and outside the estimation rectangle (i.e., using the entire data rectangle) by fitting cubic polynomials (different for each hybrid) and a spherical covariance structure (different for each hybrid) with a nugget effect and a cross-correlation parameter for the residuals. This provides the GLS estimate.

14. Construct 80% confidence intervals for the true mean using (i) MEAN estimate, (ii) OLS estimate, and (iii) GLS estimate, and their respective standard errors. Make a note of whether the confidence interval covers the true mean obtained from step 9. Also, for each of the above three estimates, compute the bias with respect to the true mean.

15. Repeat steps 7 through 14 one hundred times. This is the number of simulations.

16. Using the estimates coming from all 100 simulations, compute the standard deviation for (a) MEAN estimate of the mean, (b) OLS estimate of the mean, and (c) GLS estimate of the mean. Also compute the average bias for each of the three estimates by taking the average (across all 100 simulations) of the biases obtained in step 14.

17. For each of MEAN, OLS, and GLS methods, compute the percentage of times (out of 100 simulations) the confidence interval covers the true mean.

18. Repeat all of the above steps for 27 pairs of hybrids covering a wide range of RM's and for data from all three years, 1994, 1995, and 1996.

Remark: As mentioned before, this validation procedure combines analysis of real data and simulation in a unique manner in that real data from each pair of corn hybrids are first used to get the trend and correlation parameters, which are then used to generate data for the simulation studies. Note that the reason real data could not be exclusively used for this validation study is that the procedure requires the "true" mean for computation of the percentage of coverage and bias as described above in step 14.

The results of the validation study are summarized below.

1. Gain in precision, as measured by the standard deviation, while going from MEAN method to GLS method was 37%. This gain was equally divided between going from MEAN to OLS and then from OLS to GLS.

2. Percent of times the true mean was covered by the 80% confidence interval was very close to nominal for GLS method (77%), whereas it was substantially lower than 80% for MEAN and OLS methods (46% for MEAN and 56% for OLS method).

3. For Mean and OLS methods, the study revealed gross under-estimation of the true standard error, which implies too many false rejections of the null hypothesis of no difference, i.e., a conclusion that variety difference exists when there truly is no difference between the varieties.

Conclusion

Results from all three validation studies jointly demonstrate the efficacy of the present invention in spatial estimation and spatial prediction of performance of crop varieties.

REFERENCES

The following references and all references cited in the specification are specifically incorporated herein by reference.

Besag, J., and Kempton, R. (1986), Statistical analysis of field experiments using neighboring plots, *Biometrics*, 42, 231–251.

Bhatti, A. U., Mulla, D. J., and Frazier, B. E. (1991), "Estimation of soil properties and wheat yields on complex eroded hills using geostatistics and thematic mapper images," *Remote Sens. Environ.*, 37, 181–191.

Bhatti, A. U., Mulla, D. J., Koehler, F. E., and Gurmani, A. H. (1991), "Identifying and removing spatial correlation from yield experiments," *Soil Sci. Soc. Am. J.*, 55,1523–1528.

Bradley, J. P., Knittle, K. H., and Troyer, A. F. (1988), "Statistical methods in seed corn product selection," *J. Prod. Agric.*, 1, 34–38.

Brownie, C., Bowman, D. T., and Burton, J. W. (1993), "Estimating spatial variation in analysis of data from yield trials: a comparison of methods," *Agron. J.*, 85, 1244–1253.

Cook, R. D. (1977), "Detection of influential observation in linear regression," *Technometrics*, 19, 15–18.

Cressie, N. (1990), "The origins of kriging," *Mathematical Geology*, 22, 239–252.

Cressie, N. (1993), *Statistics for spatial data, Revised Edition*, John Wiley and Sons, New York, USA.

Cressie, N., and Lahiri, S. N. (1996), "Asymptotics for REML estimation of spatial covariance parameters," *Journal of Statistical Planning and Inference*, 50, 327–341.

Christensen, R., Pearson, L. M., and Johnson, W. (1992), "Case-deletion diagnostics for mixed models," *Technometrics*, 34, 38–45.

Cullis, B., Gogel, B., Verbyla, A., and Thompson, R. (1998), "Spatial analysis of multi-environment early generation variety trials," *Biometrics*, 54, 1–18.

Gandin, L. S. (1959), "The problem of optimal interpolation," *Trudy GGO*, 99, 67–75. (In Russian).

Gandin, L. S. (1963), *Objective Analysis of Meteorological Fields*, Gidrometeorologicheskoe Izdatel'stvo (GIMIZ), Leningrad (translated by Israel Program for Scientific Translations, Jerusalem, 1965).

Godambe, V. P. (editor) (1991), *Estimating functions*, Clarendon Press, Oxford.

Goldberger, A. S. (1962), "Best linear unbiased prediction in the generalized linear regression model," *Journal of the American Statistical Association*, 57, 369–375.

Goovaerts, P. (1997), *Geostatistics for Natural Resources Evaluation*, Oxford University Press, New York.

Gotway, C. A., and Hartford, A. H. (1996), "Geostatistical methods for incorporating auxiliary information in the prediction of spatial variables," *Journal of Agricultural Biological and Environmental Statistics*, 1, 1, 17–39.

Gotway, C. A., and Stroup, W. W. (1997), "A generalized linear model approach to spatial data analysis and prediction," *Journal of Agricultural Biological and Environmental Statistics*, 2, 2, 157–178.

Harville, D. A. (1977), "Maximum likelihood approaches to variance component estimation and to related problems," *Journal of the American Statistical Association*, 72, 320–340.

Heyde, C. C. (1994), "A quasi-likelihood approach to the REML estimating equations," *Statistics and Probability Letters*, 21, 381–384.

Hoaglin, D. C., and Welsch, R. E. (1978), "The hat matrix in regression and ANOVA," *American Statistician*, 32, 17–22.

Kolmogorov, A. N. (1941), "Interpolation and extrapolation of stationary random sequences," *Isvestiia Akademii Nauk SSSR, Seriia Matematicheskiia*, 5, 3–14. (Translation, 1926, Memo RM-3090-PR, Rand Corp., Santa Monica, Calif.).

Littell, R. C., Milliken, G. A., Stroup, W. W., and Wolfinger, R. D. (1996), *SAS System for Linear Models*, SAS Institute Inc., Cary, N.C., USA.

Mardia, K. V., and R. J. Marshall. (1984), "Maximum likelihood estimation of models for residual covariance in spatial regression," *Biometrika*, 71, 135–146.

Matheron, G. (1962), *Traité de Géostatistique Appliquée, Tome I. Mémoires du Bureau de Recherciles Géologiques et Minières*, 14, Editions Technip, Paris.

Matheron, G. (1969), "Le Krigeage Universel," *Cahiers du Centre de Morphologie Mathematique*, 1, Fontainebleau, France.

Montgomery, D. C., and Peck, E. A. (1992), *Introduction to Linear Regression Analysis, Second Edition*, Wiley, New York.

Ovalles, F. A., and Collins, M. E. (1988). "Evaluation of soil variability in northwest Florida using geostatistics," *Soil Sci. Soc. Am. J.*, 52, 1702–1708.

Patterson, H. D., and R. Thompson. (1971), "Recovery of interblock information when block sizes are unequal," *Biometrika*, 58, 545–554.

Patterson, H. D., and R. Thompson. (1974), "Maximum likelihood estimation of components of variance," Pages 197–207 in *Proceedings of the 8th International Biometric Conference*, Biometric Society, Washington, D.C., USA.

Searle, S. R. (197 1), *Linear Models*, Wiley, New York.

Searle, S. R., Casella, G., and McCulloch, C. E. (1992), *Variance Components*, Wiley, New York.

Sprague, G. F., and Eberhart, S. A. (1976), "Corn breeding," *Corn and Corn Improvement*, J. A. Dudley and G. F. Sprague (eds), Iowa State Univ. Press.

Stroup, W. W., Baenziger, P. S., and Mulitze, D. K., (1994) "Removing spatial variation from wheat yield trials: a comparison of methods," *Crop Science*, 86, 62–66.

Ver Hoef, J. M., and Barry, R. D. (1998), "Modeling crossvariograms for cokriging and multivariable spatial prediction," *Journal of Statistical Planning and Inference*, 69, 275–294.

Ver Hoef, J. M., and Cressie, N. (1993), "Multivariable spatial prediction," *Mathematical Geology*, 25, 219–240.

Weiner, N. (1949), *Extrapolation, Interpolation, and Smoothing of Stationary Time Series*, MIT Press, Cambridge, Mass.

Wold, H. (1938), *A Study in the Analysis of Stationary Time Series*, Almqvist and Wiksells, Uppsala.

Wolfinger, R. D., Tobias, R. D., and Sall, J. (1994), "Computing Gaussian likelihoods and their derivatives for general linear mixed models," *SIAM Journal on Scientific Computing*, 15, 1294–1310.

Wu, T., Mather, D. E., and Dutilleul, P. (1998), "Application of geostatistical and neighbor analyses to data from plant breeding trials," *Crop Science*, 38, 1545–1553.

Yost, R. S., Uehara, G., and Fox, R. L. (1982a), "Geostatistical analysis of soil chemical properties of large land areas. I. Semi-variograms," *Soil Sci. Soc. Am. J.*, 46, 1028–1032.

Yost, R. S., Uehara, G., and Fox, R. L. (1982b), "Geostatistical analysis of soil chemical properties of large land areas. II. Kriging," *Soil Sci. Soc. Am. J.*, 46, 1033–1037.

Zimmerman, D. L. (1989), "Computationally efficient restricted maximum likelihood estimation of generalized covariance functions," *Mathematical Geology*, 21, 655–672.

Zimmerman, D. L., and Harville, D. A. (1991), "A random field approach to the analysis of field-plot experiments and other spatial experiments," *Biometrics*, 47, 1, 223–239.

What is claimed is:

1. A method for assessing wide-area performance of two or more crop varieties using a linear mixed model that incorporates geostatistical components and includes parameters for fixed effects, random effects and covariances, the method comprising:

constructing a wide-area database that includes spatial coordinates of testing locations of two or more crop varieties, performance trait values of two or more crop varieties at their respective testing locations and spatial coordinates of other geographic locations for assessing performance of two or more crop varieties;

constructing a linear mixed model for the data in the wide-area database that includes modeling the large-scale performance of each of the two or more crop varieties by fixed effect trend surfaces, modeling spatial autocovariance among the random error components of each of the two or more crop varieties and modeling spatial crosscovariances of random errors among the two or more crop varieties in a mutivariate coregionalization model;

estimating the parameters for the fixed effects, random effects and covariances by fitting the linear mixed model with data in the wide-area database; and estimating long-term expected performance of any of the two or more crop varieties for any of the one or more geographic locations using the pamtr estimates.

2. The method of claim 1, wherein the database further includes covariate data.

3. The method of claim 2, wherein the covariate data comprises one or more fixed effects.

4. The method of claim 1, wherein the estimating long-term expected performance comprises estimating long-term expected performance differences between the two or more crop varieties.

5. The method of claim 4, wherein the estimating the long-term expected performance differences between two or more crop varieties comprises estimating the difference in the fixed effect trend surfaces for the two or more crop varieties and the associated variance of the difference.

6. The method of claim 5, further comprising forming an output of the long-term expected performance difference.

7. The method of claim 6, wherein the output comprises text output.

8. The method of claim 6, wherein the output comprises graphical output.

9. The method of claim 8, wherein the output comprises a contour plot representing a continuous surface of long-term expected performance difference and its statistical significance.

10. The method of claim 9, wherein the output comprises text output.

11. The method of claim 10, wherein the method of universal cokriging comprises modeling a fixed effect trend surface for any of the two or more crop varieties and a corresponding random surface using a multivariate coregionalization model with autocorrelation within each variety and crosscorrelation among varieties and estimating the prediction variance.

12. The method of claim 9, wherein the output comprises graphical output.

13. The method of claim 8, further comprising forming an output of the long-term expected performance difference.

14. The method of claim 1, wherein the estimating the parameters for covariances comprises a method of restricted maximum likelihood.

15. The method of claim 1, wherein the estimating the parameters for the fixed effects comprises the method of generalized least squares.

16. The method of claim 1, wherein the database further includes geographic regions for assessing performance of the two or more crop varieties, each geographic region containing a plurality of geographic locations.

17. The method of claim 16, further comprising:
estimating long-term expected performance of any of the two or more crop varieties for any of one or more geographic regions using the p estimates.

18. The method of claim 1, further comprising forming an output of the long-term expected performance.

19. The method of claim 18, wherein the output comprises text output.

20. The method of claim 18, wherein the output comprises graphical output.

21. The method of claim 20, wherein the output comprises a contour plot representing a continuous surface of long-term expected performance.

22. The method of claim 1, wherein the constructing the linear mixed model further comprises modeling testing location as a random effect.

23. The method of claim 1, wherein the estimating the long-term expected performance comprises estimating the value of the fixed effect trend surface and its associated variance of any of the two or more crop varieties.

24. The method of claim 1, wherein some of the covariate data include fixed effects for year, and further comprising predicting the performance of any of the two or more crop varieties for any of the one or more geographic locations and for any of the one or more time periods using the parameter estimates.

25. A method for assessing wide-area performance of two or more crop varieties using a linear mixed model that incorporates geostatistical components and includes parameters for fixed effects, random effects and covariances, the method comprising:
constructing a wide-area database that includes spatial coordinates of testing locations of two or more crop varieties, geographic regions for assessing performance of two or more crop varieties, each geographic region containing a plurality of geographic locations and performance trait values of two or more crop varieties at their respective testing locations;
constructing a linear mixed model for the data in the wide-area database that includes modeling the large-scale performance of each of the two or more crop varieties by fixed effect trend surfaces, modeling spatial autocovariance among the random error components of each of the two or more crop varieties and modeling spatial crosscovariances of random errors among the two or more crop varieties in a mutivariate coregionalization model;
estimating the parameters for the fixed effects, random effects and covariances by fitting the linear mixed model with data in the wide-area database; and
estimating long-term expected performance of the two or more crop varieties for any of the one or more geographic regions using the parameter estimates.

26. The method of claim 25, wherein the database further includes covariate data.

27. The method of claim 26, wherein the covariate data comprises one or more fixed effects.

28. The method of claim 25, wherein the estimating long-term expected performance comprises estimating long-term expected performance differences between the two or more crop varieties.

29. The method of claim 28, wherein the estimating the long-term expected performance differences between two or more crop varieties comprises estimating the difference in the fixed effect trend surfaces for the two or more crop varieties and the associated variance of the difference.

30. The method of claim 25, wherein the estimating the parameters for covariances comprises a method of restricted maximum likelihood.

31. The method of claim 25, wherein the estimating the parameters for the fixed effects comprises the method of generalized least squares.

32. The method of claim 25, further comprising forming an output of the long-term expected performance.

33. The method of claim 32, wherein the output comprises text output.

34. The method of claim 32, wherein the output comprises graphical output.

35. The method of claim 34, wherein the output comprises a choropleth map representing the long-term expected performance for any of the one or more given geographic regions.

36. The method of claim 25, wherein the constructing the linear mixed model further comprises modeling testing location as a random effect.

37. The method of claim 36, wherein the output comprises a choropleth map representing the long-term expected performance difference and its statistical significance.

38. The method of claim 37, further comprising forming an output of the predicted performance difference.

39. The method of claim 38, wherein the method of universal block cokriging comprises modeling a fixed effect trend surface for any of the two or more crop varieties and a corresponding random surface using a multivariate coregionalization model with autocorrelation within each variety and crosscorrelation among varieties and estimating the prediction variance.

40. The method of claim 25, wherein the estimating the long-term expected performance comprises estimating the average value of the fixed effect trend surface across all geographic locations within each of the one or more geographic regions, and the variance of the average value for any of the two or more crop varieties.

41. The method of claim 25, wherein some of the covariate data include fixed effects for year, and further comprising predicting the performance of any of the two or more crop varieties for any of the one or more geographic locations and for any of the one or more time periods using the parameter estimates.

42. The method of claim 41, wherein the output comprises text output.

43. The method of claim 41, wherein the output comprises graphical output.

44. The method of claim 43, further comprising forming an output of the predicted performance difference.

45. A method for assessing wide-area performance of two or more crop varieties using a linear mixed model that incorporates geostatistical components and includes parameters for fixed effects, random effects and covariances, the method comprising:

constructing a wide-area database that includes spatial coordinates of testing locations of two or more crop varieties, performance trait values of two or more crop varieties from one or more time periods at their respective testing locations and spatial coordinates of other geographic locations for assessing performance of two or more crop varieties;

constructing a linear mixed model for the data in the wide-area database that includes modeling the large-scale performance of each of the two or more crop varieties by fixed effect trend surfaces, modeling spatial autocovariance among the random error components of each of the two or more crop varieties and modeling spatial crosscovariances of random errors among the two or more crop varieties in a mutivariate coregionalization model;

estimating the parameters for the fixed effects, random effects and covariances by fitting the linear mixed model with data in the wide-area database; and predicting the performance of two or more crop varieties for any of one or more geographic locations and for any of one or more time periods using the parameter estimates.

46. The method of claim 45, wherein the estimating the parameters for covariances comprises a method of restricted maximum likelihood.

47. The method of claim 45, wherein the database further includes covariate data.

48. The method of claim 47, wherein the covariate data comprises one or more fixed effects.

49. The method of claim 45, wherein the predicting performance comprises predicting performance difference between the two or more crop varieties and its associated variance.

50. The method of claim 49, wherein predicting the performance difference comprises the method of universal cokriging applied to the difference of the two or more crop varieties.

51. The method of claim 45, wherein the database further includes geographic regions for assessing performance of the two or more crop varieties, each geographic region containing a plurality of geographic locations.

52. The method of claim 51, further comprising:

predicting the performance of any of the two or more crop varieties for any of one or more given geographic regions and for any of the one or more given time periods using the parameter estimates.

53. The method of claim 45, further comprising forming an output of the predicted performance.

54. The method of claim 53, wherein the output comprises text output.

55. The method of claim 53, wherein the output comprises graphical output.

56. The method of claim 55, wherein the output comprises a contour plot representing a continuous surface of the predicted performance.

57. The method of claim 45, wherein the constructing the linear mixed model further comprises modeling testing location as a random effect.

58. The method of claim 45, wherein the estimating the parameters for the fixed effects comprises the method of generalized least squares.

59. The method of claim 58, wherein the output comprises a contour plot representing a continuous surface of the predicted performance difference and its statistical significance.

60. The method of claim 59, wherein the output comprises text output.

61. The method of claim 59, wherein the output comprises graphical output.

62. The method of claim 45, wherein the predicting performance comprises the method of universal cokriging applied to any of the two or more crop varieties.

63. A method for assessing wide-area performance of two or more crop varieties using a linear mixed model that incorporates geostatistical components and includes parameters for fixed effects, random effects and covariances, the method comprising:

constructing a wide-area database that includes spatial coordinates of testing locations of two or more crop varieties, geographic regions for assessing performance of two or more crop varieties, each geographic region containing a plurality of geographic locations, and performance trait values of two or more crop varieties from one or more time periods at their respective testing locations;

constructing a linear mixed model for the data in the wide-area database that includes modeling the large-scale performance of each of the two or more crop varieties by fixed effect trend surfaces, modeling spatial autocovariance among the random error components of each of the two or more crop varieties and modeling spatial crosscovariances of random errors among the two or more crop varieties in a mutivariate coregionalization model;

estimating the parameters for the fixed effects, random effects and covariances by fitting the linear mixed model with data in the wide-area database; and predicting the performance of two or more crop varieties for any of one or more geographic regions and for any of one or more time periods using the parameter estimates.

64. The method of claim 62, wherein the estimating the parameters for covariances comprises a method of restricted maximum likelihood.

65. The method of claim 63, wherein the database further includes covariate data.

66. The method of claim 65, wherein the covariate data comprises one or more fixed effects.

67. The method of claim 62, wherein the predicting performance comprises predicting performance difference between the two or more crop varieties and its associated variance.

68. The method of claim 67, wherein predicting the performance difference comprises the method of universal block cokriging applied to the difference of the two or more crop varieties.

69. The method of claim 62, further comprising forming an output of the predicted performance.

70. The method of claim 69, wherein the output comprises text output.

71. The method of claim 69, wherein the output comprises graphical output.

72. The method of claim 61, wherein the output comprises a choropleth map representing the predicted performance for any of the one or more given geographic regions.

73. The method of claim 62, wherein the constructing the linear mixed model further comprises modeling testing location as a random effect.

74. The method of claim 62, wherein the estimating the parameters for the fixed effects comprises the method of generalized least squares.

75. The method of claim 74, wherein the output comprises a choropleth map representing the predicted performance difference and its statistical significance.

76. The method of claim 62, wherein the predicting performance comprises the method of universal block cokriging applied to any of the two or more crop varieties.

77. A method for assessing wide-area performance of two or more crop varieties using a linear mixed model that incorporates geostatistical components and includes parameters for fixed effects, random effects and covariances, the method comprising:

constructing a wide-area database that includes spatial coordinates of testing locations of two or more crop varieties, geographic regions for assessing performance of the two or more crop varieties, each geographic region containing a plurality of geographic locations, spatial coordinates of other geographic locations for assessing performance of two or more crop varieties and performance trait values of two or more crop varieties at their respective testing locations;

constructing a linear mixed model for the data in the wide-area database that includes modeling the large-scale performance of each of the two or more crop varieties by fixed effect trend surfaces, modeling spatial autocovariance among the random error components of each of the two or more crop varieties and modeling spatial crosscovariances of random errors among the two or more crop varieties in a mutivariate coregionalization model;

estimating the parameters for the fixed effects, random effects and covariances by fitting the linear mixed model with data in the wide-area database;

estimating long-term expected performance of any of the one or more crop varieties for any of one or more geographic locations using the parameter estimates;

estimating long-term expected performance of two or more crop varieties for any of one or more geographic regions using the parameter estimates;

predicting the performance of two or more crop varieties for any of the one or more geographic locations and for any of one or more time periods using the parameter estimates; and predicting the performance of two or more crop varieties for any of the one or more geographic regions and for any of the one or more time periods using the parameter estimates.

78. The method of claim 77, wherein the predicting performance comprises predicting performance differences between the two or more crop varieties and its associated variance.

79. The method of claim 77, wherein the estimating the parameters for the fixed effects comprises the method of generalized least squares.

80. The method of claim 77, wherein the predicting the performance comprises the method of universal cokriging or universal block cokriging.

81. The method of claim 77, wherein the estimating the parameters for covariances comprises a method of restricted maximum likelihood.

82. The method of claim 77, wherein the estimating long-term expected performance comprises estimating long-term expected performance differences between the two or more crop varieties.

83. The method of claim 77, further comprising forming an output of the estimated long-term expected performance or the predicted performance.

84. The method of claim 83, wherein the output comprises text output.

85. The method of claim 83, wherein the output comprises graphical output.

86. The method of claim 77, wherein the constructing the linear mixed model further comprises modeling testing location as a random effect.

87. The method of claim 77, wherein the estimating long-term expected performance comprises estimating the value of the fixed effect trend surface and its associated variance.

* * * * *